(12) United States Patent
Kawamura et al.

(10) Patent No.: US 8,046,549 B2
(45) Date of Patent: Oct. 25, 2011

(54) STORAGE CONTROLLER, CONTROL METHOD OF THE SAME, AND INFORMATION PROCESSING SYSTEM

(75) Inventors: Shunji Kawamura, Yokohama (JP); Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 840 days.

(21) Appl. No.: 12/013,631

(22) Filed: Jan. 14, 2008

(65) Prior Publication Data

US 2008/0282049 A1 Nov. 13, 2008

(30) Foreign Application Priority Data

May 11, 2007 (JP) ................................. 2007-126347

(51) Int. Cl.
*G06F 13/00* (2006.01)
*G06F 13/28* (2006.01)
*G06F 7/00* (2006.01)
*G06F 17/00* (2006.01)

(52) U.S. Cl. ................. 711/162; 711/E12.103; 707/640
(58) Field of Classification Search .................. 711/162, 711/E12.103; 707/640
See application file for complete search history.

(56) References Cited

U.S. PATENT DOCUMENTS

| 2005/0028022 A1 | 2/2005 | Amano |
| 2005/0188256 A1* | 8/2005 | Stager et al. ..................... 714/13 |
| 2010/0077173 A1* | 3/2010 | Rao et al. ....................... 711/170 |

FOREIGN PATENT DOCUMENTS

JP 2005-018738 1/2005

* cited by examiner

*Primary Examiner* — Edward J Dudek, Jr.
(74) *Attorney, Agent, or Firm* — Antonelli, Terry, Stout & Kraus, LLP.

(57) ABSTRACT

In the storage controller of the present invention, different difference bitmaps are used for predetermined sections respectively, whereby the difference between the primary volume and the base volume is managed for each section, and the data are protected efficiently. The difference between the primary volume and the base volume is managed by using the difference bitmaps that are different for the respective sections. The journal data after a lapse of the targeted protection period are written to the base volume and then discarded. At the time of recovery, the difference bitmaps are merged to create a new difference bitmap, and the difference is copied from the base volume to the primary volume. Thereafter, the journal data up to the designated restoration point are written to the primary volume.

11 Claims, 33 Drawing Sheets

FIG. 23

CDP CONFIGURATION SCREEN

G11: | CDP GROUP # | 001 |

G12: | PVOL # | 001 |

G13: | BVOL # | 101 |

G14: | JVOL # | 201 |

G15: | TARGETED PROTECTION PERIOD | 3 HOURS |

G16:
| WHETHER INFLOW RESTRICTION CAN BE PERFORMED | ◉ YES   ○ NO |
| THRESHOLD VALUE OF INFLOW RESTRICTION | 85% |

B11 — OK    CANCEL — B12

FIG. 24

RECOVERY CONFIGURATION SCREEN

G21 — | CDP GROUP # | 001 |

G22 — | PVOL # | 001 |

G23 — RESTORABLE POINT

| | | |
|---|---|---|
| | T1-T2 | CPM1 |
| | | CPM2 |
| | T3-T4 | CPM3 |
| | | CPM4 |
| | T5-T6 | CPM5 |
| | | CPM6 |

G24 — | RESTORATION POINT | 12:30 |

B21: EXECUTE TEMPORARY RESTORATION
B22: EXECUTE COMPLETE RESTORATION
B23: CANCEL

STORAGE CONTROLLER, CONTROL METHOD OF THE SAME, AND INFORMATION PROCESSING SYSTEM

CROSS-REFERENCE TO RELATED APPLICATIONS

This application relates to and claims priority from Japanese Patent Application No. 2007-126347 filed on May 11, 2007, the entire disclosure of which is incorporated herein by reference.

BACKGROUND OF THE INVENTION

1. Field of the Invention

The present invention relates to a storage controller, a control method of the storage controller, and an information processing system.

2. Description of the Related Art

Various organizations such as a company, medical institution, government organization, and education institution use a storage controller in order to efficiently manage a large amount of data that increases on a daily basis. A storage controller stores important data such as sales data, customer data and research data, thus it is necessary to prepare for loss of data caused by human errors. Hedges against the loss of data include a method for creating a backup of a volume on a regular basis.

However, creating a backup and restoring data require a long time. Also, since data can be restored only when a backup is created, a data backup is not convenient. Therefore, as another hedge, there is known a first conventional technology in which a snapshot of a volume is created and journal data is acquired every time when the volume is updated, to manage the journal data (Japanese Unexamined Patent Publication No. 2005-18738). However, in this conventional technology as well, it is necessary to create a snapshot, and there is room for improvement in terms of convenience.

Therefore, there is also known a second conventional technology that allows restoration of data at any given point in time by using journal data (U.S. Patent Application Publication No. 2005/0028022).

The second conventional technology uses a data volume to be protected, a secondary volume to which a storage content of the protected data volume at some point in time is copied, and a journal volume that stores journal data. In the second conventional technology, at the time of restoration, data is copied from the secondary volume to the data volume to match the storage content of the data volume to storage content of the secondary volume. Next, in the second conventional technology, the journal data up until a specified time point is read out from the journal volume, and then written to the data volume. Therefore, according to the second conventional technology, data can be restored at any give point in time in increments of an update unit (in units of journal data).

However, when the capacity of the journal volume is fixed, the journal volume will eventually be filled with journal data, thus it is difficult to extend the period in which restoration can be performed. In the case of a configuration in which the capacity of the journal volume can be expanded, three is a risk that most of the storage capacity that the storage controller has is consumed in management of the journal data.

SUMMARY

The present invention is contrived in view of the above problems, and it is an object of the present invention to provide a storage controller capable of efficiently protecting data of a volume to be protected, a control method of the storage controller, and an information processing system. Another object of the present invention is to provide a storage controller capable of efficiently managing journal data and performing a high-speed restoration, a control method of the storage controller, and an information processing system. A further object of the present invention is to provide a storage controller capable of efficiently managing journal data and increasing the scope of selecting a time point at which restoration can be performed, a control method of the storage controller, and an information processing system. Yet another object of the present invention will become clear from the following descriptions of embodiments.

In order to solve the above problems, a storage controller for storing data that is used by a host device, according to the present invention, has: a first storage area that stores write data sent from the host device; a second storage area to which a storage content of the first storage area that is obtained at a predetermined time point is copied; and a controller that manages a position at which a difference in storage contents occurs between the first storage area and the second storage area, by switching a plurality of difference bitmaps for each of a plurality of predetermined periods.

According to another aspect of the present invention, the storage controller for storing data that is used by a host device has: a first volume that stores write data sent from the host device; a second volume to which a storage content of the first volume that is obtained at a predetermined time point is copied; a third volume that stores journal data items created based on a write request targeted at the first volume; a plurality of first difference bitmaps, each of which manages, for each of a plurality of predetermined sections, a position at which a difference in storage contents occurs between the first volume and the second volume; and a controller for controlling the first volume, the second volume, the third volume, and each of the first difference bitmaps.

The controller executes: (1) an initial copy function for storing, in the second volume, the storage content of the first volume that is obtained at the predetermined time point; (2) a journal generating function for generating the journal data items on the basis of write requests sent from the host device and causing the third volume to store the generated journal data items; (3) a difference management function for causing one of the first difference bitmaps, which is selected for the each predetermined section, to store the position at which a difference is generated between the first volume and the second volume, on the basis of the write request issued from the host device after the predetermined time point; (4) a reflection function for reflecting, in the second volume, predetermined journal data items that are obtained after a lapse of a pre-designated targeted protection period, out of the journal data items stored in the third volume; (5) a journal discarding function for discarding the predetermined journal data items reflected in the second volume; and (6) a reusing function for deleting a storage content of a predetermined first difference bitmap having all corresponding journal data items discarded, out of the first difference bitmaps, and reusing thus obtained first difference bitmap as a new first difference bitmap.

In the embodiments of the present invention, the controller further executes a first restoration function (7). (7) When a command is issued to execute a first restoration, this first restoration function: (7-2) merges the storage contents of the first difference bitmaps to create a second difference bitmap; (7-3) differentially copies the storage content of the second volume to the first volume on the basis of the created second difference bitmap, to thereby restores the storage content of the first volume to the predetermined time point; and (7-4) reflects, in the first volume, journal data items obtained up to a designated first restoration point, out of the journal data items stored in the third volume, and thereby restores the storage content of the first volume to the storage content obtained at the first restoration point.

In the embodiments of the present invention, when a command is issued to execute the first restoration, the first restoration function (7) (7-1) prohibits the write request from being sent from the host device to the first volume, and executes (7-2) through (7-4) after stopping the operation of the reflection function (4).

In the embodiments of the present invention, after executing (7-2) through (7-4), the first restoration function (7) (7-5) removes prohibition of the write request sent from the host device to the first volume, to thereby causes the third volume to store new journal data generated by the journal generating function (2), and (7-6) causes a third difference bitmap to store the position of the difference generated between the second volume and the first volume, the storage content of which is restored to the predetermined time point.

In the embodiments of the present invention, after executing (7-2) through (7-6), the first restoration function (7): (7-7) discards the new journal data when a command is issued to execute the first restoration for designating other first restoration point different from the first restoration point; (7-8) merges the storage content of each first difference bitmap with the storage content of the third difference bitmap to create another second difference bitmap; (7-9) copies the storage content of the second volume to the first volume on the basis of the created other second difference bitmap, to thereby restore the storage content of the first volume to the predetermined time point; and (7-10) reflects, in the first volume, the journal data items obtained up to the other first restoration point, out of the journal data items stored in the third volume, and thereby restores the storage content of the first volume to the storage content obtained at the other first restoration point.

In the embodiments of the present invention, the first restoration function (7) deletes the third difference bitmap after creating the second difference bitmap in (7-8).

In the embodiments of the present invention, the controller executes a second restoration function (8). (8) When a command is issued to execute a second restoration, the second restoration function: (8-1) nullifies all successive journal data items obtained after a designated second restoration point, out of the journal data items stored in the third volume; and (8-2) removes prohibition of the write request sent from the host device to the first volume, and resumes the operation of the reflection function (4).

In the embodiments of the present invention, (8) when a command is issued to execute the second restoration after executing (7-1) through (7-6), the controller executes the second restoration function for: (8-1A) maintaining the new journal data created in (7-5) out of the journal data items stored in the third volume, and nullifying all of the successive journal data items obtained after the designated second restoration point; and (8-2A) using the third difference bitmap as the first difference bitmap.

In the embodiments of the present invention, the first restoration point is selected from a period managed by each of the journal data items stored in the third volume.

In the embodiments of the present invention, the first restoration point or the second restoration point can be selected from either a first period, which is managed by each journal data item that is stored in the third volume before the execution of the second restoration and is stored in the third volume even after the execution of the second restoration, or a second period, which is managed by the new journal data stored in the third volume after the execution of the second restoration.

In the embodiments of the present invention, when a usage rate of the third volume reaches a first threshold value that is established beforehand, the reflection function (4) further reflects, in the second volume, journal data items obtained before a lapse of the targeted protection period, and the journal discarding function (5) discards the journal data items reflected in the second volume.

In the embodiments of the present invention, when the usage rate of the third volume reaches a second threshold value that is established beforehand, the controller sets limit to the amount of write requests to be issued from the host device to the first volume. For example, by delaying responses to the write requests, the amount of write requests to be issued from the host device can be reduced.

According to another aspect of the present invention, in a method for controlling a storage controller for storing data used by a host device, the storage controller having: a first volume that stores write data sent from the host device; a second volume to which a storage content of the first volume that is obtained at a predetermined time point is copied; a third volume that stores journal data created based on a write request targeted at the first volume; a plurality of first difference bitmaps, each of which manages, for each of a plurality of predetermined sections, a position at which a difference in storage contents occurs between the first volume and the second volume; and a controller for controlling the first volume, the second volume, the third volume, and each of the first difference bitmaps, wherein the controller executes a first control mode described hereinafter. The first control mode has the steps of: (1S) storing, in the second volume, the storage content of the first volume that is obtained at the predetermined time point; (2S) generating journal data items on the basis of write requests sent from the host device and causing the third volume to store the generated journal data items; (3S) causing one of the first difference bitmaps, which is selected for the each predetermined section, to store the position at which a difference is generated between the first volume and the second volume, on the basis of the write request issued from the host device after the predetermined time point; (4S) reflecting, in the second volume, predetermined journal data items that are obtained after a lapse of a pre-designated targeted protection period, out of the journal data items stored in the third volume; (5S) discarding the predetermined journal data items; and (6S) deleting a storage content of a predetermined first difference bitmap having all corresponding journal data items discarded, out of the first difference bitmaps, and reusing thus obtained first difference bitmap as a new first difference bitmap.

In the embodiments of the present invention, the controller executes a second control mode. The second control mode has, subsequently to (6S), the steps of: (7S) prohibiting the write request from being sent from the host device, and merging the storage contents of the first difference bitmaps to create a second difference bitmap when a first restoration point is designated and a command is issued to execute first restoration; (8S) copying the storage content of the second volume to the first volume on the basis of the created second difference bitmap, to thereby restore the storage content of the first volume to the predetermined time point; (9S) reflecting, in the first volume, journal data items obtained up to the first restoration point, out of the journal data items stored in the third volume, and thereby restoring the storage content of the first volume to the storage content obtained at the first restoration point; (10S) removing prohibition of the write request; (11S) causing the third volume to store new journal data that is created by removing prohibition of the write request; (12S) causing a third difference bitmap to store the position of the difference generated between the second volume and the first volume, the storage content of which is restored to the predetermined time point; (13S) maintaining the new journal data out of the journal data items stored in the third volume, when the first restoration point is determined to be the second restoration point, and nullifying all successive journal data items obtained after the determined second restoration point; (14S) using the third difference bitmap as the first difference bitmap; and (15S) reflecting, in the second volume, the predetermined journal data items that are obtained after a lapse of the targeted protection period.

In the embodiments of the present invention, the controller executes a third control mode when a command is issued to stop the execution of the first control mode. The third control mode has the steps of: (16S) stopping creation of the journal data that is performed based on the write request sent from the host device to the first volume; and (17S) causing a fourth difference bitmap to store a difference generated by the write request sent from the host device to the first volume.

In the embodiments of the present invention, the third control mode can further have the step of (18S) stopping reflecting, in the second volume, the predetermined journal data items obtained after a lapse of the targeted protection period.

According to yet another aspect of the present invention, an information processing system has: a first volume that stores write data sent from the host device; a second volume to which a storage content of the first volume that is obtained at a predetermined time point is copied; a third volume that stores journal data created based on a write request targeted at the first volume; a plurality of first difference bitmaps, each of which manages, for each of a plurality of predetermined sections, a position at which a difference in storage contents occurs between the first volume and the second volume; and a controller for controlling the first volume, the second volume, the third volume, and each of the first difference bitmaps, wherein the controller executes: (1) an initial copy function for storing, in the second volume, the storage content of the first volume that is obtained at the predetermined time point; (2) a journal generating function for generating journal data items on the basis of the write request sent from the host device and causing the third volume to store the generated journal data items; (3) a difference management function for causing one of the first difference bitmaps, which is selected for the each predetermined section, to store the position at which a difference is generated between the first volume and the second volume, on the basis of the write request issued from the host device after the predetermined time point; (4) a reflection function for reflecting, in the second volume, predetermined journal data items that are obtained after a lapse of a pre-designated targeted protection period, out of the journal data items stored in the third volume; (5) a journal discarding function for discarding the predetermined journal data items reflected in the second volume; and (6) a reusing function for deleting a storage content of a predetermined first difference bitmap having all corresponding journal data items discarded, out of the first difference bitmaps and reusing thus obtained first difference bitmap as a new first difference bitmap.

At least some of the sections, functions and steps of the present invention sometimes can be realized by a computer program. Such computer program is stored in, for example, a storage device, or distributed via a communication network.

BRIEF DESCRIPTION OF THE DRAWINGS

FIG. 3 is an explanatory diagram showing a general outline of a program configuration of the storage controller and the like;

FIG. 23 is an explanatory diagram showing a CDP configuration screen;

FIG. 24 is an explanatory diagram showing a recovery configuration screen;

DESCRIPTION OF THE PREFERRED EMBODIMENTS

Figure 1:
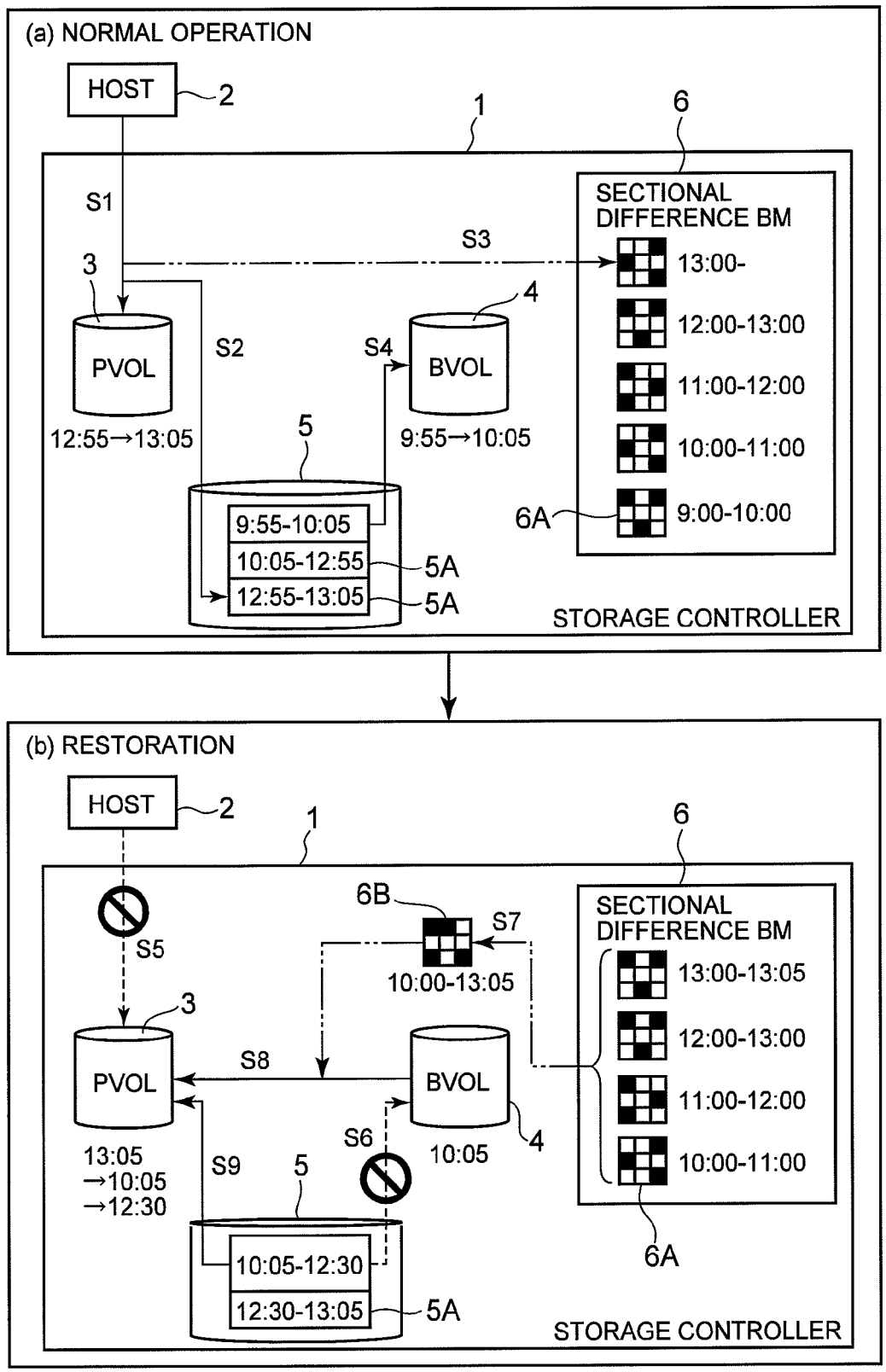
FIG. 1 is an explanatory diagram showing a simple outline of an embodiment of the present invention.

FIG. 1 is an explanatory diagram showing a general outline of an embodiment of the present invention. FIG. 1 shows a general outline of an information processing system that has a storage controller 1 according to the present embodiment. FIG. 1A shows a schematic operation performed during a normal operation, and FIG. 1B shows a schematic operation performed during restoration.

First, FIG. 1A is referenced. This information processing system has, for example, the storage controller 1 and a host 2. As is clear from the following embodiments, the information processing system can further have a management server 30 and a storage controller 40.

The storage controller 1 has a plurality of physical storage devices, such as a hard disk drive and a flash memory device. A physical storage area of each of these physical storage devices is virtualized, whereby a logical storage device is created. The logical storage device is called "logical volume" or "volume" hereinafter.

The storage controller 1 can further have, for example, a protection target volume ("PVOL" shown in the figures) 3, a base volume ("BVOL" shown in the figures) 4, a journal volume 5, and a sectional difference bitmap 6.

The protection target volume 3 is a volume in which storage contents thereof are continuously protected by journal data. A technology of continuously restoring data, which is stored in the protection target volume 3, at any restoration point that can be designated is called "CDP (continuous data protection)" in the present specification. Hereinafter, the protection target volume 3 is sometimes called "primary volume 3" for convenience of explanation.

The primary volume 3 is connected to the host 2 and stores data written from the host 2. The host 2 can write data into the primary volume 3 or read data from the primary volume 3. The base volume 4 stores the data that is stored in the primary volume at a predetermined time point. As described hereinafter, journal data items after a lapse of a targeted protection period are successively written into the base volume 4. Therefore, the base volume 4 stores storage contents that are obtained a predetermined time period (targeted protection period) earlier than a point of time when the latest storage content of the primary volume 3 is obtained. A past time point in the primary volume 3 that is shown by the base volume 4 is called "base point". The base point changes in accordance with passage of actual time. A change in the base point is sometimes called "base point shift".

A time difference between the storage content of the base volume 4 and the storage content of the primary volume 3 is not necessarily fixed, thus the time difference between the storage content of the base volume 4 and the storage content of the primary volume 3 sometimes changes.

The journal volume 5 is a volume for saving journal data 5A. The journal data 5A is the data for managing histories in which the primary volume 3 is updated by the host 2. Therefore, the journal data 5A can be called "update history management data", and the journal volume 5 can be called "update history management volume".

The sectional difference bitmap 6 is a difference bitmap which is prepared for each of predetermined sections that are configured beforehand. The sectional difference bitmap 6 manages the presence/absence of an update of the primary volume 3 in increments of a predetermined unit such as logical track units. A section can be defined according to time or the usage rate of the journal volume 5. Bit 1 is configured in an updated position, and bit 0 is configured in a position which is not updated. A bit that indicates a position where a difference is generated is called "difference bit".

In one example, a different difference bitmap 6A can be used every predetermined time ("one hour" in FIG. 1). Specifically, a difference bitmap 6A (9:00-10:00) can be used between 9 o'clock and 10 o'clock and the difference can be managed. Another difference bitmap 6A (10:00-11:00) can be used during a subsequent time period between 10 o'clock and 11 o'clock and the difference can be managed.

In another example, amount of accumulated journal data is separately managed after switching the difference bitmap 6A, and when the managed journal data amount becomes a predetermined percentage of the entire journal volume 5, switching is made to another difference bitmap 6A.

The targeted protection period means a period in which the storage content of the primary volume 3 can be restored, and is configured to, for example, "three hours" in advance. Basically, a time period in which the storage content of the primary volume 3 is actually protected matches the targeted protection period, but the targeted protection period sometimes does not match the actual protection period, as described in the following embodiments.

Journal data items 5A after a lapse of the targeted protection period are sequentially written to the base volume 4. Accordingly, the storage content of the base volume 4 are subsequently updated later than the storage content of the primary volume 3 by the targeted protection period.

The operation performed during normal operation is described. First, a user specifies the primary volume 3 to be protected and the targeted protection period. The storage controller 1 copies all data items stored in the primary volume 3 to the base volume 4. In the example shown in FIG. 1A, the data obtained at 9 o'clock is copied to the base volume 4. Specifically, FIG. 1A shows the case where the CDP start time shows 9 o'clock.

The host 2 accesses the primary volume 3 to read and write the data items. When a write data item that is transmitted from the host 2 is written to the primary volume 3 (S1), i.e., when a write request targeted to the primary volume 3 is issued from the host 2, the storage controller 1 creates a journal data item 5A on the basis of this write request. The generated journal data item 5A is saved in the journal volume 5 (S2).

It should be noted that there is a time where the host 2 writes data to the primary volume 3 during initial copying in which the storage contents existing in the primary volume 3 at a certain time point are copied to the base volume 4. Next is described a case in which the host 2 requests to write new data to an uncopied area where copying from the primary volume 3 to the base volume 4 is not completed.

In this case, for example, the storage controller 1 copies the data items stored in the uncopied area (old data items) to the base volume 4 from the primary volume 3, and then writes new data items from the host 2 to the primary volume 3.

In another example, there is a method for providing an attributed, such as "new data", to a write data item related to a new write request that is issued during the initial copying, and this new data is managed on a cache memory separately from the old data stored in the uncopied area. In this example, copying the old data from the primary volume 3 to the base volume 4 and processing of the write request issued from the host 2 (overwriting the new data) can be performed asynchronously. There is also another method.

A position at which the primary volume 3 is updated by the host 2 (for example, a logical track) is stored in the difference bitmap 6A, which is in charge of a period (section) included in the time of issuance of a write request (S3). When the first period taken in charge by the difference bitmap 6A elapses, the storage controller 1 switches the difference bitmap 6A to another new difference bitmap 6A to manage the position at which the primary volume 3 is updated by the host 2.

After the targeted protection period elapses since the CDP start time, the journal data items 5A after a lapse of the targeted protection period are written sequentially to the base volume 4 (S4). Specifically, when the current time passes 12 o'clock, the journal data items that are generated the targeted protection period (three hours) before the current time (12 o'clock) are written to the base volume 4 in the order of generation. The journal data items 5A written to the base volume 4 are discarded.

In the present specification, the operation of writing the journal data items 5A into the base volume 4 or the primary volume 3 and updating the storage content of the base volume 4 or the primary volume 3 is sometimes called "reflection" or "reflect".

FIG. 1 also shows a situation where more time elapses. When the current time shows "13:05", it means that the journal data items 5A created between "9:55" and "10:05" are saved for longer than the targeted protection period, thus these journal data items are written to the base volume 4. Therefore, the storage content of the base volume 4 match the storage content of the primary volume 3 obtained at "10:05", which is three hours before the current time. In this manner, at the time of the normal operation, the storage content of the base volume 4 are subsequently updated later than the storage content of the primary volume 3 by the targeted protection period.

Out of the sectional difference bitmaps 6A, sectional difference bitmaps 6A that are obtained by writing all self-managed journal data items 5A into the base volume 4 are reused after the storage contents there of are deleted. For example, when the current time is "13:05", the base point is "10:05" which is three hours before the current time. Each of the journal data items 5A, which is associated with the difference bitmap 6A (9:00-10:00) in charge of the section "9:00-10:00", is already written to the base volume 4.

Therefore, this difference bitmap 6A (9:00-10:00) is already used, and thus does not have to be saved. Therefore, the storage content of the difference bitmap 6A (9:00-10:00) are deleted and reused in order to manage another new sectional difference.

The operation of restoration is described with reference to FIG. 1B. For example, there is a possibility that errors occur in the storage content of the primary volume 3 due to a failure or an erroneous operation of the user that has occurred on an application program of the host 2.

When errors occur in the storage content of the primary volume 3, the user issues an instruction for restoring the storage content of the primary volume 3 until a desired time point. The user can select any time point within a protection period, as a restoration point (restoring point). In the example shown in FIG. 1B, the user can select any given point in time within the period between 10:05-13:05. Here, the user designates "12:30" as the restoration point.

When restoring the primary volume 3, access from the host 2 to the primary volume 3 is prohibited (S5). Specifically, the storage controller 1 returns an error to the host 2 when a write request is issued from the host 2. The user can also stop the host 2 prior to starting the restoration. Subsequent to S5, writing of journal data 5A to the base volume 4 is also stopped (S6). By stopping writing of the journal data 5A to the base volume 4, the period in which the restoration can be performed can be prevented from being reduced by a change of the base point. It should be noted that writing of the journal data 5A to the base volume 4 can also be stopped independently of the execution of restoration.

The storage controller 1 merges the storage contents of the sectional difference bitmaps 6A that exist at the time designated for the restoration, and thereby creates a difference bitmap 6B for differential copying (S7). Specifically, the storage controller 1 obtains a logical sum (OR) of the sectional difference bitmaps 6A and thereby obtains the difference bitmap 6B for differential copying. This difference bitmap 6B stores all positions that are updated between the base point and the current time.

The storage controller 1 uses the difference bitmap 6B for differential copying to differentially copy the data from the base volume 4 to the primary volume 3 (S8). More specifically, the storage controller 1 copies the data stored in the base volume 4 to the primary volume 3 only with respect to the position in which bit 1 is configured to the difference bitmap 6B.

The difference bitmap 6B for differential copying is used for executing restoration copying for matching the storage content of the primary volume 3 with the storage content of the base volume 4. Therefore, the difference bitmap 6B can also be called "difference bitmap for restoration copying".

Since only the updated data are copied from the storage contents obtained at the base point, the storage content of the primary volume 3 can be matched with the storage content of the base volume 4 faster than copying all data of the base volume 4 to the primary volume 3.

In this manner, the storage controller 1 first restores the storage content of the primary volume 3 to the storage content of the base point managed by the base volume 4 (S8), and then writes the journal data 5A obtained up to the designated restoration point to the primary volume 3 (S9). Accordingly, the storage content of the primary volume 3 is restored to the designated restoration point.

Thereafter, prohibition of the access from the host 2 to the primary volume 3 is removed. The host 2 accesses the primary volume 3 restored to the restoration point, and recovery processing that is required for the application program to use the primary volume 3 is executed. Examples of the recovery processing include execution of a fsck command on a file system, crash recovery processing on a DBMS (DataBase, Management System), rollforward processing and the like. After the recovery processing is ended, the user or application program checks whether the primary volume 3 has recovered to a state obtained immediately before the failure occurs. If recovery of the primary volume 3 is confirmed, the application program of the host 2 uses the primary volume 3. In the present specification, the recovery processing and confirmation of the recovery processing are sometimes integrally called "recovery".

The present embodiment is constituted as described above, thus the following effects can be achieved. In the present embodiment, during the normal operation, the journal data items 5A after a lapse of the targeted protection period are written to the base volume 4, whereby the storage contents of the base volume 4 can be subsequently transferred later than the storage contents of the primary volume 3 by the targeted protection period. Therefore, the base point, which is a starting point of a period in which restoration can be performed, can be caused to follow a certain time period later than the current time. Since the journal data items 5A that are written to the base volume 4 are discarded, the risk that the journal volume 5 is filled with the journal data items 5A can be reduced.

The present embodiment has a configuration in which the difference bitmaps 6A are allocated respectively to a plurality of predetermined sections, and the difference between the primary volume 3 and the base volume 4 is managed for each section. Therefore, after the journal data items 5A associated with the difference bitmaps 6A are all written to the base volume 4, the storage contents of the difference bitmaps 6A are deleted (zero-cleared) and reused. Accordingly, unwanted difference bitmaps 6A can be prevented from being remaining stored in the memory areas of the storage controller 1, and the memory areas of the storage controller 1 can be used efficiently.

On the other hand, there is considered a case in which one of the difference bitmaps is used via the whole sections, i.e., a case in which the difference between the primary volume 3 and the base volume 4 is managed by a single difference bitmap. In this case, once the difference bit is configured to bit 1, it cannot be changed to bit 0, and excess difference bits (bits that are configured to bit 1) are accumulated as time advances.

It is not a problem even when the difference bits corresponding to the journal data items 5A written to the base volume 4 are configured to bit "0", but thereafter different data may be written over the same place, thus the difference bit cannot be changed from bit 1 to bit 0.

Therefore, when a single difference bitmap is used, excess difference bits are accumulated as time advances, whereby the amount of data copied from the base volume 4 to the primary volume 3 at the time of restoration increases. As a result, the time required for restoring the storage contents of the primary volume 3 to the storage contents of the base point increases, and a long time is required for recovery. In the present embodiment, different difference bitmaps 6A are used for the sections respectively, thus unwanted difference bits can be prevented from being accumulated, the amount of copies at the time of restoration can be reduced, and the time required for recovery can be reduced. Moreover, in the present embodiment, the storage contents of the unwanted difference bitmaps 6A can be deleted and reused, thus the memory areas of the storage controller 1 can be used efficiently.

The storage controller 1 of the present embodiment is configured not only as shown in FIG. 1 but also as described in described in the following embodiments. Moreover, management of the journal data items 5A and management of the difference bitmaps 6A can be performed outside the storage controller 1. For example, the host 2 or another computer device connected to the host 2 can be configured to perform journal management and/or difference management. Hereinafter, the embodiments of the present invention are described in detail.

Embodiment 1

Figure 2:
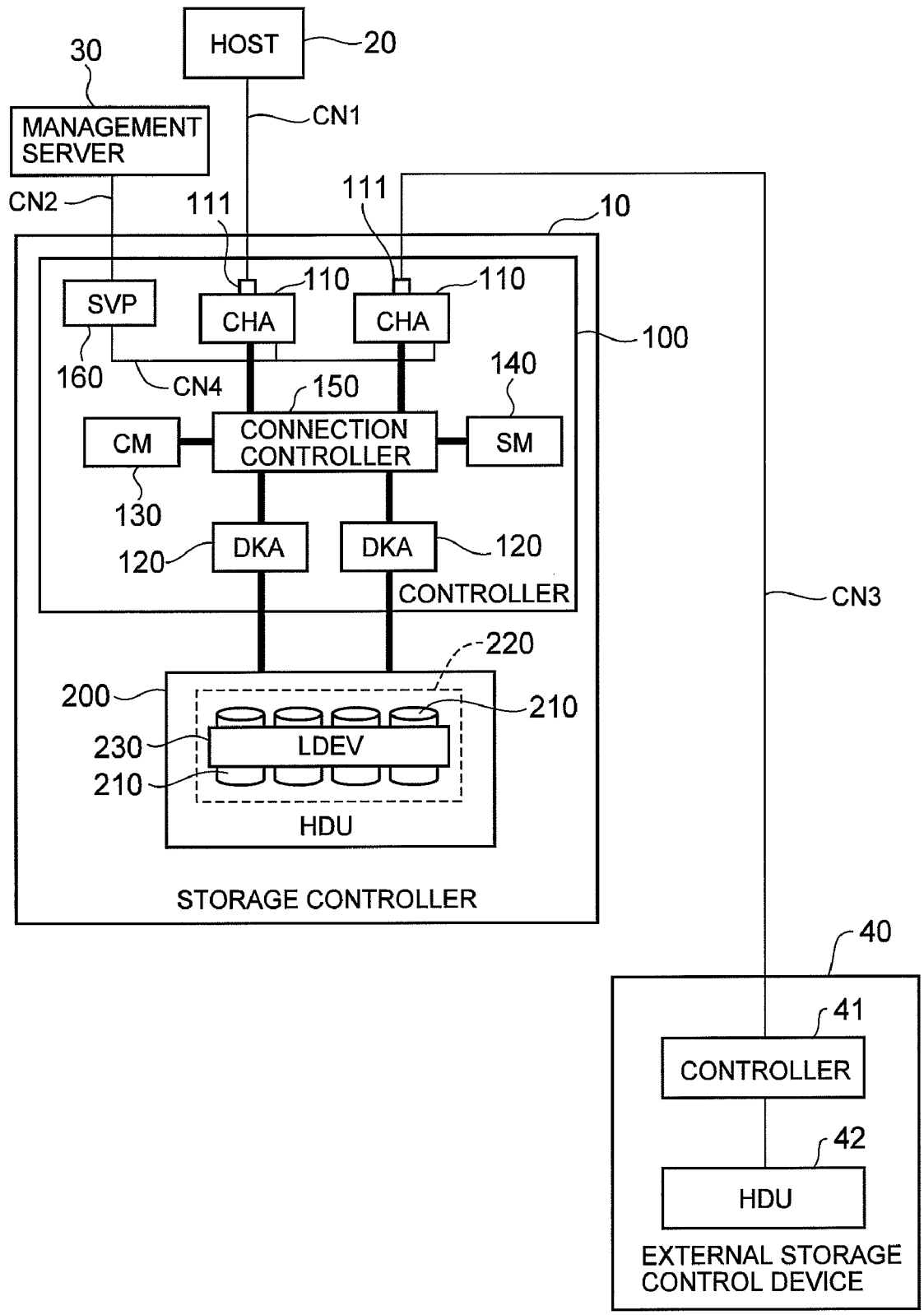
FIG. 2 is an explanatory diagram showing the entire configuration of an information processing system that has the storage controller according to the embodiment of the present invention.

FIG. 2 is an explanatory diagram that schematically shows a hardware configuration of an information processing system having a storage controller 10 according to the present embodiment. Before describing the present embodiment, the relationship between the embodiment shown in FIG. 1 and the following embodiment is explained.

The storage controller 10 as "storage controller" corresponds to the storage controller 1 shown in FIG. 1, and a host 20 as "host device" corresponds to the host 2 shown in FIG. 1. The management server 30 that can be expressed as "management device" is not illustrated in FIG. 1.

A primary volume 230P (see FIG. 4) as "first volume" corresponds to the primary volume 3 shown in FIG. 1. A base volume 230B (see FIG. 4) as "second volume" corresponds to the base volume 4 shown in FIG. 1. A journal volume 230J (see FIG. 4) as "third volume" corresponds to the journal volume 5 shown in FIG. 1.

Journal data JD (see FIG. 4) as "journal data" corresponds to the journal data 5A shown in FIG. 1. A sectional difference bitmap BM20 (see FIG. 4) as "first difference bitmap" corresponds to the sectional difference bitmap 6A shown in FIG. 1. A controller 100 as "controller" is not illustrated in FIG. 1.

Figure 4:
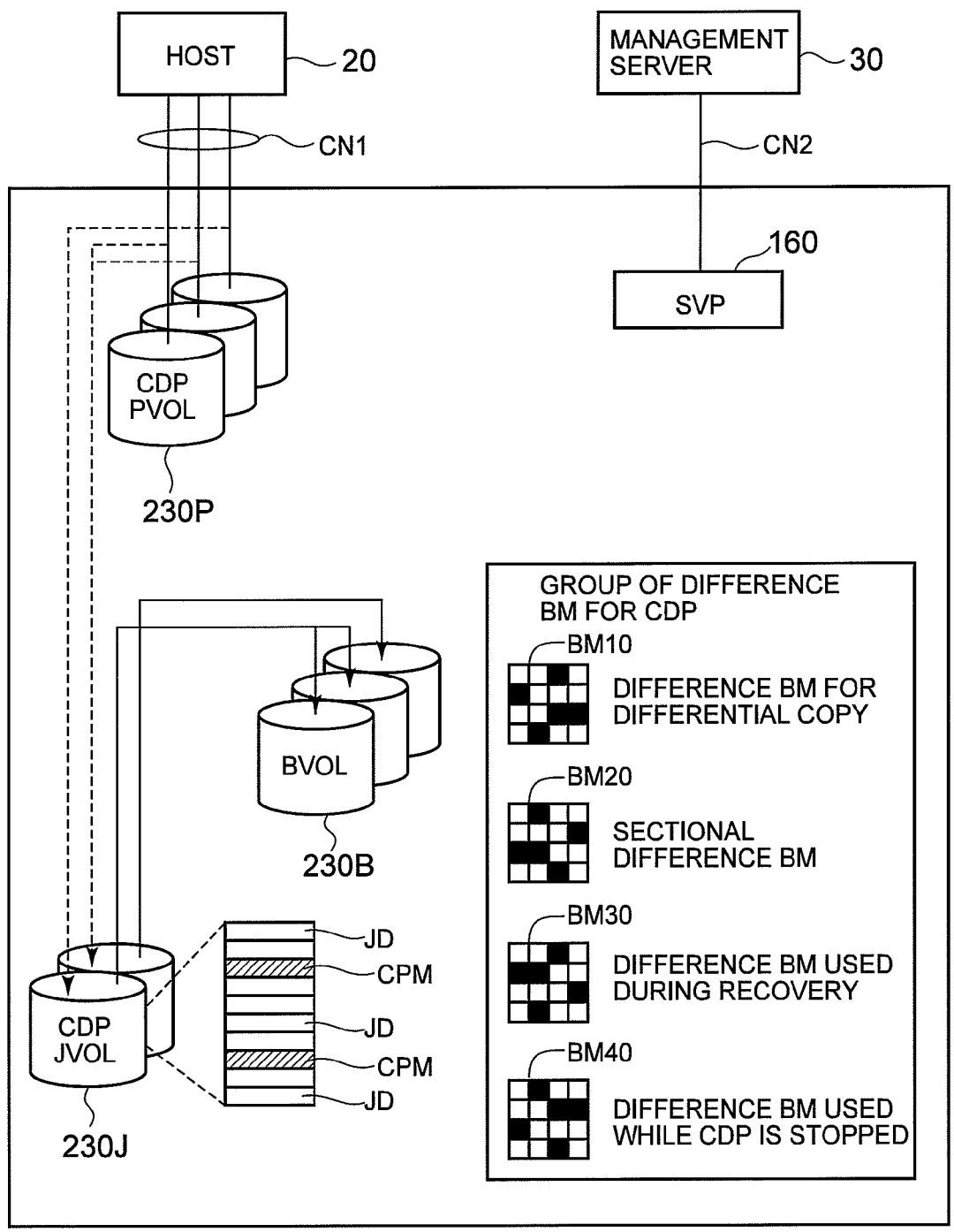
FIG. 4 is an explanatory diagram showing a general outline of a logical configuration of the storage controller.

A difference bitmap for differential copying (or a difference bitmap for initial copying) BM10 as "second difference bitmap" shown in FIG. 4 corresponds to the difference bitmap 6B shown in FIG. 1.

A recovering difference bitmap BM30 as "third difference bitmap" shown in FIG. 4 is omitted in FIG. 1. Similarly, a difference bitmap BM40 during stoppage of CDP as "fourth difference bitmap" is also omitted in FIG. 1.

Temporary restoration, which is described hereinafter, corresponds to "first restoration", and "complete restoration", which is also described hereinafter, corresponds to "second restoration".

Returning to FIG. 1, the host 20 and the storage controller 10 are connected to each other via a communication path CN1 such as a SAN (Storage Area Network) so as to be able to perform two-way communication. The host 20 is constituted as a computer device such as a server computer, mainframe computer, and workstation computer.

When the host 20 is a mainframe computer, data transfer is carried out in accordance with the communication protocols such as FICON (Fibre Connection™), ESCON (Enterprise System Connection™), ACONARC (Advanced Connection Architecture™), and FIBARC (Fibre Connection Architecture™).

Besides the above dedicated protocols, the host 20 and the storage controller 10 can perform data transfer by means of various communication protocols such as iSCSI (Internet Small Computer System Interface), TCP/IP (Transmission Control Protocol/Internet Protocol), and FCP (Fibre Channel Protocol).

The storage controller 10 can further play a role of managing the resources stored in the system, in an integrated fashion. For example, the storage controller 10 can have a function of virtualizing the physical storage resources existing in the system and providing them to the host 20. Specifically, the storage controller 10 makes itself seem to the host 20 that as if the storage controller 10 owns the storage resources of an external storage control device 40. In this manner, the storage controller 10 can have an aspect of a virtual device for virtualizing the storage resources existing in the system. Focusing on this aspect, the storage controller 10 does not have to be constituted as a disk array or the like, and thus can be constituted as another device such as a fibre channel switch.

The configuration of the storage controller 10 is described. The storage controller 10 can be roughly divided into a controller 100 and a storage device unit ("HDU", hereinafter). The controller 100 is for controlling the operation of the storage controller 10. The controller 100 is constituted by, for example, channel adopters ("CHA", hereinafter) 110, disk adopters ("DKA", hereinafter) 120, cache memory ("CM"

shown in the figure) 130, shared memory ("SM" shown in the figure) 140, a connection controller 150, and a service processor ("SVP", hereinafter) 160.

The CHA 110 is for controlling data communication between the CHA 110 and the host 20, and is constituted as a computer device having, for example, a microprocessor, local memory, and the like. Each CHA 110 has at least one communication port 111. Identification information such as WWN (World Wide Name) is configured in the communication port 111. When the host 20 and the storage controller 10 perform data communication by means of the iSCSI (Internet Small Computer System Interface) or the like, identification information such as an IP (Internet Protocol) address or the like is configured in the communication port 111.

FIG. 2 shows two types of CHA 110. One of the CHA 110 located on the left side of FIG. 2 is for receiving and processing a command sent from the host 20, and the communication port 111 thereof is constituted as a target port. The other CHA 110 located on the right side of FIG. 2 is for issuing a command to the external storage control device 40, and the communication port 111 thereof is constituted as an initiator port.

The DKA 120 is for controlling data communication performed between the DKA 120 and each of disk drives 210 within HDU 200, and is constituted as a computer device having a microprocessor and local memory, as with the CHA 110.

Each DKA 120 and each disk drive 210 perform data transfer in units of blocks in accordance with, for example, a fibre channel protocol. A path used by the controller 100 to access each disk drive 210 is made redundant. Even if a failure occurs in either one of the DKA 120 or in a communication path, the controller 100 can use the other DKA 120 or communication path to access the disk drive 210. Similarly, a path between the host 20 and the controller 100 and a path between the external storage control device 40 and the controller 100 can be made redundant.

The operations of the CHA 110 and DKA 120 are simply described. Once receiving a read command issued from the host 20, the CHA 110 causes the shared memory 140 to store the read command. The DKA 120 refers to the shared memory 140 as needed. When the DKA 120 discovers an unprocessed read command, the DKA 120 reads data from the disk drive 210 and causes the cache memory 130 to store the data. The CHA 110 reads the data moved to the cache memory 130, and transmits the data to the host 20.

Once receiving a write command issued from the host 20, the CHA 110 causes the shared memory 140 to store the write command. The CHA 110 causes the cache memory 130 to store the received write data. After causing the cache memory 130 to share the write data, the CHA 110 notifies the host 20 of completion of writing. The DKA 120 reads the write data stored in the cache memory 130, in accordance with the write command stored in the shared memory 140, and causes the disk drive 210 corresponding to a write-target volume 230P to store the write data.

The cache memory 130 is for storing the write data and the like received from, for example, the host 20. The cache memory 130 is constituted by, for example, nonvolatile memory. The shared memory 140 is constituted by, for example, nonvolatile memory. Control information, management information and the like are stored in the cache memory 140.

The shared memory 140 and the cache memory 130 can be provided on the same memory board. Alternatively, a part of each memory can be used as a cache area, and another part can be used as a control area.

The connection controller 150 is to connect each CHA 110, each DKA 120, the cache memory 130 and the shared memory 140. Accordingly, all CHA 110 and DKA 120 can access the cache memory 130 and the shared memory 140. It should be noted that the connection controller 150 can be constituted as, for example, a crossbar switch or the like.

The SVP 160 is connected to each CHA 110 via an internal network CN4 such as a LAN. Also, the SVP 160 can be connected to the management server 30 via a communication network CN2 such as a LAN. The SVP 160 collects various statuses of the storage controller 10 and provides these situations to the management server 30. It should be noted that the SVP 160 may be connected to both the CHA 110 and DKA 120. The SVP 160 can collect various status information items via the shared memory 140, thus it is only necessary to connect the SVP 160 to each CHA 110.

The configuration of the controller 100 is not limited to the above-described configuration. For example, one or a plurality of control boards may be provided with a function for performing data communication with the host 20, a function for performing data communication with the external storage control device 40, a function for performing data communication with disk drives 210, a function for temporarily saving data, and a function for rewritably saving configuration information and the like.

The configuration of the HDU 200 is described. The HDU 200 has a plurality of disk drives 210. Each of the disk drives 210 is realized as, for example, a hard disk drive, flash memory device, optical disk drive, magneto-optical disk drive, holographic memory device, or the like. In other words, the HDU 200 has a rewritable and nonvolatile storage device.

Although varying according to the RAID configuration or the like, for example, a pair of three, four, or predetermined number of disk drives 210 constitute a parity group 220. The parity group 220 is obtained by virtualizing a physical storage area possessed by each of the disk drives 210 within the parity group 220. A logical device (LDEV: Logical Device) 230 of a predetermined size or variable size can be configured in each physical storage area possessed by the parity group 220. The logical device 230 is associated with a LUN (Logical Unit Number) and is provided as a logical volume to the host 20. Hereinafter, the logical device 230 is called "logical volume 230" of "volume 230".

As with the storage controller 10, the external storage control device 40 has, for example, a controller 41 and an HDU 42. A logical volume is provided by using one or a plurality of disk drives that the HDU 42 has. Since the external storage device 40 exists outside the storage controller 10 in relation to the storage controller 10, it is called "external storage control device".

The logical volume possessed by the external storage control device 40 is mapped into an intermediate storage device provided virtually in the storage controller 10, and the logical volume 230 is logically configured on this intermediate storage age device, whereby the storage controller 10 incorporate therein and use the logical volume of the external storage control device 40.

The management server 30 is a device for managing the configuring, configuration and the like of the storage controller 10. The user uses the management server 30 to instruct the storage controller 10 to configure a volume to be targeted for CDP or to configure the targeted protection period. It should be noted that the function of the management server 30 may be provided within the host 20.

Figure 3:
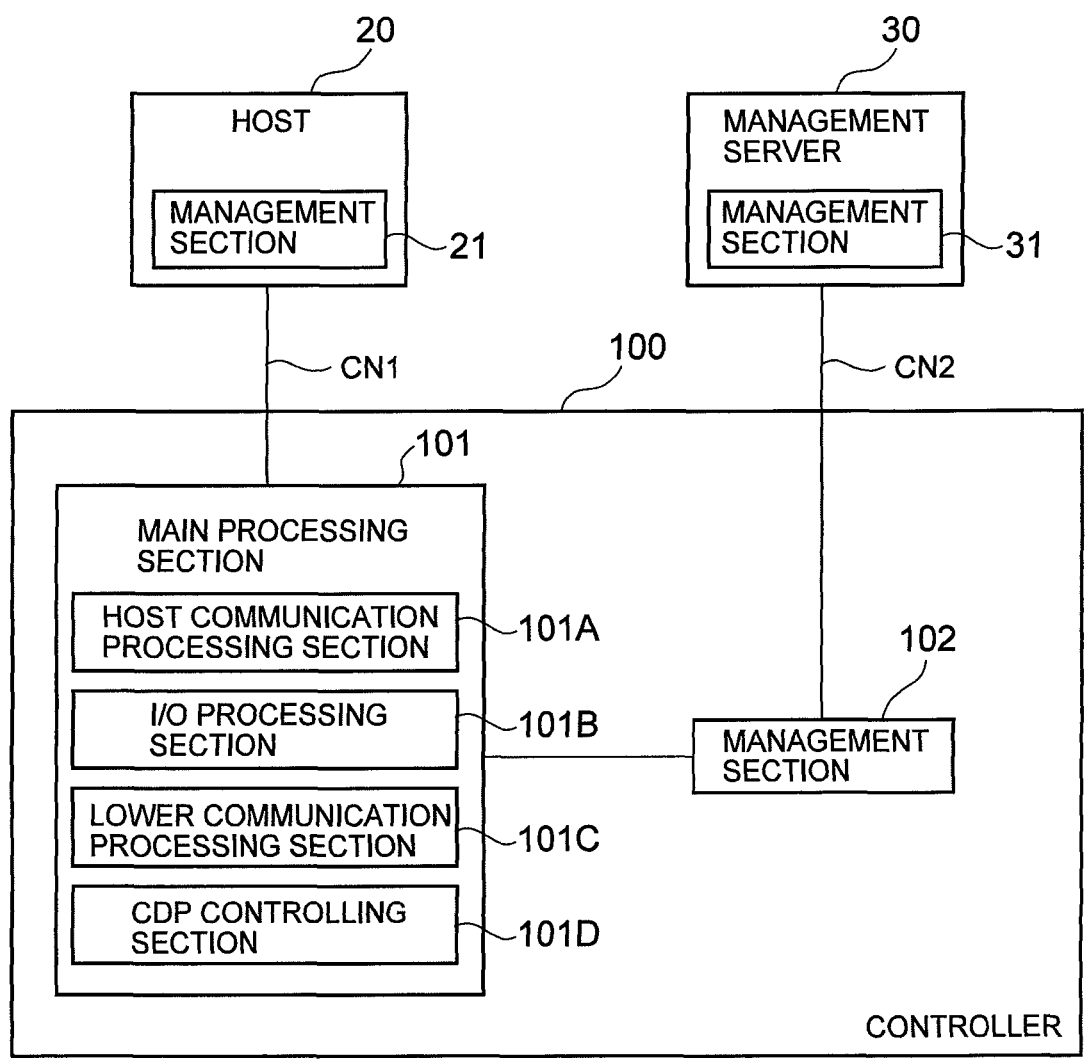

FIG. 3 is an explanatory diagram schematically showing a software configuration. The host 20 can be provided not only with an application program, which is not shown, but also, for example, a management section 21. The management section 21 is a program for performing various configurations related to CDP. The management server 30 is also provided with a management section 31 for performing various configurations related to CDP. As shown in FIG. 3, both the host 20 and the management server 30 may be configured so as to be able to change configurations of the storage controller 10, or one of them may be configured so as to be able to change configurations of the storage controller 10.

FIG. 4 is an explanatory diagram schematically showing a logical configuration of the storage controller 10. At least one of the plurality of types of volumes 230P, 230B, and 230J is provided within the storage controller 10. Each of these volumes 230P, 230B and 230J is created by virtualizing the physical storage area of the disk drive 210.

The primary volume 230P is a volume protected by a CDP function. The primary volume 230P is used by the host 20. The base volume 230B is a volume for maintaining the storage contents of the primary volume 230P that are obtained at a predetermined time point in the past. The journal volume 230J is a volume for storing journal data JD that is created when the primary volume 230P is updated.

It should be noted that the journal volume 230J can store a check point marker ("CPM", hereinafter). CPM is a data item that is used by the user or application program to explicitly instruct a restorable point in advance. Therefore, the user or application program can specify a restoration point by using either a time or CPM. The user can associate any information (e.g., label) with the CPM when configuring the CPM.

It should be noted that even when managing both CPM and journal dada JD together, the CPM can be searched promptly by storing a journal sequence number configured to the CPM. It should noted that the configured CPM can be deleted. For example, if there is an upper limit on the number of CPMs that can be configure, the user can specify a CPM number as the target of deletion, and thereby can delete the specified CPM.

The CPM number that is provided to the CPM may be specified manually by the user or specified automatically by the storage controller 10. When the user manually specifies the CPM number, the user previously acquires, for example, a list of CPM numbers that are being used, and selects an unused CPM number. If the CPM number selected by the use is being used, an error is returned. When the storage controller 10 automatically configures the CPM number, for example, the CPM numbers are used sequentially, starting from the unused numbers. If there are no unused numbers, an error is returned.

An example of operation of referencing the list of CPMs is described. The user can designate a CDP group to display the list of CPM numbers that are being used, on a management screen. The user can designate a desired CPM number from the displayed list and thereby can display detailed information of the designated CPM on the management screen. The detailed information can be, for example, the time at which the CPM is configured and the label provided to the CPM. The user can also delete the desired CPM from the list of CPMs.

In the present embodiment, one or a plurality of volumes 230P can be protected as the target of CDP. Specifically, only one volume 230P can be protected independently, or a plurality of volumes 230P can be grouped and protected entirely as a group. For example, a plurality of volumes 230P that store data items that are associated one another can be grouped, and protection operations of CDP can be synchronized.

The base volume 230B is associated with the primary volume 230P one-on-one. On the other hand, one journal volume 230J can be associated with each of the plurality of primary volumes 230P.

The storage controller 10 has a plurality of difference bitmaps BM10 through BM40. The difference bitmap BM10 for differential copying is used when differential-copying data from the base volume 230B to the primary volume 230P at the time of restoration. The BM10 can also be called "restoration copying difference bitmap".

It should be noted that the BM10 for differential copying can also be used when copying difference data from the primary volume 230P to the base volume 230B. Furthermore, the difference bitmap for initial copying, which is used when copying data from the primary volume 230P to the base volume 230B, and the difference bitmap for restoration copying, which is used when copying data from the base volume 230B to the primary volume 230P, can be prepared separately.

Moreover, it is possible to separately prepare a difference bitmap that is used for restoration copying in which the data is copied from the base volume 230B to the primary volume 230P, and a difference bitmap that is used for initial/resume copying (initial copying or resume copying) in which the data is copied from the primary volume 230P to the base volume 230B. By separately preparing the difference bitmaps used in both copying, restoration copying can be performed even if the initial/resume copying is not ended. Specifically, initial/resume copying and restoration copying can be executed simultaneously.

The difference bitmap used for restoration copying can be used for determining whether data copying from the base volume 230B to the primary volume 230P for restoration is completed in the areas where data copying from the base volume 230B to the primary volume 230P for initial copying or resume copying is completed.

The sectional difference bitmap BM20 manages the position of difference generated between the primary volume 230P and the base volume 230B, for each section that is configured beforehand. A time zone that is used by the sectional difference bitmap BM20 (e.g., a range of the journal sequence number) is managed as an attribute of the sectional difference bitmap BM20. The difference bitmap BM30 that is used during recovery is used for managing a difference generated during recovery. Even during recovery, there is a case in which the host 20 issues a write request, thus the difference between the primary volume 230P and the base volume 230B that is generated by the write request is stored by the difference bitmap BM30. The difference bitmap BM30 can also be called "recovering difference bitmap"

The difference bitmap BM40, which is used during stoppage of CDP, is used for managing a difference that is generated by a write request issued during the stoppage of CDP. This difference bitmap BM40 can be called "difference bitmap during stoppage of CDP".

Figure 5:
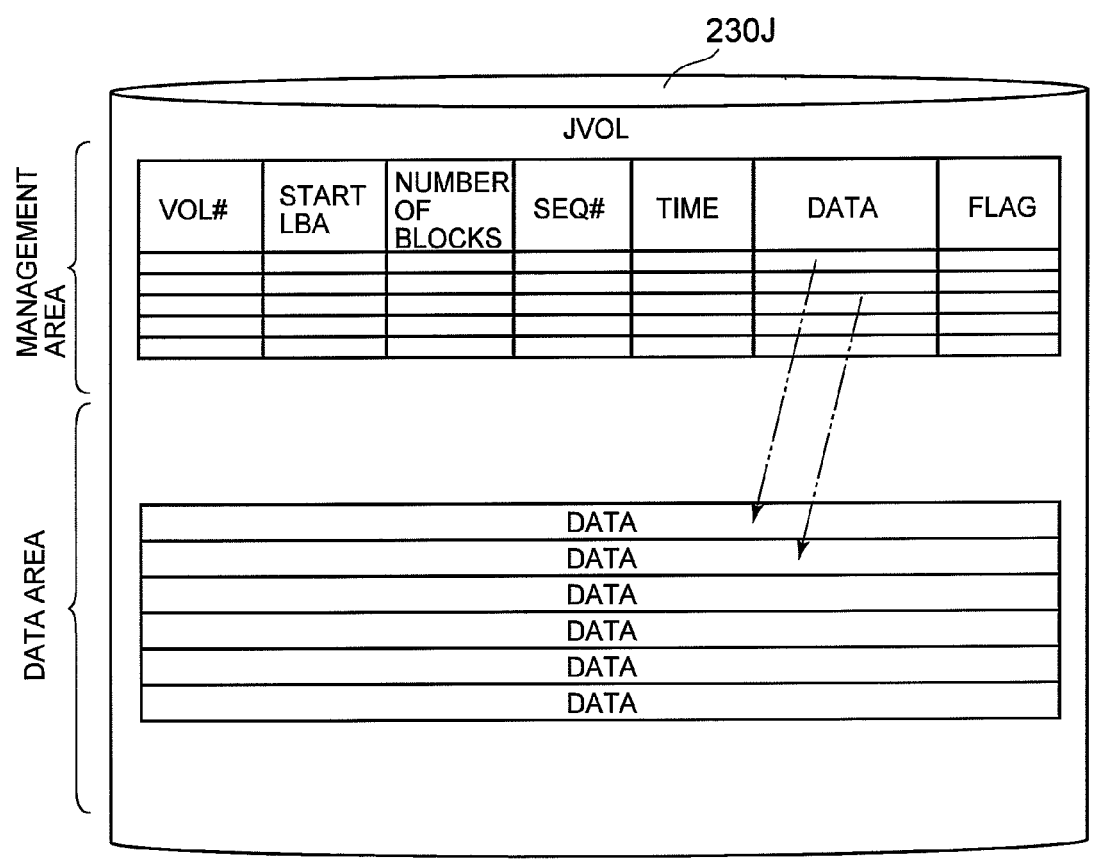
FIG. 5 is an explanatory diagram showing a general outline of a configuration of journal data.

FIG. 5 is an explanatory diagram schematically showing a storage configuration of the journal volume 230J. The storage area of the journal volume 230J is roughly divided into a management area and a data area. The management area sores data or CPM for managing the journal data JD. The data area stores the data itself of the journal data JD.

The examples of management data (metadata) include a volume number ("VOL #" in the figure), a start LBA, the number of blocks, a sequence number ("SEQ #" in the figure), time, data, flag, and the like.

"Volume number" is an information item for specifying the primary volume 230P. "Start LBA" is a logical block address that shows the beginning of write data written into the primary volume 230P. "The number of blocks" is an information item indicating the size of the write data. "Sequence number" is an identification number that is configured sequentially in the journal data JD. "Time" is the time at which a write request is issued. "Data" is a pointer indicating the position of the data itself. "Flag" is a control information item for showing whether the journal data JD is to be treated as valid data or nullified data. It should be noted that, in place of the flag for indicating validity or nullity of the journal data, for example, a method of separately managing a sequence number of the nullified journal data may be used. In this case, it is not necessary to rewrite the management data within the management area (metadata), thus the processing load can be reduced.

The journal data JD in which the value of the flag is configured to a valid value is written to the base volume 230B after a lapse of the targeted protection period. The journal data JD in which the value of the flag is configured to a nullified value is not written to the base volume 230B even after a lapse of the targeted protection period. Specifically, the nullified journal data JD is not the target of reflection processing. The reflection processing is for writing the journal data to a volume and updating the storage contents of the volume.

It should be noted that the CPM can be managed along with the management data managing the journal data JD, or can be managed in a different table.

Figure 6:
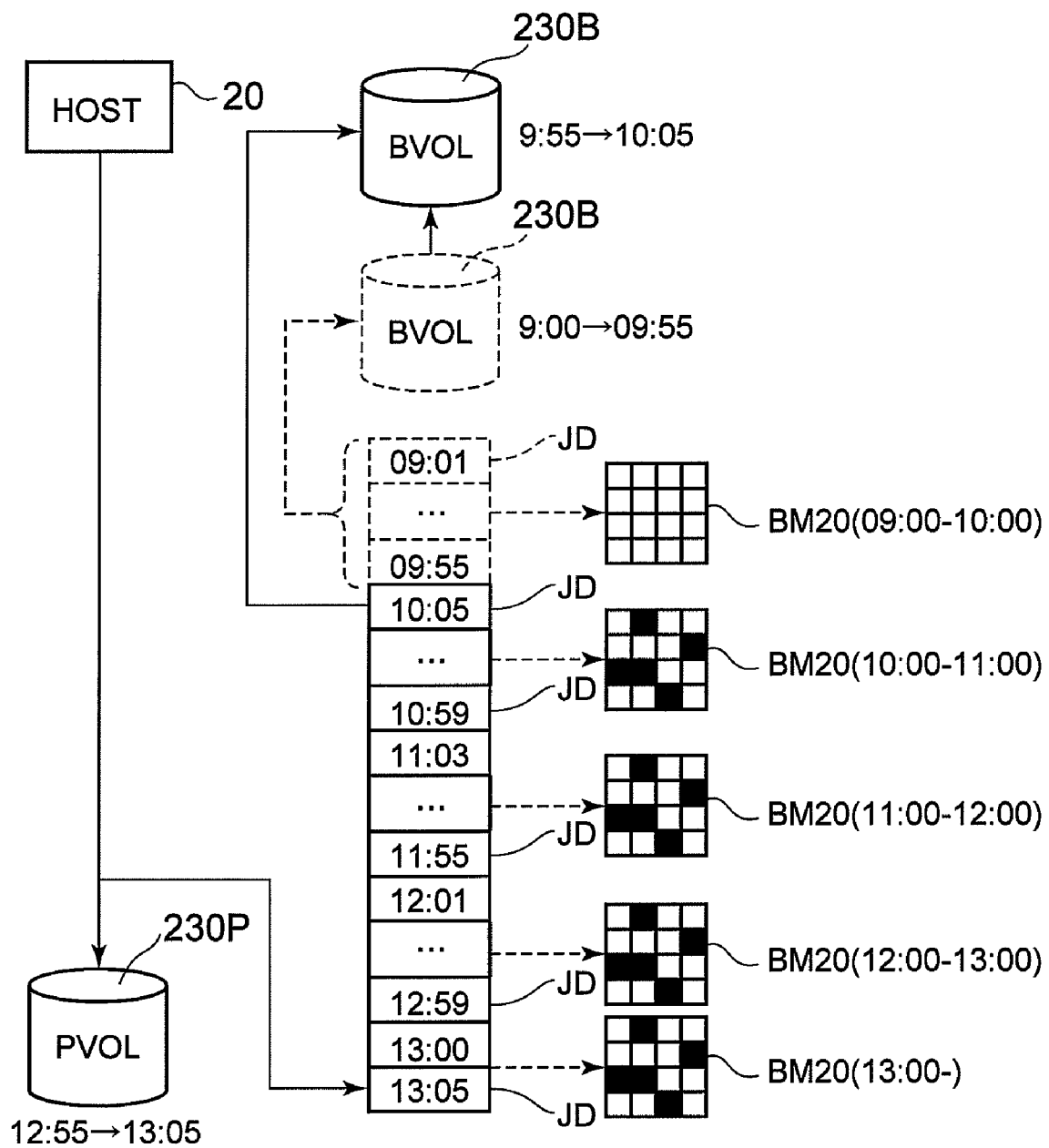
FIG. 6 is an explanatory diagram showing a situation in which a difference bitmap is switched in each section to manage the difference.

FIG. 6 is an explanatory diagram showing a method for using the sectional difference bitmap BM20. For example, one difference bitmap BM20 is used for each predetermined section, such as "one hour", that is configured in advance.

In the example shown in FIG. 6, a BM20 (09:00-10:00) is used in a section of "9:00-10:00", a BM20 (10:00-11:00) is used in a section of "10:00-11:00", a BM20 (11:00-12:00) is used in a section of "11:00-12:00", a BM20 (12:00-13:00) is used in a section of "12:00-13:00", and a BM20 (13:00-) is used in a section of "13:00-".

When the targeted protection period is configured to "three hours", the journal data JD after a lapse of three hours from a current time is written to the base volume 230B. The journal data JD written to the base volume 230B is discarded. It should be noted that the present embodiment describes the case in which the reflection processing is performed in accordance with elapsed time, but the reflection processing can be performed in accordance with, for example, the usage rate of the journal volume 230J, as described above.

When all journal data JD (09:01-09:55) managed in the difference bitmap BM20 (9:00-10:00) are written to the base volume 230B and discarded, this difference bitmap BM20 (9:00-10:00) is not required. This unnecessary difference bitmap BM20 is sometimes called "empty bitmap". Therefore, the storage contents of the difference bitmap BM20 (09:00-10:00) are deleted, and this difference bitmap is reused as another difference bitmap BM20 for managing another new section (14:00-15:00).

It should be noted that the targeted protection period TPT can be changed during the normal operation. For example, when the targeted protection period is extended during the normal operation, the reflection processing is stopped until the journal data JD for the extended time period is accumulated in the journal volume 230J. During a period in which the reflection processing is stopped, the empty bitmap (the difference bitmap BM20 in which all journal data managed by the bitmap is subjected to the reflection processing) is not generated. Also, by extending the targeted protection period, the timing for switching the sectional difference bitmap BM20 is changed.

As a first method, there is a method of continuing to use the sectional difference bitmap BM20 that is presently used, until the empty bitmap is generated.

As a second method, there is a method of selecting two oldest sectional difference bitmaps BM20, merging the selected sectional difference bitmaps BM20 to form one sectional difference bitmap BM20, and thereby generating one empty bitmap.

As a third method, there is a method of obtaining an empty bitmap by collecting a predetermined number of sectional difference bitmaps BM20 to form one difference bitmap BM20 in accordance with how much the targeted protection period TPT is extended. For example, when the targeted protection period TPT doubles (TPT=2×TPT), sectional difference bitmaps BM20 each having two faces are merged to form one difference bitmap, and when the targeted protection period TPT triples (TPT=3×TPT), sectional difference bitmaps BM20 each having three faces are merge to form one difference bitmap. When the targeted protection period TPT becomes 1.5 times larger (TPT=1.5×TPT), the sectional difference bitmaps BM20 each having two surfaces out of the sectional difference bitmaps BM20 each having three surfaces are merged to form one difference bitmap, and the remaining sectional difference bitmap BM20 is remained as it is.

Here, it is preferred that the number of sectional difference bitmaps BM20 to be prepared be larger by two than the number of sections. Specifically, when managing the difference inn sections, the total number of difference bitmaps BM20 is preferably configured to n+2. Some processing time periods are required in order to delete and reuse the reason that the oldest difference bitmaps BM20. In order to securely mange a write request issued at the switching timing of the difference bitmaps BM20, the number of difference bitmaps BM20 to be prepared is preferably larger by two than the number of sections.

As shown by the dashed lines in FIG. 6, the journal data JD (09:01-09:55) within a section managed by the difference map BM20 (09:00-10:00) is written entirely into the base volume 230B. Accordingly, the storage contents of the base volume 230B match the storage contents of the primary volume 230P at the time of "09:55". Thereafter, the time passes and becomes "13:05", the journal data JD existing until "10:05", which is three hours before "13:05", is written into the base volume 230B. Accordingly, the storage contents of the base volume 230B match the storage contents of the primary volume 230P at "10:05".

In this manner, the storage contents of the base volume 230B can be caused to follow the corresponding storage contents of the primary volume 230P the targeted protection period later. Specifically, the time of the storage contents shown by the base volume 230B (this time is called "base point") is shifted as the actual time advances. The base point indicates a starting point of a period in which the storage contents of the primary volume 230P can be restored. The CDP function is not sufficient to trace back to the past from the base point to restore the storage contents of the primary volume 230P. It should be noted that when writing the journal data JD into the base volume 230B is stopped, shifting of the base point is also stopped.

Figure 7:
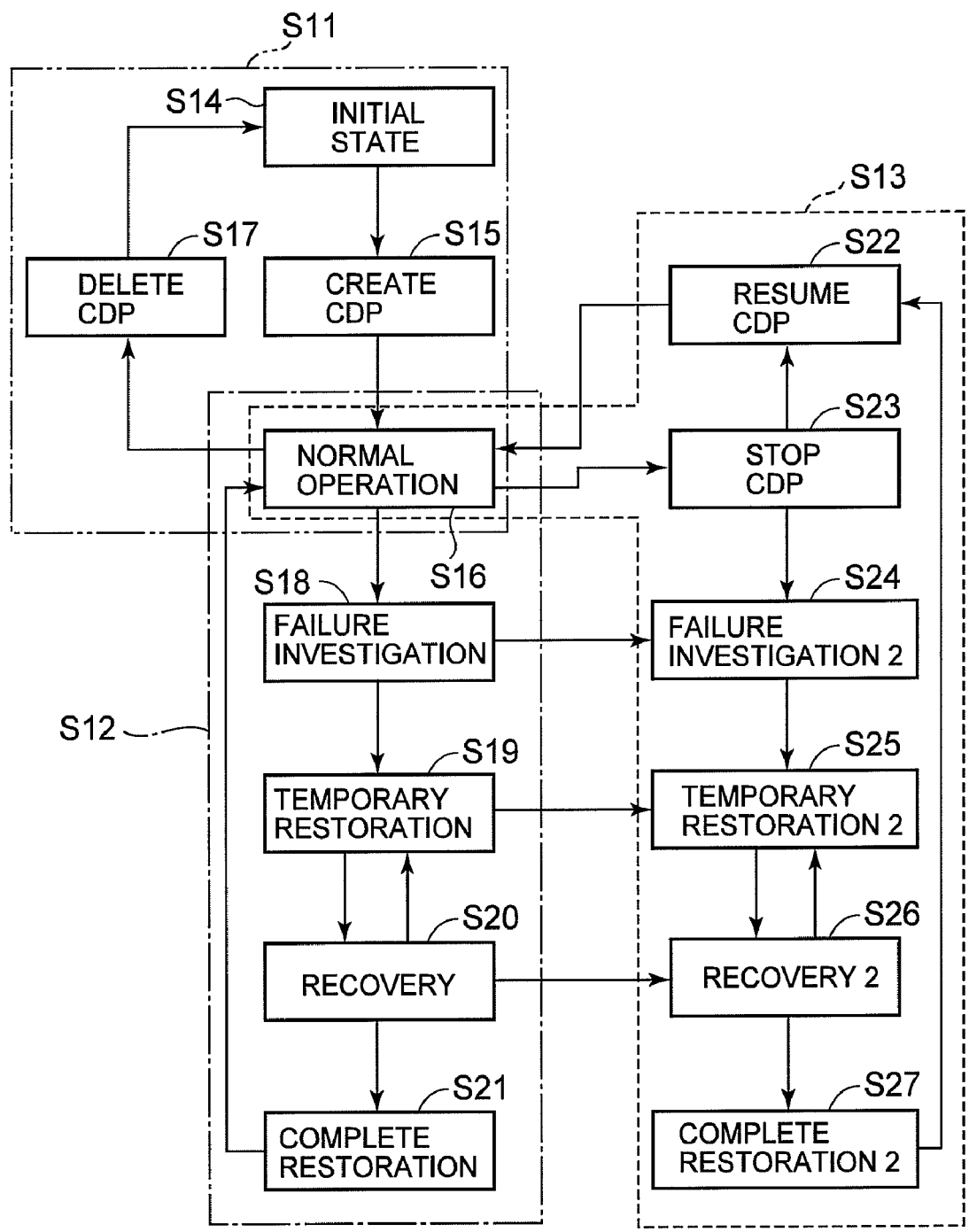
FIG. 7 is an explanatory diagram showing a transition of a control mode.

FIG. 7 is an explanatory diagram showing a control mode executed by the storage controller 10. The storage controller 10 has, for example, a CDP formation and CDP delete mode (S11), a recovery mode (S12), and a CDP stoppage and CDP resume mode (S13), as described hereinafter. Here, S16 described hereinafter corresponds to "first control mode", S18, S19, S20 and S21 each corresponds to "second control mode", and S23 corresponds to "third control mode".

An overview of the CDP formation and CDP delete mode (S11) is described. The detail thereof is described with reference to FIG. 8 hereinafter. The CDP formation and CDP delete mode (S11) starts from an initial state (S14), forms CDP (S15), and performs the normal operation processing (S16).

Creating a CDP means the processing of specifying the primary volume 230P to be protected by the CDP, and copying the data stored in the primary volume 230P to be protected, to the base volume 230B. Specifically, S15 is the processing of adjusting the environment for using the CDP function.

In the normal operation processing (S16), the journal data JD are created every time when a write request is issued from the host 20, and the created journal data JD are stored in the journal volume 230J. Then, in the normal operation processing (S16), the journal data JD after a lapse of the targeted protection period are written to the base volume 230B, whereby the storage content of the base volume 230B is updated and the base point is shifted.

When canceling the CDP function, CDP delete processing (S17) is executed. In the CDP delete processing (S17), an attribute called "target to be protected by CDP", which is configured in the primary volume 230P, is canceled, to return the primary volume 230P to the normal volume. The base volume 230B forming the copy pair with this primary volume 230P is also returned to a normal volume. Also in the CDP delete processing (S17), the journal data JD related to the primary volume 230P in which the CDP function is canceled are discarded.

It should be noted that update histories of a plurality of primary volumes 230P can be managed by one journal volume item 230J. In this case, even if the CDP related to one primary volume 230P is canceled, the journal data JD within the journal volume 230J cannot be discarded. In this case, the journal data JD related to the deleted CDP is nullified without being discarded. Specifically, the journal data JD related to the deleted CDP is treated as nullified data. Whether the journal data JD is nullified or not may be managed using a flag within the management data or may be managed using the sequence number of the journal data.

For example, in the case in which the plurality of primary volumes 230P share an area provided across a plurality of journal volumes 230J, and the update history of different primary volumes 230P are randomly written to the journal volumes 230J, even if the CDP related to one of the primary volumes 230P is deleted, the journal data JD related to the deleted CDP cannot be discarded. This is because the journal data items JD related respectively to the primary volumes 230P exist together in the journal area. Therefore, in this case, the journal data item JD related to the deleted CDP is nullified.

On the other hand, when the journal volume 230P and the primary volume 230P are associated with each other one-on-one, when the CDP related to the primary volume 230P is deleted the journal volume 230J associated with this primary volume 230P is returned to an unused volume.

The recovery mode (S12) is described. When some kind of a failure occurs during the execution of the normal operation processing (S16), this failure is recognized by the user or application program and then subjected to failure investigation (S18). In order to avoid failures, the user executes temporary restoration (S19) and recovery (S20) at least once.

Temporary restoration (S19) is the processing of temporarily restoring the storage content of the primary volume 230P, which is the target to be protected by CDP, to the storage content obtained at the restoration point designated by the user. Recovery (S20) is the processing of bringing the application program to an available state by subjecting the restored primary volume 230P to fsck processing or the like.

When it is confirmed that the recovery is completed normally, the user directs the execution of complete restoration (S21). Complete restoration (S21) is the processing of determining the recovered storage content. Then, after the complete restoration (S21) is ended, the processing is shifted to the normal operation processing (S16).

It should be noted that the complete restoration can be executed directly without executing temporary restoration and the restoration. In this case, the journal data JD of after the restoration point is nullified once the temporary restoration is completed, and the update position generated after restoration is managed by the sectional difference bitmap BM20 in place of the restoring difference bitmap BM30.

The temporary restoration can also be canceled. In the case in which a command for canceling the temporary restoration is issued, for example, the temporary restoration is executed again until at the point of time when the temporary restoration is started (at the point of time when acceptance of a write request is prohibited), and then the complete restoration is executed. Accordingly, the temporary restoration that is directed once is canceled, so that the state can be returned to a state for directing the execution of temporary restoration.

The difference bitmap BM10 for differential copying, which is used when executing the temporary restoration again, can be obtained by merging the sectional difference bitmaps BM20 obtained between the base point and the restoration point before re-executing the temporary restoration, with the recovering difference bitmap BM30.

The CDP stoppage and CDP resume mode (S13) is described. The CDP stoppage and CDP resume mode (S13) is executed when some kind of a failure occurs during the execution of the CDP function. For example, when the frequency at which the host 20 write-accesses the primary volume 230P is high and the journal volume 230J becomes full, the CDP stoppage and CDP resume mode (S13) is executed.

In the CDP stoppage processing (S23), even when the host 20 write-accesses the primary volume 230P, creation of a new journal data item JD is stopped, and the process of writing the journal data JD accumulated in the journal volume 230J to the base volume 230B is stopped (reflection processing). Thereafter, as with S18 through S21 described above, the failure investigation (S24), temporary restoration (S25), recovery (S26), and complete restoration (S27) are executed. Once the failure is fixed, the user can start CDP (S22). In the CDP resume processing (S22), the storage content of the primary volume 230P, which is obtained at the point of time designated for resumption, is copied to the base volume 230B, and the old journal data items JD accumulated before stopping the CDP are discarded.

It should be noted that the CDP stoppage processing (S23) and the reflection processing do not have to be stopped relative to each other. Only the reflection processing can be stopped independently of the stoppage of the CDP. Also, even when stopping the CDP, sometimes the reflection processing needs to be stopped.

The CDP can be resumed without performing recovery after stopping the CDP. Recovery may be performed when a failure occurs.

Figure 8:
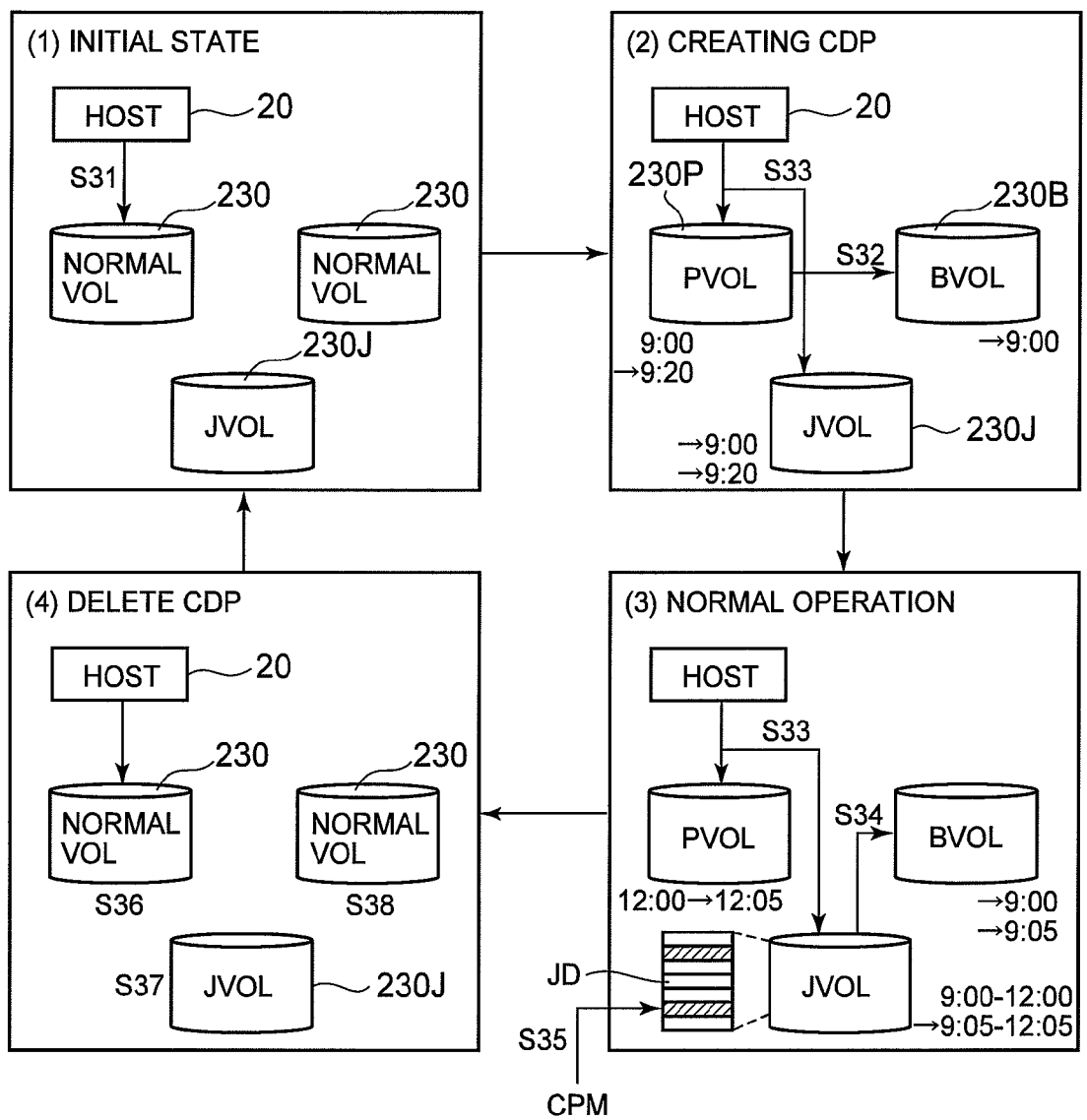
FIG. 8 is an explanatory diagram showing a flow of processing in which the storage controller is shifted from an initial state to an operation state where CDP is created and thereafter CDP is deleted.

FIG. 8 is an explanatory diagram schematically showing a flow of processing of the CDP formation and CDP delete mode (S11). In the initial state shown in FIG. 8(1), the CDP function is not activated, and the host 20 accesses a normal volume 230 (S31).

In the CDP formation state shown in FIG. 8(2), the attribute of the normal volume 230 is changed to the primary volume 230P protected by CDP, while an attribute of another normal volume 230 is changed to the base volume 230B.

The storage controller 10 copies all storage contents of the primary volume 230P to the base volume 230B (S32). Accordingly, the storage contents of the base volume 230B match the storage contents of the primary volume 230P obtained at the time at which the CDP is started. The base point becomes the CDP start time ("09:00" in the example shown in FIG. 8). The storage controller 10 creates journal data JD and stores it in the journal volume 230J when the primary volume 230P is updated by the host 20 (S33). It should be noted that when the host 20 attempts to write data to uncopied area where copying from the primary volume 230P to the base volume 230B is not completed, during copying from the primary volume 230P to the base volume 230B, the data stored in this uncopied area are copied from the primary volume 230P to the base volume 230B, and then a write request is accepted from the host 20.

In the normal operation state shown in FIG. 8(3), the storage controller 10 writes a journal data item JD obtained after a lapse of the targeted protection period out of the journal data items JD stored in the journal volume 230J, to the base volume 230B. Specifically, the journal data JD obtained after a lapse of the targeted protection period is reflected in the base volume 230B, and the base point is changed. The journal data item JD written to the base volume 230B is discarded.

In CDP the journal data JD are automatically created and accumulated every time when a write request is issued from the host 20. Therefore, the user can restore the storage content of the primary volume 230P in units of issued write requests (in units of journal data). Furthermore, the user or application program specifically directs insertion of CPM to thereby prepare an arbitrary restorable point in advance (S35). When an effective CPM exists, the user or application program can designate the effective CPM, to thereby restore the storage content of the primary volume 230P to a desired time point.

In the normal operation state, one difference bitmap BM20 manages the difference between the primary volume 230P and the base volume 203B for each of the predetermined sections.

In the CDP delete state shown in FIG. 8(4), the storage controller 10 changes the primary volume 230P that is configured to the target to be protected by the CDP to the normal volume 230 (S36), and changes the base volume 230B to the normal volume 230 (S38). Also, the storage controller 10 nullifies the journal data item JD stored in the journal volume 230J (S37). Consequently, the storage controller 10 returns to the initial state.

Nullifying the journal data item JD means that the journal data JD acquired with respect to the primary volume 230P to be changed to the normal volume 230 is treated as nullified journal data. The nullified journal data JD is considered as exempt from the reflection processing. Whether the journal data is valid or not is indicated by the flag for managing journal data JD, which is included in the journal data. In the case in which one journal volume 230J is associated with a plurality of primary volumes 230P, the journal data items JD related to the respective primary volumes 230P exist together in the journal volume 230J. Therefore, when the journal data JD obtained after a certain time point cannot be discarded, the journal data JD is nullified without being discarded.

Figure 9:
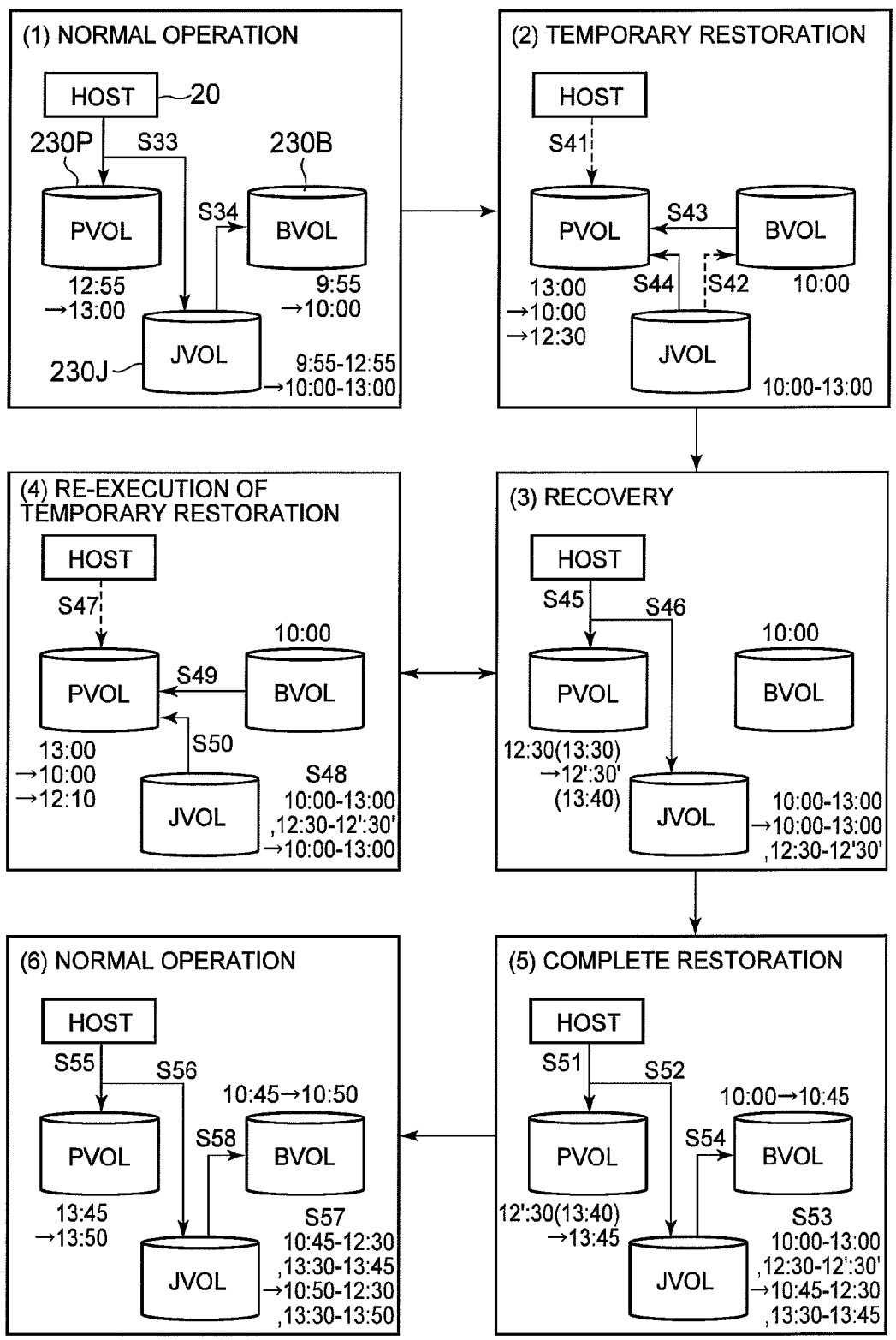
FIG. 9 is an explanatory diagram showing a flow of processing performed when temporary restoration and complete restoration are performed.

FIG. 9 is an explanatory diagram schematically showing a flow of processing of the recovery mode (S12). When some kind of a failure occurs during the normal operation shown in FIG. 9(1), this failure is detected by the user or application program.

The state of the storage controller is shifted from the normal operation state to a temporary restoration state shown in FIG. 9(2). When shifting to the temporary restoration state, access from the host 20 to the primary volume 230P is prohibited (S41). Even when there exists journal data JD obtained after a lapse of the targeted protection period, the storage controller 10 stops the processing of writing the journal data JD to the base volume 230B (S42). Specifically, the storage controller 10 stops reflection of the journal data JD and keeps the current base point. In FIG. 9, the current base point is "10:00".

The storage controller 10 uses the difference bitmap BM10 for differential copying to differentially copy the storage content of the base volume 230B to the primary volume 230P (S43). Accordingly, the storage content of the primary volume 230P is restored to the base point kept in the base volume 230B.

The storage controller 10 sequentially reads journal data items JD obtained up to the specified restoration point, out of the journal data items stored in the journal volume 230J, and writes the read journal data items JD to the primary volume 230P (S44). Accordingly, the storage contents of the primary volume 230P are stored to the specified restoration point. FIG. 9 shows a state in which "12:30" is specified as the restoration point.

In the recovery state shown in FIG. 9(3), prohibition of write access from the host 20 to the primary volume 230P is removed (S45), and the data items for confirming recovery contents are inputted from the host 20 to the storage controller 10. The storage controller 10 creates journal data JD on the basis of write data issued after recovery, and stores this journal data JD in the journal data volume 230J (S46).

By removing prohibition of write access from the host 20, the storage contents of the primary volume 230P and the storage contents of the journal volume 230J are updated. In FIG. 9(3), the storage contents of the primary volume 230P that are obtained immediately after recovery are restored to the time point of "12:30", but the actual time is "13:30".

Moreover, the storage contents of the primary volume 230P are changed to a certain degree from the storage contents obtained at "12:30". This change is indicated as "12':30'" in FIG. 9(3). The values in the quotation marks indicate the actual time.

In the journal volume 230J, originally the journal data items JD created within a period between "10:00-13:00" are accumulated. In addition to the existing journal data items (10:00-13:00), journal data items created after recovery (12:30-12':30') are also accumulated in the journal volume 230J due to write access made after recovery.

As shown in FIG. 9(4), the user, who is not satisfied with the recovered contents, can specify another restoration point and execute the temporary restoration again. In the re-execution of temporary restoration, as with the temporary restoration described in FIG. 9(2), access from the host 20 to the primary volume 230P is prohibited (S47), and the journal data items JD obtained after recovery (12:30-12':30'), which are acquired in FIG. 9(3), are discarded (S48). Then, the storage controller 10 copies the difference between both volumes 230P and 230B from the base volume 230B to the primary volume 230P (S49). The storage controller 10 writes the journal data items JD to the primary volume 230P sequentially until the storage contents of the primary volume 230P match the storage contents obtained at the restoration point (12:10) that is specified again (S50).

It should be noted that when one journal volume 230J is associated with a plurality of primary volumes 230P, and when restoration is performed on one of the primary volumes 230P, the journal data JD cannot be discarded when re-executing the temporary restoration. In this case, the journal data JD are nullified. When the journal volume 230J and a primary volume 230P are associated with each other one-on-one, or when restoration is executed integrally on the groups, the journal data JD can be discarded.

For example, in the case in which the plurality of primary volumes 230P share an area provided across a plurality of journal volumes 230J, and the update history of different primary volumes 230P are randomly written to the journal volumes 230J, when restoration is performed on one of the primary volumes 230P, the journal data JD related to the primary volume 230P to be restored cannot be discarded. This is because the journal data items JD related respectively to the primary volumes 230P exist together in the journal area. Therefore, in this case, the journal data item JD related to the primary volume 230P to be restored is nullified.

The user can repeat the recovery shown in FIG. 9(3) and the re-execution of temporary restoration shown in FIG. 9(4) a number of times. Accordingly, the user detects a desired time point. Then, the user who has discovered a desired time point instructs the storage controller 10 to execute complete restoration. In FIG. 9, "12:30" is selected as the desired time point.

In the complete restoration shown in FIG. 9(5), the recovered storage contents are determined, and prohibition of access from the host 20 is removed (S51). In FIG. 9(5), the storage contents of the primary volume 230P are changed to the contents obtained at "13:45". The journal data items that are obtained at a time earlier than the current time by the targeted protection period (the journal data items obtained between "10:00-10:45" in the example of FIG. 9(5)) JD are written to the base volume 230B and thereafter discarded (S52). It should be noted that resumption of the reflection processing can be performed separately from the complete restoration. Specifically, when, for example, the reflection processing is resumed immediately after the execution of complete restoration, the protection period is reduced, thus the time for resuming the reflection processing is sometimes delayed.

The range of the journal data items JD saved in the journal volume 230J changes from "10:00-13:00, 12:00-12':30'" to "10:45-12:30, 13:30-13:45" (S53). The journal data items (12:30-12':30') that area created from recovery confirmation are discarded when the complete restoration is executed. The journal data items (12:30-13:00) obtained after the determined restoration point (12:30) out of the journal data items (10:00-13:00) accumulated before recovery are also discarded by the execution of the complete restoration.

Therefore, in the journal volume 230J, the journal data items JD within the range of "10:45-12:30" and the journal data items JD within the range of "13:30-13:45" are stored. Specifically, the period in which recovery is made possible by CDP is divided into two periods: a first period (10:45-12:30) existing from before recovery and a second period (13:30-13:45) generated after recovery.

After completion of the complete restoration, the state of the storage controller 10 is shifted to the normal operation state shown in FIG. 9(6). In the normal operation state, the storage controller 10 creates journal data JD on the basis of a write access from the host 20 to the primary volume 230P (S55) as described above, and stores the created journal data JD in the journal volume 230J (S56). The storage controller 10 stores the journal data items JD of the targeted protection period in the journal volume 230J (S57), and writes the journal data items JD obtained after a lapse of the targeted protection period to the base volume 230B (S58). The journal data JD reflected in the base volume 230B are discarded.

Figure 10:
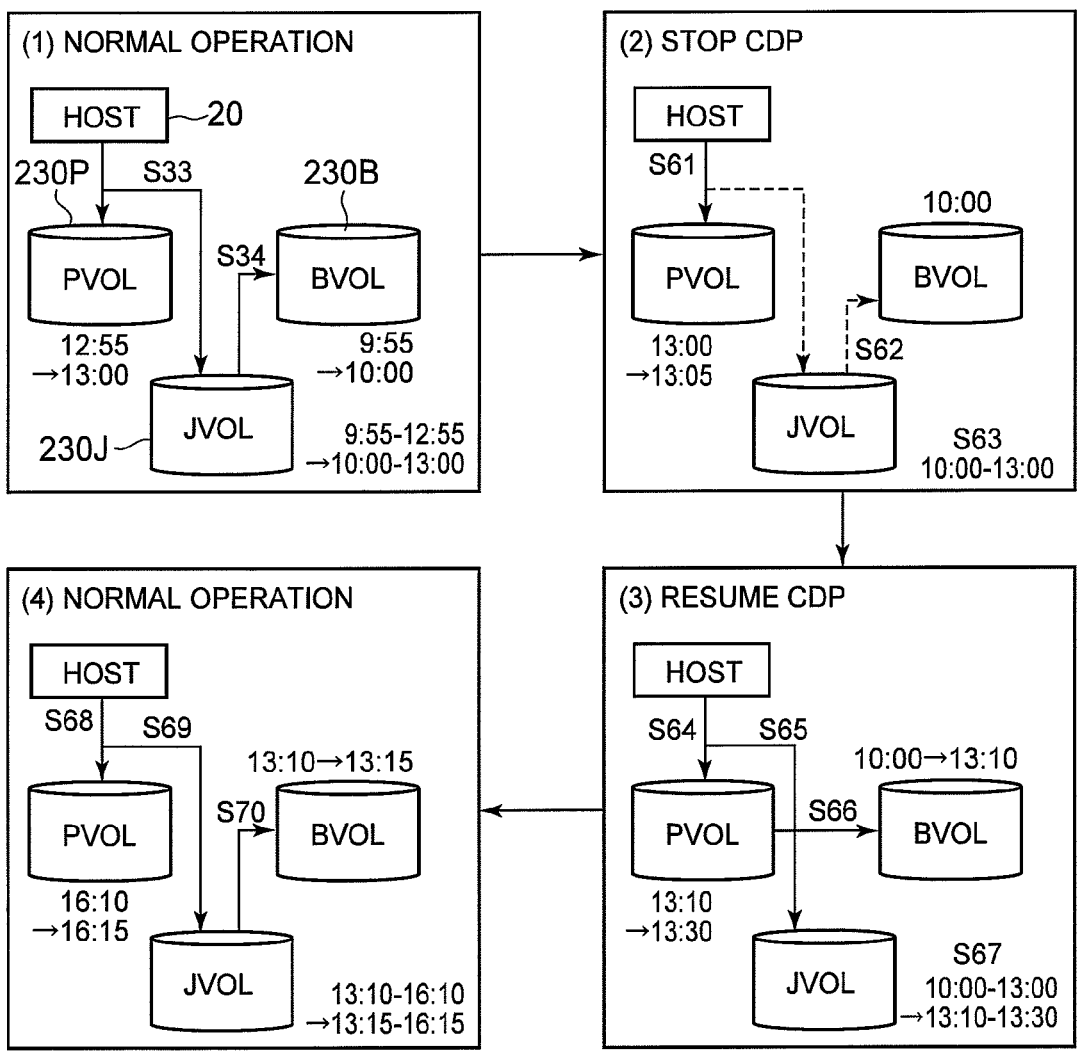
FIG. 10 is an explanatory diagram showing a flow of processing when CDP is resumed after suspending CDP.

FIG. 10 is an explanatory diagram schematically showing a flow of processing of the CDP stoppage (S23) and CDP resume (S22) shown in FIG. 7. During the normal operation shown in FIG. 10(1), suppose that, for example, the journal volume 230J is filled with journal data JD. It should be noted that, besides the case where the journal volume 230J is filled with journal data JD, there is a case in which the CDP is stopped by an instruction from the user. For example, when avoiding decrease in performance of the primary volume 230P, or when a large amount of write data that do not have to be protected when formatting the primary volume 230P are generated, the user can stop the CDP.

When the journal volume 230J becomes full, the state of the storage controller 10 is shifted to a CDP stoppage state shown in FIG. 10(2). Even in the CDP stoppage state, the host 20 can access the primary volume 230P and writes data thereto (S61). However, the storage controller 10 does not create journal data JD. The storage controller 10 stops the processing of writing the journal data to the base volume 230B (S62), and keeps the journal data items JD stored in the journal volume 230J (S63).

Once an instruction is issued to resume the CDP, the state of the storage controller 10 is shifted to the CDP resume state shown in FIG. 9(3). The storage controller 10 copies all storage contents of the primary volume 230P to the base volume 230B (S64), and changes the base point to a time specified for CDP resume. The storage controller 10 creates journal data JD on the basis of the write access from the host 20 to the primary volume 230P (S65), and stores the created journal data JD in the journal volume 230J (S66). The storage controller 10 discards all of the old journal data items JD stored before resuming the CDP, and saves only the journal data items JD acquired after resuming the CDP, in the journal volume 230J (S67).

Figure 11:
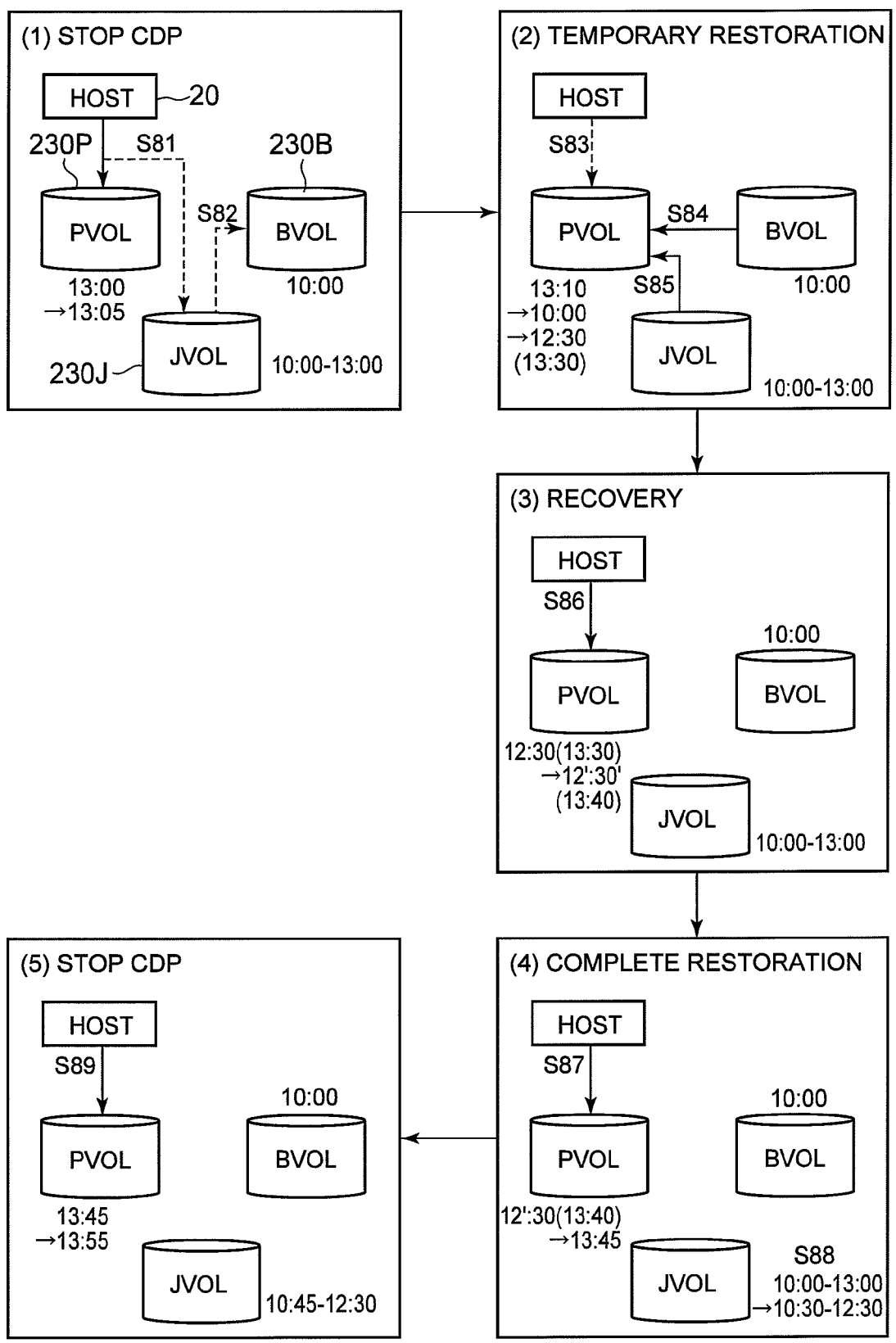
FIG. 11 is an explanatory diagram showing a flow of processing when temporary restoration and complete restoration are performed while CDP is suspended.

FIG. 11 is an explanatory diagram schematically showing a flow of recovery processing (S23 through S27) performed after CDP stoppage shown in FIG. 7. In a CDP stoppage stage shown in FIG. 11(1), acquisition and storing of journal data JD described above are stopped (S81), and writing of the journal data items JD that are already accumulated to the base volume 230B is also stopped (S82).

In the CDP stoppage state, when some kind of a failure occurs, the user executes temporary restoration as shown in FIG. 11(2). Prior to the execution of temporary restoration, access from the host 20 to the primary volume 230P is stopped (S83). The storage controller 10 uses the difference bitmap BM10 for differential copying to copy the difference between the storage contents of the base volume 230B and the storage contents of the primary volume 230P from the base volume 230B to the primary volume 230P (S84). Next, the storage controller 10 writes journal data JD to the primary volume 230P until the storage contents of the primary volume 230P become the storage contents obtained at the specified restoration point (S85).

In a recovery state shown in FIG. 11(3), prohibition of access from the host 20 to the primary volume 230P is removed (S86). The storage controller 10 uses the difference bitmap BM40 during CDP stoppage to manage the position for writing write data issued after recovery (update position) (S86).

It should be noted that after the difference bitmap BM10 for differential copying is created by the execution of temporary restoration after stopping CDP, the storage contents of the difference bitmap BM40 during CDP stoppage are deleted once. In other words, the position to which "1" is configured is returned to "0" in order to show the update position in the difference bitmap BM40. Then, the storage controller 10 reuses the difference bitmap BM40 during recovery after the execution of temporary restoration.

In complete restoration shown in FIG. 11(4), the recovered storage contents are determined, and the host 20 continues to make access to the primary volume 230P (S87). The storage controller 10 nullifies the journal data items JD obtained after the determined restoration point (S88). Then, the state of the storage controller 10 is shifted to a CDP stoppage state shown in FIG. 11(5), and the position updated by the host 20 is managed by means of the difference bitmap BM40.

Figure 12:
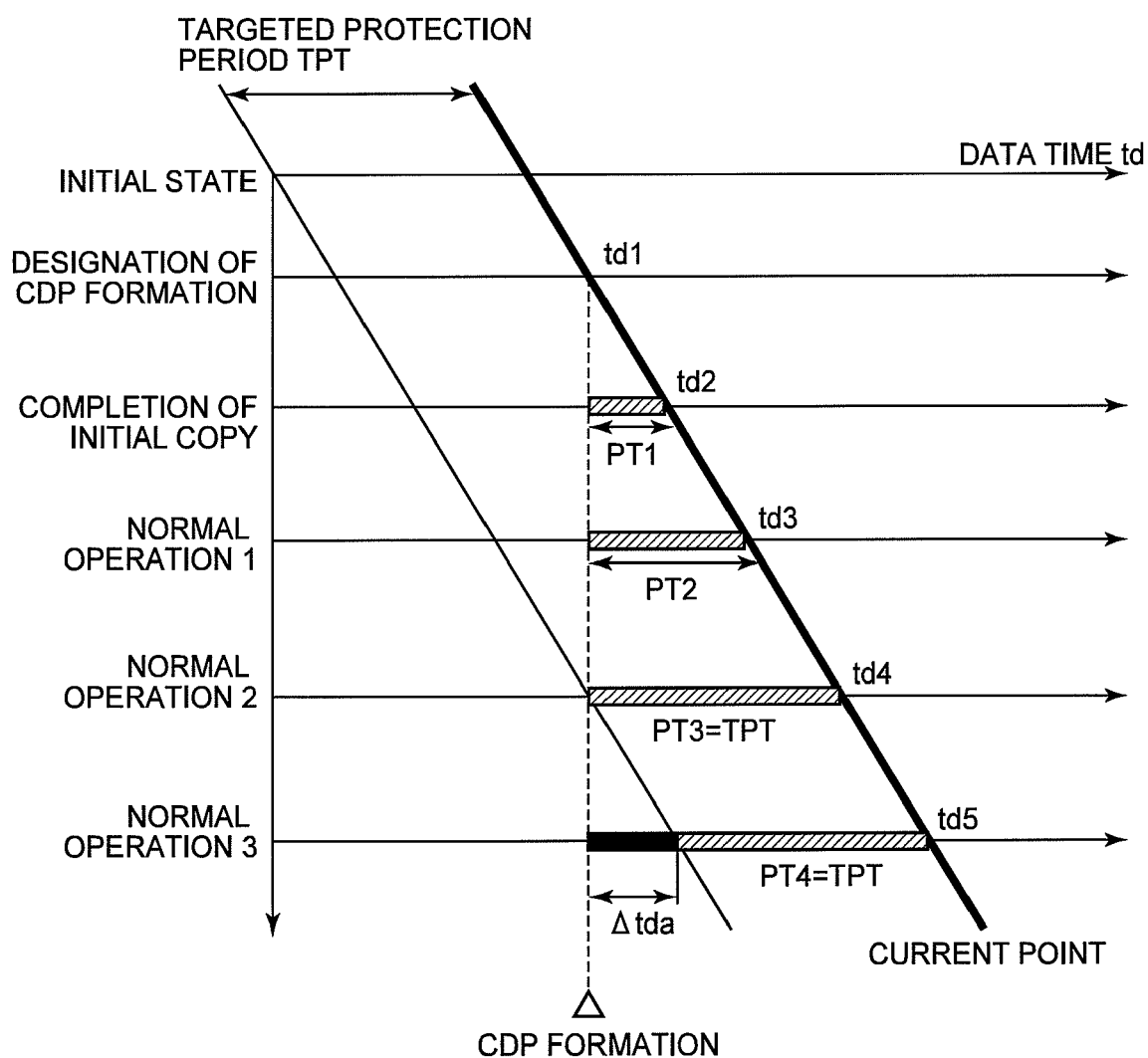
FIG. 12 is an explanatory diagram showing changes in a protection period in a normal operation state.

Changes of a period in which storage contents are protected by means of CDP are described with reference to FIG. 12 through FIG. 18. FIG. 12 is an explanatory diagram showing changes in the protection period between start of protection by means of CDP and a point at which the status of the storage controller 10 is shifted to the normal operation state. In FIG. 12 through FIG. 18, the shaded areas indicate a state in which the journal data JD is accumulated, and the blackened part indicates deleted journal data JD. Specifically, the shaded areas in each figure indicate the protection period PT in which the storage contents can be restored by means of the journal data JD.

In the initial state, both the primary volume 230P and the base volume 230B are not configured, and the storage contents are not protected by means of CDP. When an instruction for CDP creation is provided, both the primary volume 230P and the base volume 230B are configured, and then initial copying for copying the storage contents of the primary volume 230P obtained at time td1 to the base volume 230B is started, the td1 being time at which CDP creation is specified.

The host 20 can issue a write request targeting the primary volume 230P, during the initial copying. As described above, in the case in which a write request is issued for an uncopied area where copying from the primary volume 230P to the base volume 230B is not completed, for example, a method is used in which the data stored in the uncopied area is copied to the base volume 230B, and thereafter the write request is accepted. The storage controller 10 creates journal data JD on the basis of the write request, and causes the journal volume 230J to store the created journal data therein. At a initial copy completing time td2, the journal data JD related to the write request issued between the CDP creation time td1 and the initial copy completion time td2 is stored in the journal volume 230J. Therefore, a protection period PT1 is a period between td1 and td2. The protection period PT1 has not yet reached the targeted protection period TPT.

After completion of initial copying, the status of the storage controller 10 is shifted to the normal operation state 1. Here, in order to clearly show a time variation in the normal operation state, reference numerals are added, such as "normal operation 1", "normal operation 2", and "normal operation 3", according to the passage of time.

In normal operation 1, the journal data JD related to a write request issued between td1 and td3 is stored in the journal volume 230J. In this case, a protection period PT2 is a period between td1 and td3. The protection period PT2 has not yet reached the targeted protection period TPT.

In normal operation 2, the journal data JD related to a write request issued between td1 and td4 is stored in the journal volume 230J. In this case, a protection period PT3 is a period between td1 and td4. The protection period PT3 has reached the targeted protection period TPT.

In normal operation 3 after a lapse of time, the journal data JD after a lapse of the targeted protection period TPT are written to the base volume 230B and then discarded. Specifically, the journal data JD accumulated during a period, which is earlier than the latest data time td5 by the targeted protection period TPT ($\Delta tda=(td5-TPT)-td1$), are sequentially written to the base volume 230B. The journal data JD written to the base volume 230B are discarded. Since the journal data items JD obtained during the targeted protection period TPT are accumulated in the journal volume 230J, the user or application program can specify any time point within the period of time, which is earlier than the current time td5 by the targeted protection period TPT, as the restoration point.

Figure 13:
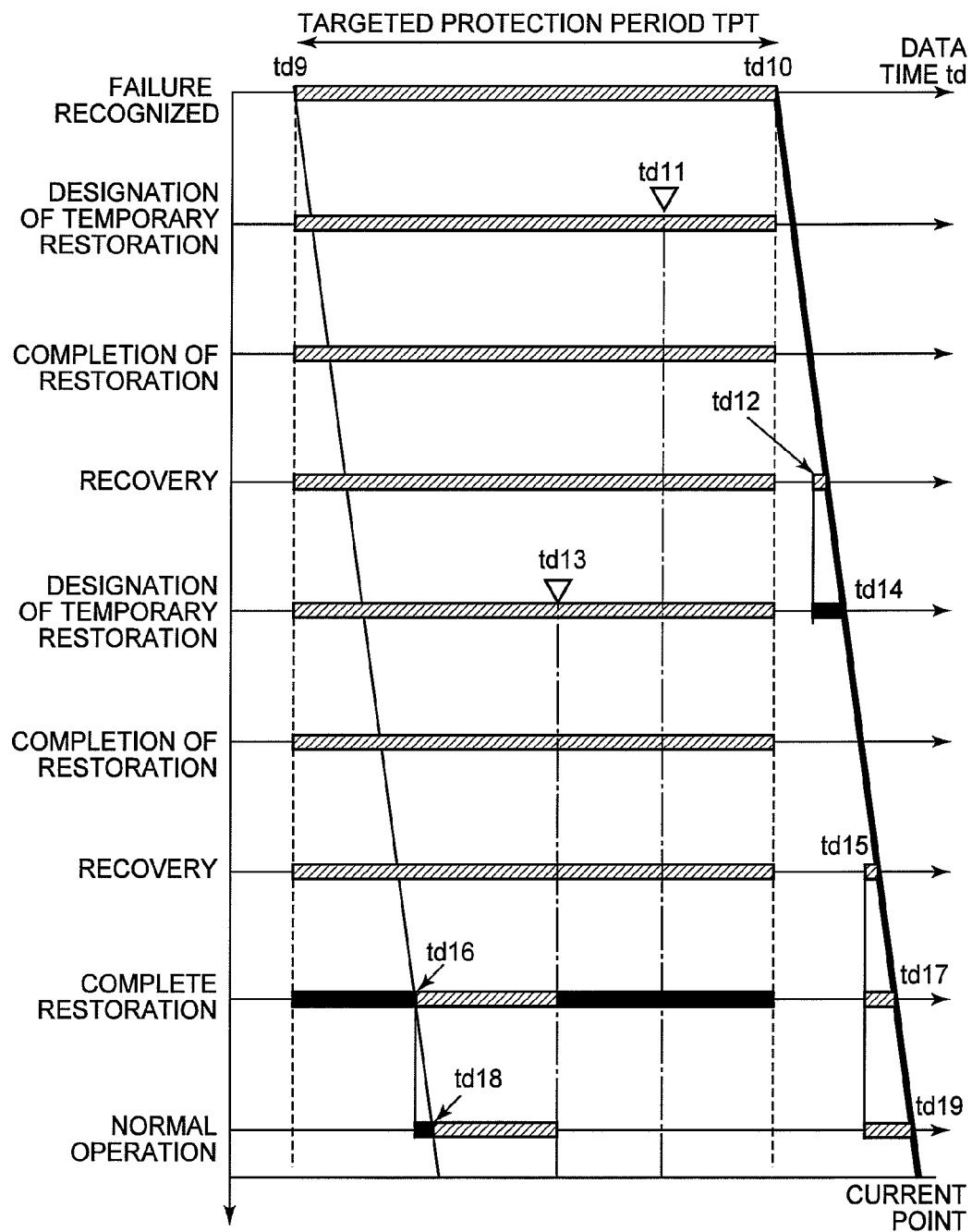
FIG. 13 is an explanatory diagram showing changes in the protection period during recovery.

FIG. 13 shows a state in which the protection period is divided after complete restoration. As shown at the top of FIG. 13, suppose that some kind of a failure occurs in the normal operation state and that the occurrence of the failure is recognized by the user or application program.

The journal data JD related to a write request issued during a period between the oldest time td9 and the latest time td11 are stored in the journal volume 230J. When the occurrence of the failure is recognized, access from the host 20 to the primary volume 230P is stopped, and the processing for writing the journal data JD to the base volume 230B is also stopped, prior to the execution of temporary restoration.

It should be noted that, regardless of whether temporary restoration is executed or not, only the processing for writing the journal data JD to the base volume 230B can be stopped. For example, it is preferred that the reflection processing be stopped prior to the execution of failure investigation shown in S18 in FIG. 7. This is because if the reflection processing is not stopped, the protection period is reduced while investigating the failure. Therefore, it is desired that the reflection processing be stopped to prevent the protection period from being reduced, before starting the failure investigation. However, for example, in the case in which the targeted protection period is configured sufficiently long, it is not necessary to stop the reflection processing before starting the failure investigation.

At the time td11 as the restoration point, execution of temporary restoration is instructed. The sectional difference bitmaps BM20 are merged to form a difference bitmap BM10 for differential copying, and this difference bitmap BM10 is used to differentially copy the data from the base volume 230B to the primary volume 230P. Thereafter, the journal data JD of the period between the oldest time td9 and the restoration point td11 are sequentially written to the base volume 230B, whereby temporary restoration is completed.

Temporary restoration is completed at time td12, and a command or data for confirming the recovered storage contents is issued from the host 20. The storage controller 10 creates journal data JD related to the write data that is issued from the host 20 after completion of temporary restoration, and causes the journal volume 230J to store the created journal data.

The user or application program, which is not satisfied with the recovered contents obtained after temporary restoration at the time of the restoration point td11, instructs execution of the second temporary restoration at another time td13 as the restoration point. When the second temporary restoration is instructed at time td14, the journal data JD that are accumulated after the first temporary restoration (journal data JD within a period of td12-td14) are discarded.

Once the second temporary restoration is completed, the user or application program confirms the recovered storage contents. After time td15 subsequent to the time of recovery, journal data JD are created in relation to write data issued from the host 20, and then stored in the journal volume 230J.

When the user or application program satisfies with the result of the second temporary restoration, at the time td17 execution of complete restoration is instructed. By instructing the execution of complete restoration, the storage contents of the primary volume 230P are determined to be the storage contents obtained at the restoration point td13. The storage controller 10 discards all successive journal data JD accumulated after the restoration point td13 at which the storage contents are determined. Specifically, in the example shown in the figure, all journal data JD obtained in a period between td13 and td10 are discarded.

The storage controller 10 writes the journal data JD, which are accumulated before time td16 that is earlier than the current time td17 by the targeted protection period TPT, to the base volume 230B sequentially, and discards the journal data JD. Specifically, the journal data JD that are obtained in a period other than the targeted protection period TPT (a period of td16-td10) are discarded after being subjected to the reflection processing.

Normal operation is started after completion of the complete restoration. In the normal operation, the journal data JD related to the write requests issued after td15 are accumulated in the journal volume 230J. On the other hand, the journal data JD after a lapse of the targeted protection period TPT (td18-td16) are written to the base volume 230B sequentially and then discarded.

The point to be focused here is that the protection period PT in which storage contents are protected by means of CDP is divided into two by executing complete restoration. The protection period PT is divided into a first period (td16-td13) which is an older period, and a second period (td15-td17) which is a newer period.

A configuration is possible in which the journal data JD obtained before the restoration point td13 (journal data JD in a period of td16-td13) are immediately written to the base volume 230B and then discarded after completion of complete restoration. Specifically, the reflection processing can be immediately performed on the journal data JD within the first period (td16-td13), and the base point can be shifted from td16 to td13.

However, as in the present embodiment, by holding the journal data JD obtained before the restoration point td13 of complete restoration, the user can instruct recovery of the journal data to the time before the td13 even after completion of complete restoration, whereby the usability for the user improves.

When a plurality of primary volumes 230P are grouped as a CDP group, the storage contents can be recovered by means of either of the two methods. The first method is a method for carrying out restoration control in units of groups. In the first method, all of the primary volumes 230P within the CDP group are synchronously controlled so as to match all protection period PT match.

In the first method, all of the primary volumes 230P within the CDP group are recovered to the storage contents of the same time, and the reflection processing of the journal data JD is stopped and resumed simultaneously. In the case of the first method, the protection period PT of all primary volumes 230P within the CDP group is shifted as described with reference to FIG. 13.

The second method is a method for carrying out restoration control in units of volumes. In the second method, each of the primary volumes 230P within the CDP group can be subjected to temporary restoration and complete restoration. It should be noted that a plurality of primary volumes 230P within the CDP group can be subjected to restoration control in units of volumes.

Incidentally, when temporary restoration is performed on the primary volumes 230P existing in the CDP group, the journal data JD in the process of recovery processing cannot be discarded, as described above regarding complete restoration. Therefore, the journal data JD is nullified.

Figure 14:
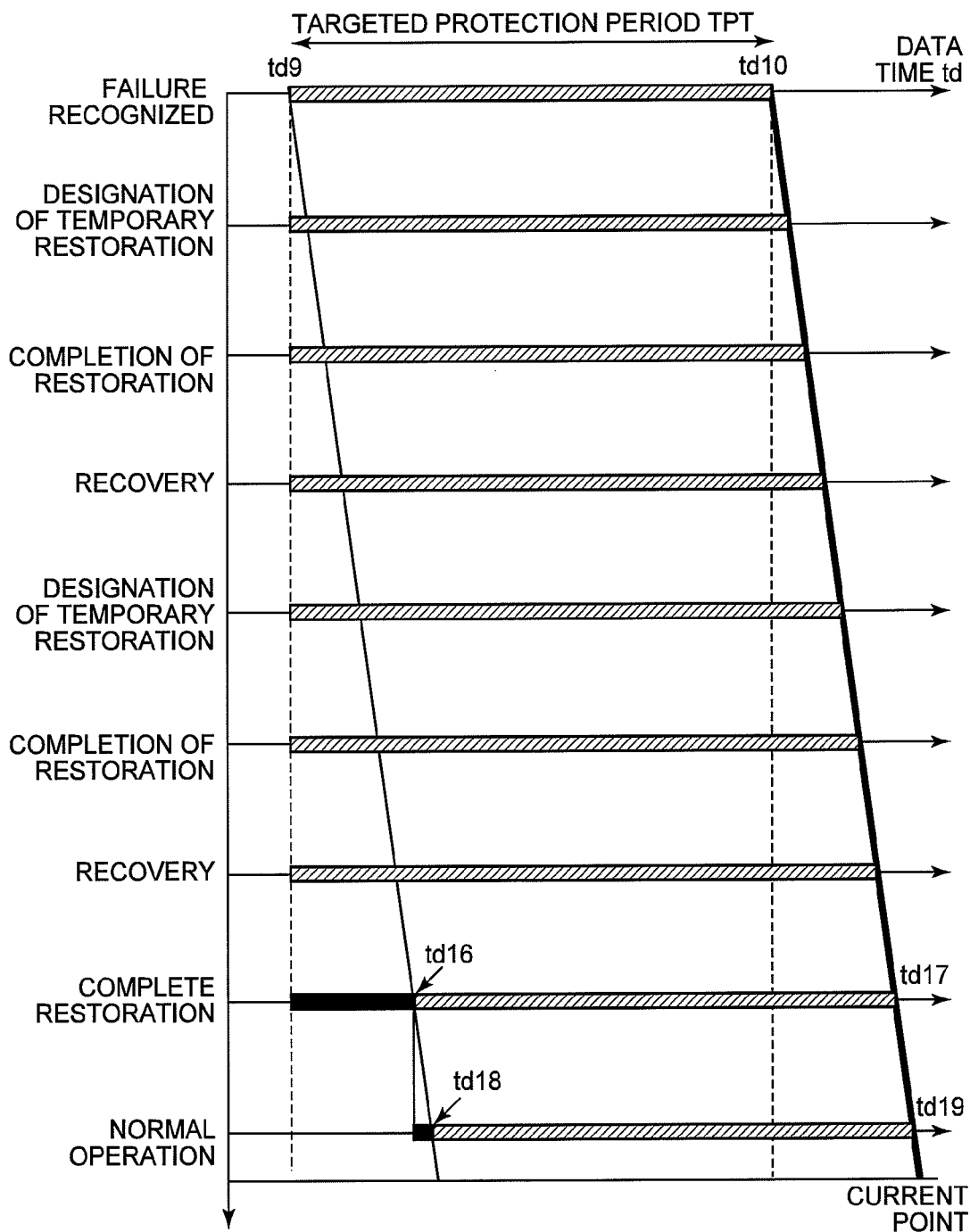
FIG. 14 is an explanatory diagram showing changes in the protection period related to a volume different from the volume for recovery, when control is performed in units of volumes.

In the case of the second method, when restoration illustrated in FIG. 13 is performed on one of the primary volumes 230P existing in the CDP group, control shown in FIG. 14 is performed on the other primary volumes 230P within the same CDP group. Here, for convenience of explanation, (1) is added to one of the primary volumes 230P and the base volume 230B, and (2) is added to the other primary volumes 230P and the base volume 230B.

As described with reference to FIG. 13, when instruction for executing temporary restoration on one of the primary volumes 230P (1) is issued, writing of journal data JD to one of the base volumes 230B (1) is stopped, and one of the base points is temporarily fixed. At the same time, writing of journal data JD to the other base volume 230B (2) is also stopped, and the other base point is also temporarily fixed.

Thereafter, when complete restoration on the primary volume 230P (1) is ended, shifting of the base point is resumed. At the same time, shifting of the base point of the base volume 230B (2) is also resumed.

Here, processing that is performed when a physical failure occurs in the primary volume 230P is described. In this case, first, the failed disk drive 210 is replaced with a normal disk drive 210. Then, in the first temporary restoration performed after the replacement of the disk drive, all data are copied from the base volume 230B to the primary volume 230P, and journal data JD is written to the primary volume 230P. From the second temporary restoration, as described above, a plurality of sectional difference bitmaps BM20 are merged to create the difference bitmap BM10 for differential copying, and this difference bitmap BM10 is used to perform differential copying, whereby temporary restoration is executed.

It should be noted that restoration can be performed on a volume different from the primary volume 230P. For example, in the first temporary restoration, after all date of the base volume 230B are copied to the different volume, journal data JD is written to the different volume. In the second temporary restoration, as described above, the difference bitmaps BM20 are merged, and thus obtained difference bitmap BM10 for differential copying is used to perform differential copying, whereby temporary restoration is executed.

In the case in which a plurality of primary volumes 230P having different protection periods constitute a CDP group, restoration can be managed by means of several methods. For example, in the first method, restoration is possible only when the protection periods of the respective primary volumes 230P within the CDP group overlap with one another. In the second method, only the primary volumes 230P each of which has a specified restoration point in the protective period thereof are restored. In the third method, only the primary volumes 230P each of which has a specified restoration point in the protective period thereof are restored to the specified restoration points respectively, and the other primary volumes 230P each of which does not have a specified restoration point in the protection period thereof are restored to a time point in the protection period that is proximate to the specified restoration point.

Here is described a case in which the CDP is stopped or resumed for some of the primary volumes 230P of the CDP group. When stopping the CDP on each of the volumes in the CDP group, only the acquisition of the journal data JD related to the primary volume 230P which is that target of stopping is stopped. When resuming the CPD on each of the volumes in the CDP group, the journal data JD that are acquired in the past with respect to the primary volume 230P which is the target of resumption is nullified, and differential copying and the like are performed. When deleting the CDP of each volume in the CDP group, only the journal data JD related to the primary volume 230P to be deleted is nullified. It should be noted that when the journal data JD can be discarded, this journal data JD can be discarded without being nullified.

Figure 15:
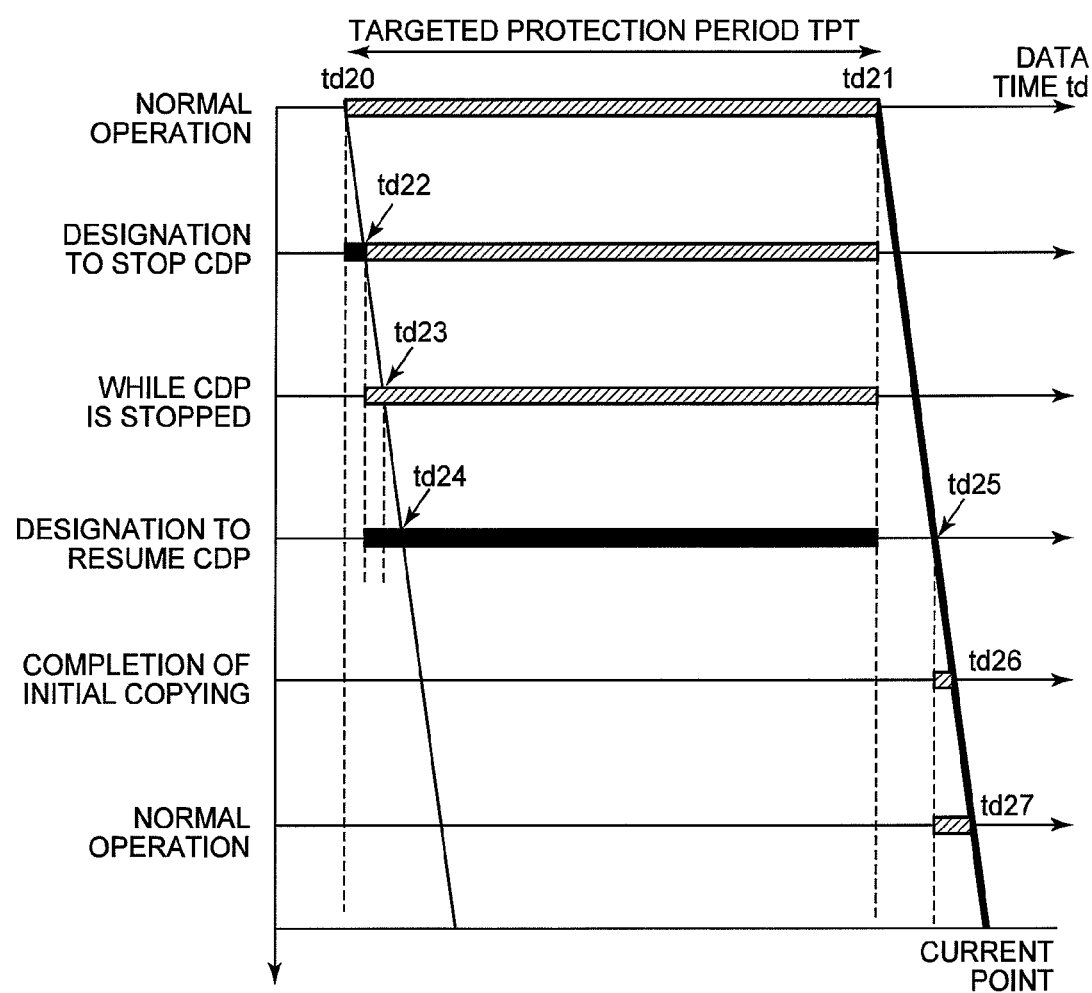
FIG. 15 is an explanatory diagram showing changes in the protection period that occur when CDP is resumed after suspending CDP.

FIG. 15 is an explanatory diagram showing changes in the protection period PT when CDP is resumed after suspending CDP. When suspension of CDP is instructed at time td21, generation of new journal data JD is stopped.

At the time when an instruction for stopping CDP is issued, the old journal data items JD that are excluded from the targeted protection period TPT (journal data items within a period between td22 through td20) do not have to be written to the base volume 230B. Specifically, acquisition of journal data and reflection of journal data do not have to be stopped simultaneously.

While the CDP is stopped, the processing of writing journal data JD to the base volume 230B is stopped. When an instruction for resuming the CDP is issued at time td25, all journal data items accumulated in the journal volume 230J are discarded. At the same time, accumulation of new journal data JD created after the time td25 is started.

At time td26, initial copying from the base volume 230B to the primary volume 230P that is performed in order to resume the CDP is ended, and the state of the storage controller is shifted to the normal operation state. Hereinafter, journal data items JD for the targeted protection period TPT are gradually accumulated in the journal volume 230J.

It should be noted that the CDP can be stopped, resumed and deleted with respect to only some of the primary volumes 230P within the CDP group.

Figure 16:
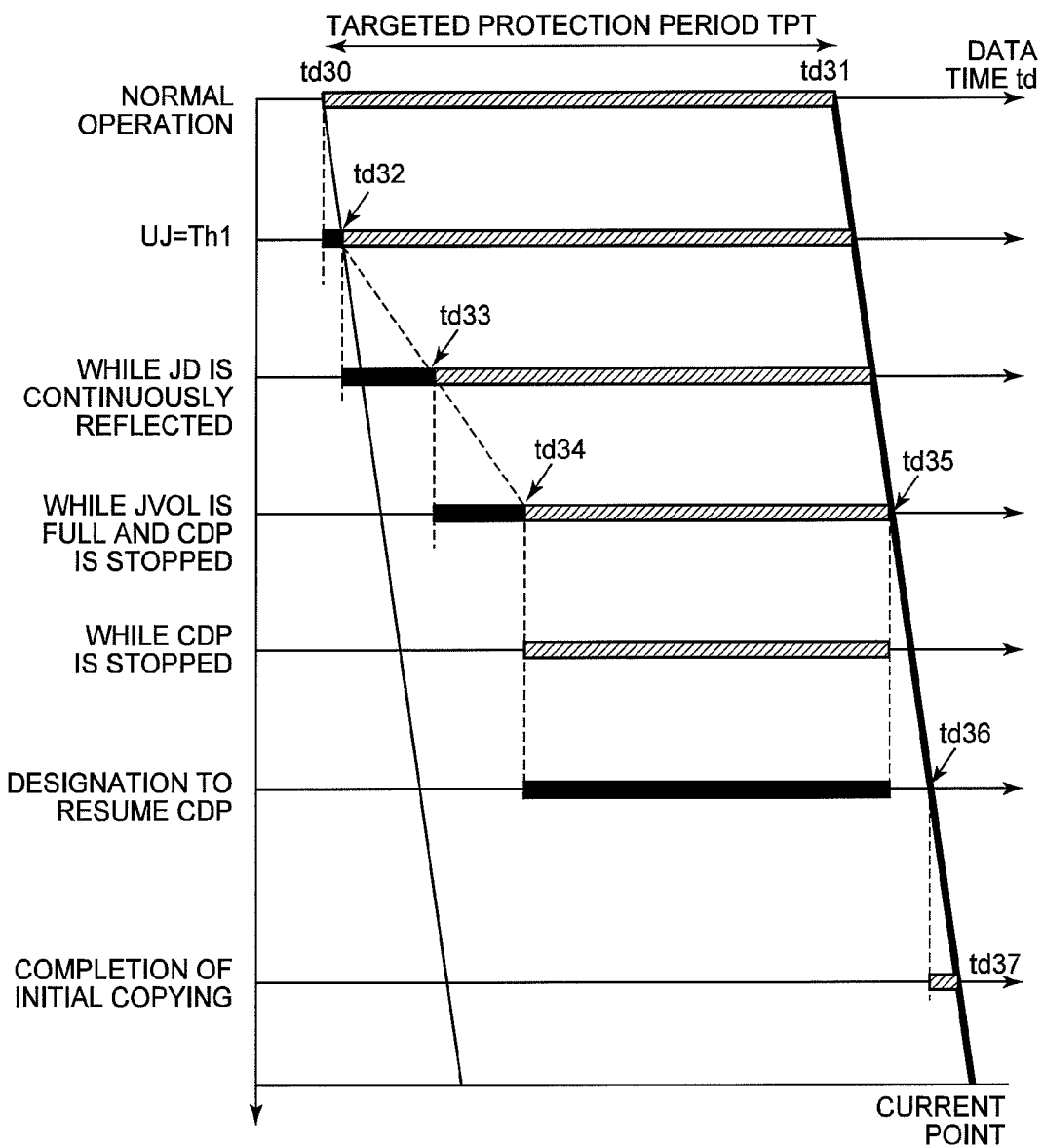
FIG. 16 is an explanatory diagram showing changes in the protection period that occur when the journal data within the targeted protection period are also reflected in a base volume.

FIG. 16 is an explanatory diagram showing a state of continuous reflection processing that is performed in order to prevent the journal volume 230J from being filled. The continuous reflection processing is the processing for writing, in addition to the journal data JD excluded from the targeted protection period TPT, the journal data items JD within the targeted protection period TPT to the base volume 230B and discarding these journal data items JD. The continuous reflection processing is started in the case in which the usage rate UJ of the journal volume 230J reaches a start threshold value Th1 of the continuous reflection processing (UJ=Th1).

As shown at the top level of FIG. 16, during the normal operation state, journal data JD related to a write request issued between time td30 and the latest time td31 is saved in the journal volume 230J. Specifically, the targeted protection period TPT is a period between td30 and td31.

As shown in the next level, suppose that the usage rate UJ of the journal volume 230J reaches the start threshold value Th1. The journal data items JD (td32 through td30) excluded from the targeted protection period TPT are written to the base volume 230B and then discarded as usual.

As shown in the further next level, once the continuous reflection processing is started, the journal data items JD excluded from the targeted protection period TPT and some of the journal data items JD within the targeted protection period TPT are written to the base volume 230B and then discarded. FIG. 16 shows a state in which the journal data items JD obtained up to td16 are written to the base volume 230B and then discarded.

By starting the continuous reflection processing, the time period in which the journal volume 230J becomes filled can be delayed. However, when, for example, the host 20 updates a large amount of primary volumes 230P in a small amount of time, the journal volume 230J becomes filled with journal data JD.

When the journal volume 230J becomes filled (UJ=100%), the continuous reflection processing is stopped as shown in the next level. Therefore, the journal data items JD obtained after time td34 included in the targeted protection period TPT are nor written to the base volume 230B.

Once the journal data volume 230J becomes filled, the CDP is stopped. Thereafter, when an instruction for resuming the CDP is specifically issued from the user or application program, the CDP is resumed. The changes in the target period PT with respect to stoppage of the CDP and resumption of CDP are not described here, as they are described with reference to FIG. 15.

Figure 17:
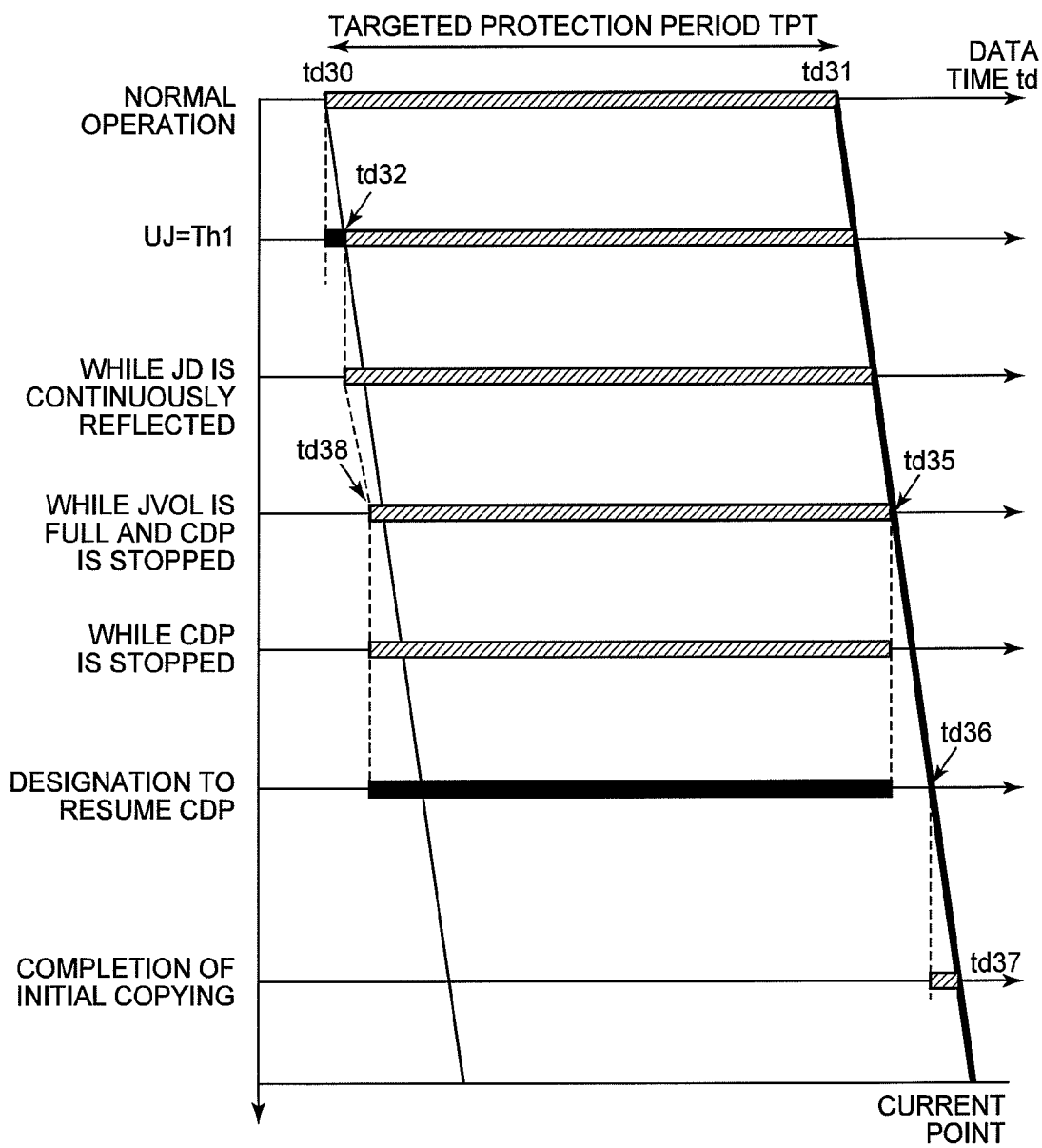
FIG. 17 is an explanatory diagram similar to that of FIG. 16, showing changes in the protection period that occur when a write access made from the host is large.

FIG. 17 is an explanatory diagram showing other changes in the protection period that occur when the continuous reflection processing is executed. In FIG. 16, the journal data JD within the targeted protection period TPT can be written to the base volume 230B and discarded by executing the continuous reflection processing.

However, when the host 20 updates a large amount of primary volumes 230P (when the frequency of issuance of write requests is large), the journal data JD within the targeted protection period TPT may not be able to be written even if the continuous reflection processing is executed, as shown in FIG. 17. In this case, as a result, the actual protection period PT becomes longer than the targeted protection period TPT.

Figure 18:
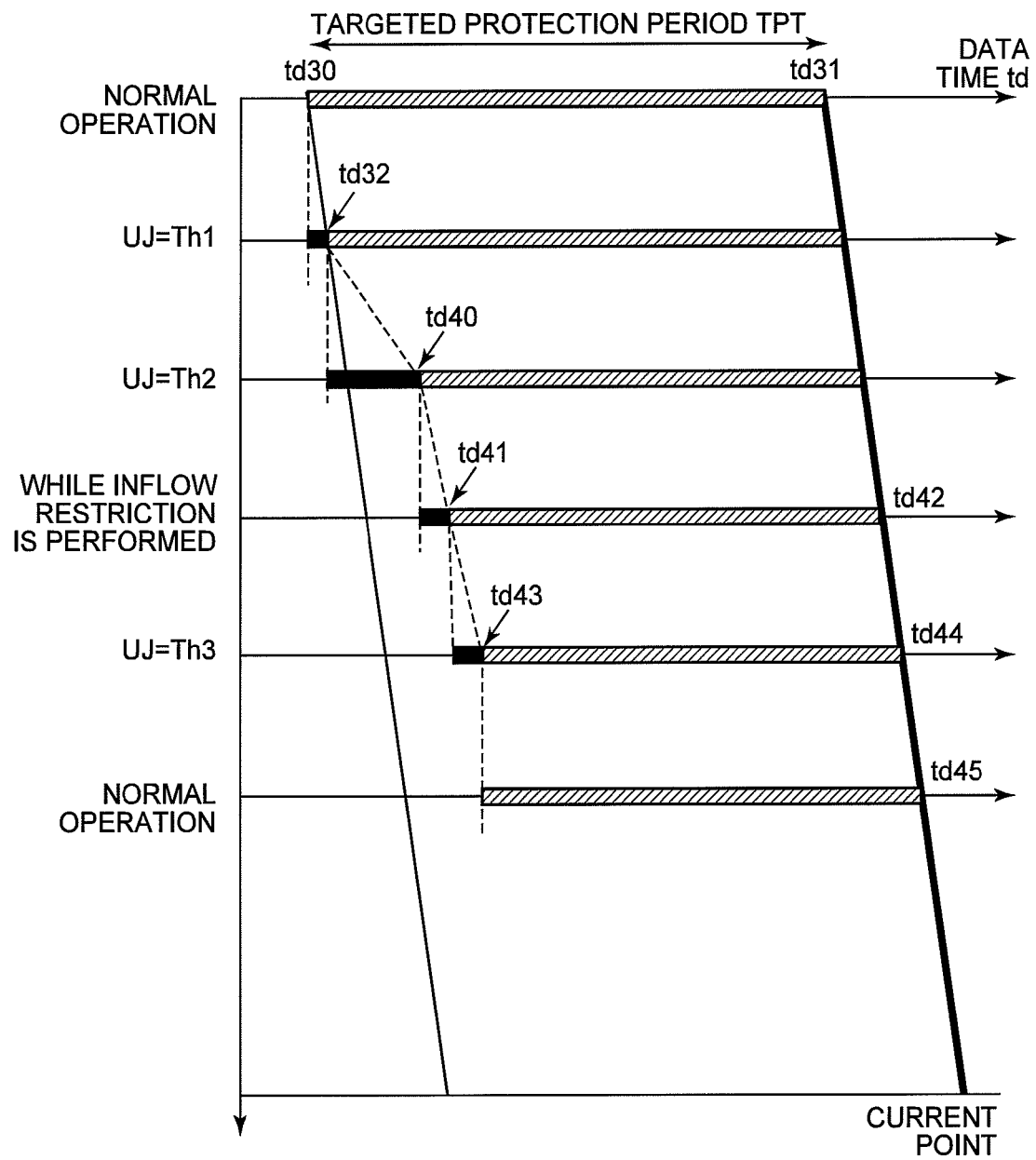
FIG. 18 is an explanatory diagram showing changes in the protection period that occur when configuring a limit to the write access made from the host.

FIG. 18 is an explanatory diagram showing changes in the protection period PT that occur when inflow restriction processing is executed. The inflow restriction processing is the processing of restricting writing of primary volumes 230P by the host 20. The inflow restriction processing is started when the usage rate UJ of the journal volume 230J reaches a start threshold value Th2 of the inflow restriction processing (UJ=Th2).

As shown at the second level from the top in FIG. 18, when the usage rate UJ reaches the threshold value Th1 (UJ=Th1), the abovementioned continuous reflection processing is started first. Accordingly, as shown in the next level, the journal data items obtained up to time td40 within the targeted protection period TPT are written to the base volume 230B and then discarded. However, when the issuance of a large amount of write requests from the host 20 is not stopped and the usage rate UJ reaches the threshold value Th2 (UJ=Th2), the inflow restriction processing is started.

As shown in the further next level, when the inflow restriction processing is started, the protection period PT is determined at the point where the amount of write requests to be issued from the host 20 (i.e., the flow amount) is balanced with the throughput obtained in the processing of writing the journal data JD to the base volume 230B and discarding the journal data (i.e., the reflection processing).

The storage controller 10 executes the reflection processing on the journal data JD within the journal volume 230J while controlling the amount of write requests to be issued from the host 20. Then, when the usage rate UJ decreases to a threshold value Th3 at which the continuous reflection processing is stopped (UJ=Th3), the continuous reflection processing is stopped, and the state of the storage controller 10 is shifted to the normal operation state. Immediately after the storage controller 10 enters the normal operation state, the actual protection period PT becomes shorter than the targeted protection period TPT (TPT>PT). This is because the reflection processing is performed on the journal data JD within the targeted protection period TPT as well by executing the continuous reflection processing. Thereafter, journal data JD are accumulated in the journal volume 230J until the targeted protection period TPT matches the protection period PT.

It should be noted that there is a case in which the protection period changes as shown in FIG. 18 even when only the continuous reflection processing is executed without performing the inflow restriction.

A part of the operation of the storage controller 10 is described in a different perspective with reference to the flowcharts of FIG. 19 through FIG. 22. Each of the flowchart described below shows a general outline of the processing, which is sometimes different from an actual computer program. Also, those skilled in the art can probably change the steps shown in each flowchart to different steps or delete those steps.

Figure 19:
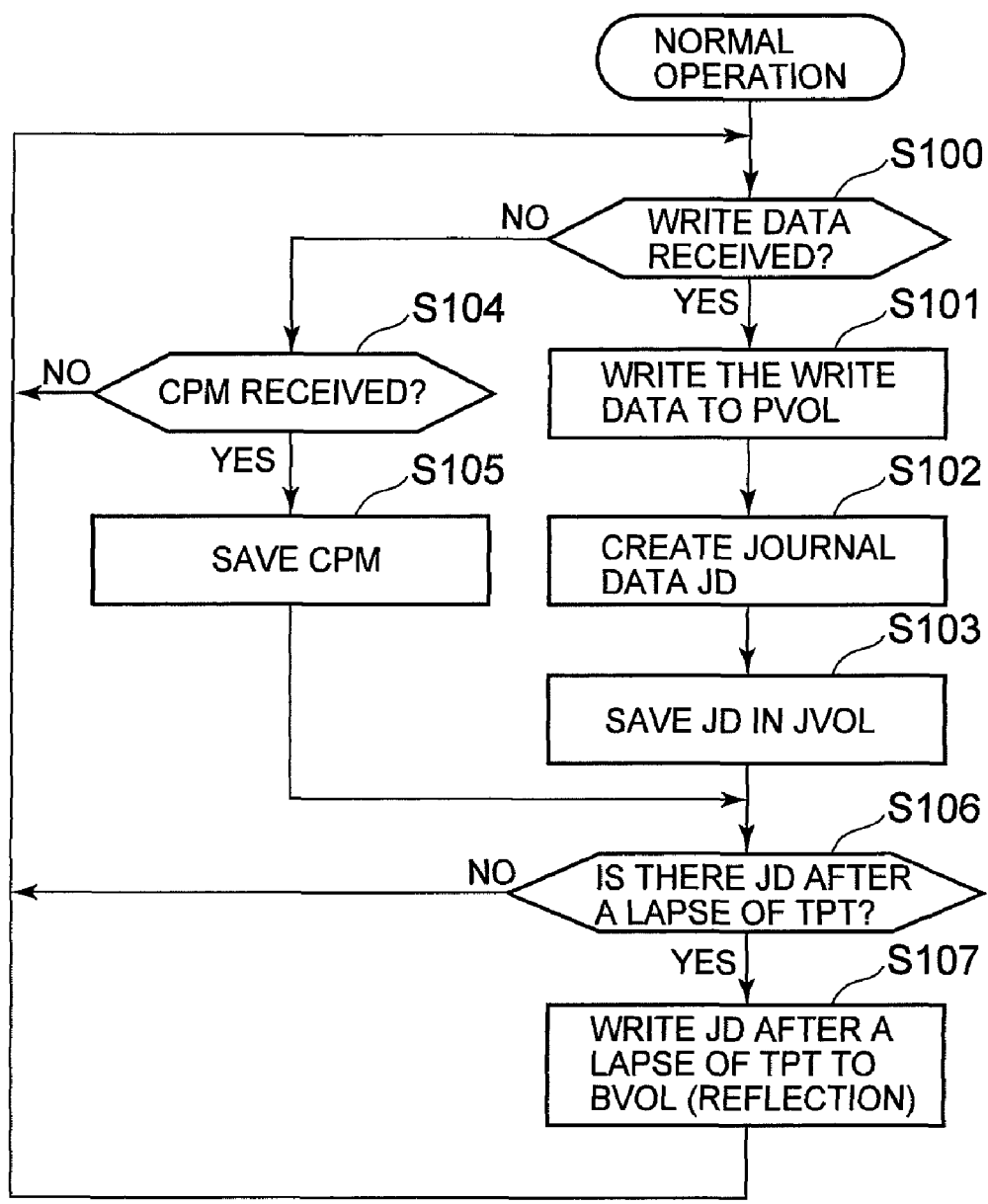
FIG. 19 is a flowchart showing a normal operation processing.

FIG. 19 is a flowchart showing processing performed in the normal operation. Once the storage controller 10 receives write data from the host 20 (S100: YES), the storage controller 10 writes the write data to the primary volume 230P (S101).

The storage controller 10 creates journal data JD related to the received write data (S102), and causes the journal volume 230J to store the journal data JD (S103). On the other hand, when the CPM is received from the host 20 (S100: N0, S104: YES), the storage controller 10 causes the journal volume 230J to store this CPM (S105).

The storage controller 10 compares the time information configured in each journal data item JD stored in the journal volume 230J, with current time, and thereby determines whether there exists a journal data item JD that is still obtained even after the targeted protection period TPT, i.e., whether there exists a journal data item JD that is excluded from the targeted protection period TPT (S106).

If there exists a journal data item JD that is excluded from the targeted protection period TPT (S106: YES), the storage controller 10 writes the journal data item JD that is not in the targeted protection period TPT, to the base volume 230B, and discards it after writing it (S107).

Figure 20:
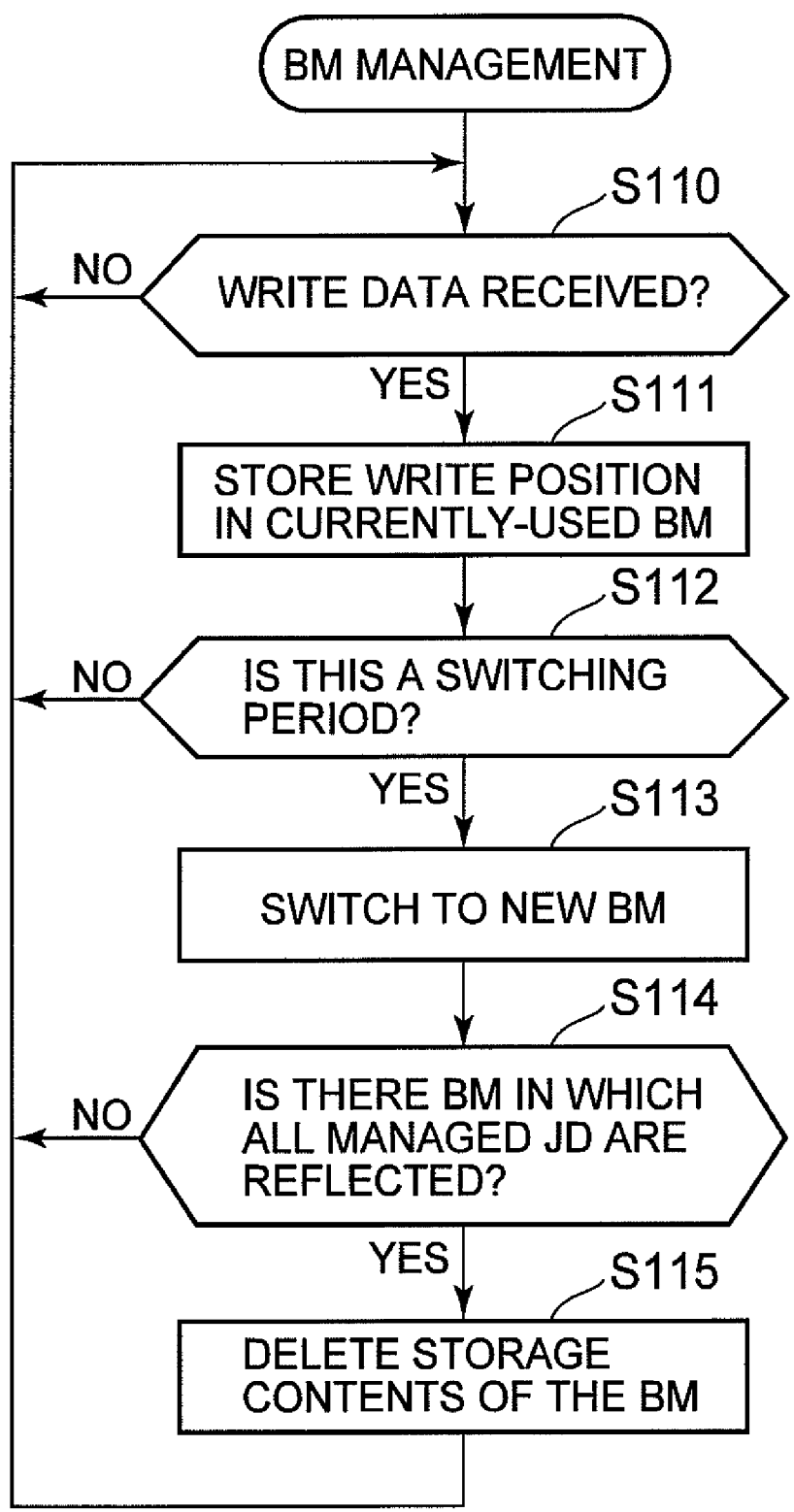
FIG. 20 is a flowchart showing processing in which sectional difference bitmaps are switched.

FIG. 20 is a flowchart showing processing that is used while switching the sectional difference bitmaps BM20. The storage controller 10 determines whether write data is received from the host 20 (S110). Specifically, the storage controller 10 monitors whether a write request is issued from the host 20 (S110).

When write data is received (S110: YES), the storage controller 10 causes the difference bitmap BM20 that is currently used to store the position for writing the write data (S111). Specifically, the storage controller 10 configures "1" for the difference bit corresponding to a logical track updated by the write data.

The storage controller 10 determines whether a time period for switching the difference bitmaps BM20 has arrived or not (S112). For example, if a section is defined as a predetermined time, the storage controller 10 determines whether the predetermined time has elapsed. On the other hand, if the section is defined by usability of the journal volume 230J, i.e., UJ, the storage controller 10 determines whether the predetermined usability has been reached or not.

When it is determined that the switching time period has arrived (S112: YES), the storage controller 10 switches the current difference bitmap to the next difference bitmap BM20, and manages the update of the primary volume 230P that is made by the host 20 (S113).

The storage controller 10 determines whether there exists, out of the used difference bitmaps BM20, a difference bitmap BM20 in which journal data items JD managed by each of the used difference bitmaps are entirely written to the base volume 230B (S114). Specifically, the storage controller 10 determines whether there exists a used difference bitmap BM20 in which the reflection processing is completed on all journal data items JD associated with the used difference bitmaps BM20 (S114).

If there is detected the used difference bitmap BM20 in which corresponding all journal data items JD are written to the base volume 230B and discarded is detected (S114: YES), the storage controller 10 deletes the storage contents of this used difference bitmap BM20 (S115), and uses this difference bitmap BM20 in difference management in the next section.

Figure 21:
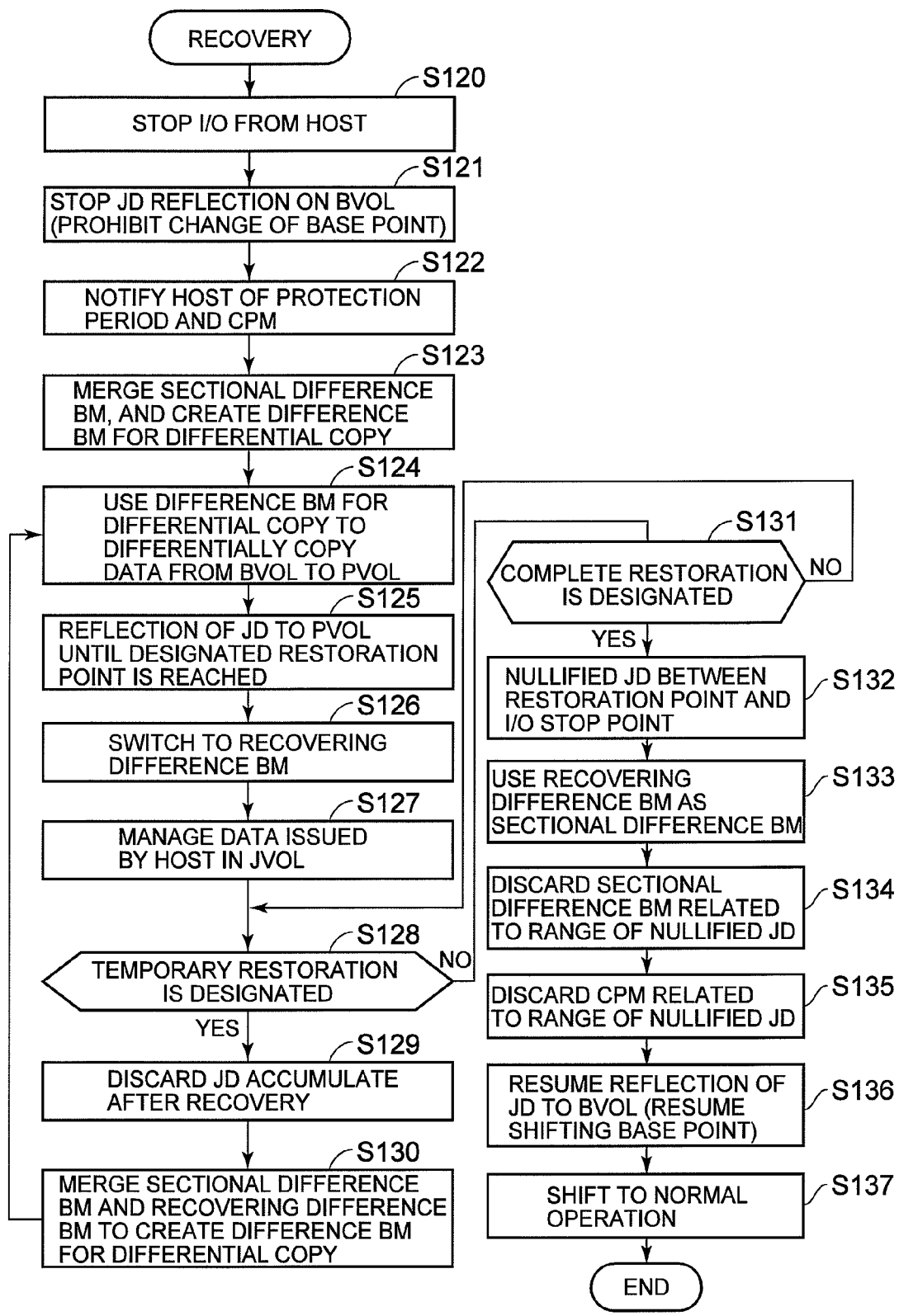
FIG. 21 is a flowchart showing recovery processing.

FIG. 21 is a flowchart showing a recovery processing. Prior to execution of temporary restoration, access from the host 20 to the primary volume 230P is prohibited (S120). Prohibition of access from the host access can be performed by the user or application program.

The storage controller 10 stops processing of writing the journal data JD that is excluded from the targeted protection period TPT to the base volume 230B and discarding the journal data (reflection processing) (S121). Accordingly, the base point indicated by the base volume 230B is fixed, whereby shifting is stopped.

The storage controller 10 notifies the host 20 of a selectable protection period PT and a CPM that is already configured (S122). The host 20 selects the restoration point to perform temporary restoration, on the basis of the reported information.

The storage controller 10 merges the sectional difference bitmaps BM20, and thereby creates the difference bitmap BM10 for differential copying (S123). Specifically, the storage controller 10 obtains a logical sum of the sectional difference bitmaps BM20 obtained after the restoration point, and thereby creates the difference bitmap BM10 for differential copying. The storage controller 10 uses the difference bitmap BM10 to copy only the difference data between the base volume 230B and the primary volume 230P from the base volume 230B to the primary volume 230P (S124). Accordingly, the storage content of the primary volume 230P matches the storage control of the base volume 230B.

The storage controller 10 sequentially reads from the oldest journal data to the journal data of the restoration point out of the journal data JD that are stored in the journal volume 230J, and writes the read journal data into the primary volume 230P (S125).

The storage controller 10 changes the difference bitmap BM10 for differential copying to the recovering difference bitmap BM30 (S126). When the prohibition of access from the host 20 to the primary volume 230P is removed, the position at which the primary volume 230P is updated by the host 20 is managed by the difference bitmap BM30. Furthermore, the storage controller 10 creates journal data JD related to the write request issued from the host 20, and causes the journal volume 230J to store the created journal data (S127).

When the execution of temporary restoration is instructed again (S128: YES), the storage controller 10 discards the journal data JD accumulated after the first recovery (S129). The storage controller 10 then merges the sectional difference bitmaps BM20 with the recovering difference bitmap BM30 to create the difference bitmap BM10 for differential copying again (S130). The user or application program can repeatedly execute the steps S124 through S130 until the user or application program satisfies the storage contents restored by means of temporary restoration.

The user or application program accepts the storage contents recovered by means of temporary restoration, and when execution of complete restoration is instructed (S128: NO, S131: YES), the storage controller 10 nullifies or discards the journal data JD from the defined restoration point to "I/O stop point" (S132).

The journal data JD up to the "I/O stop point" is journal data JD that is created in response to the write request issued from the host 20 stopped at S120.

The storage controller 10 uses the recovering difference bitmap BM30, which is started to be used in S126, as the sectional difference bitmap BM20 (S133). The storage controller 10 then discards the sectional difference bitmap BM20 associated with the journal data JD that is nullified or discarded in S132 (S134). It should be noted that in S134 and the like the term, "discarded", is used for the sake of convenience, but the meaning of this expression also includes deletion of the storage contents of the sectional difference bitmap BM20. In other words, in S134, each sectional difference bitmap BM20 that is no longer required is discarded and prepared for reuse. The storage controller 10 discards the CPM included in the range of the journal data JD that is nullified or discarded (S135).

The storage controller 10 resumes the reflection processing of the journal data JD (S136) and shifts the status to the normal operation state (S137).

Figure 22:
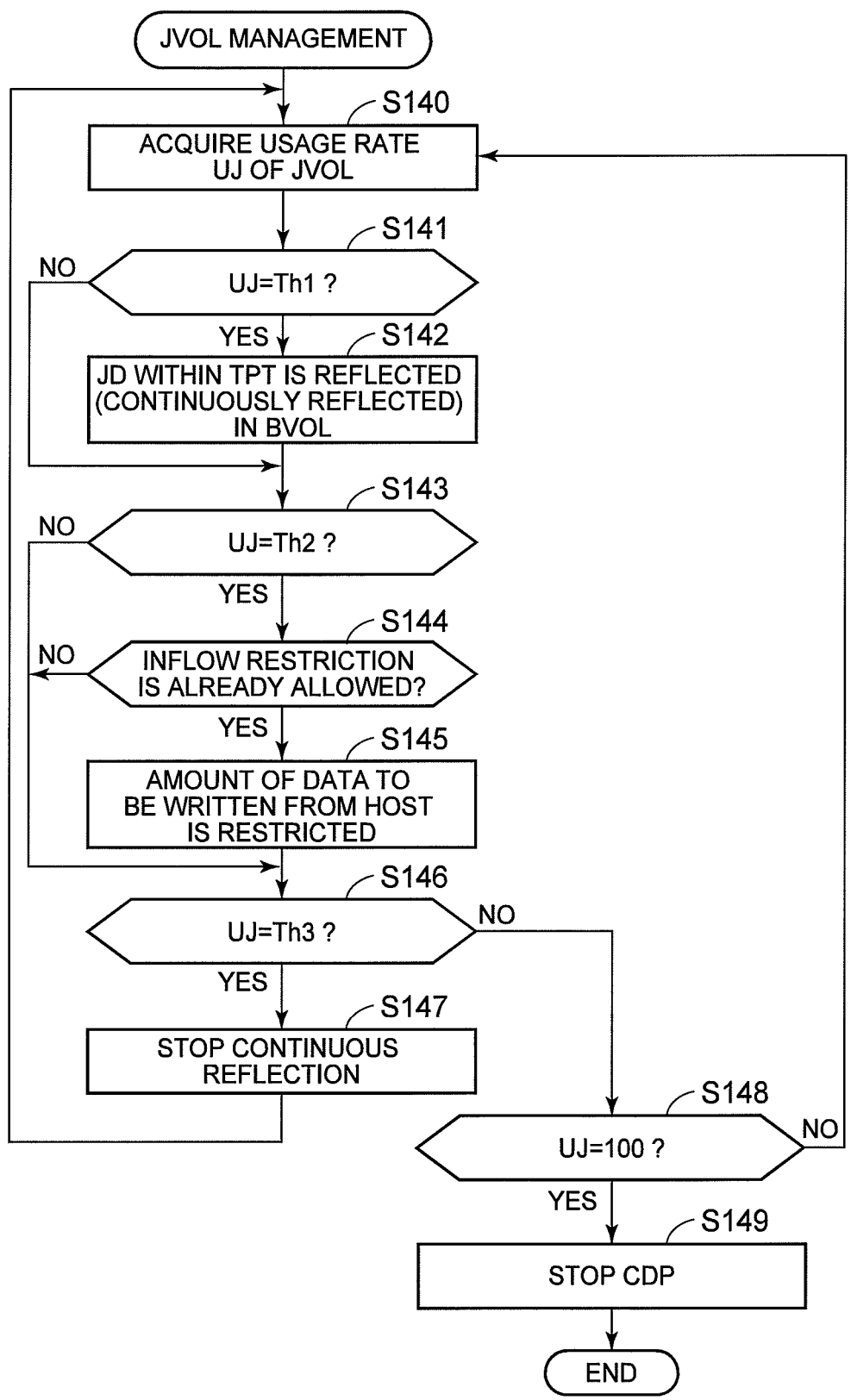
FIG. 22 is a flowchart showing processing of managing a journal volume.

FIG. 22 is a flowchart showing processing of managing the usage rate of the journal volume 230J. The storage controller 10 acquires the usage rate of the journal volume 230J (S140) to determine whether the usage rate UJ reaches the start threshold value Th1 of the continuous reflection processing (S141). When the usage rate UJ reaches the start threshold value Th1 (S141: YES), the storage controller 10 executes the abovementioned continuous reflection processing (S142).

The storage controller 10 determines whether the usage rate UJ reaches the start threshold value Th2 of the inflow restriction processing (S143). When the usage rate UJ reaches the start threshold Th2 of the inflow control processing (S143: YES), whether or not a permission to execute the inflow restriction processing is obtained from the user or application program (S144). If the inflow restriction processing is performed, the processing time of the application program becomes long. Therefore, it is preferred that the inflow restriction processing be started after the permission of the user or application program is acquired beforehand.

When the permission to start the inflow restriction processing is acquired (S144: YES), the storage controller 10 controls the mount of write data written to from the host 20 to the primary volume 230P, and controls the amount of journal data JD to be created (S145). As a method of controlling the amount of write data flowing to the primary volume 230P, there is, for example, a method of delaying a response to a write request issued from the host 20.

The storage controller 10 determines whether the usage rate UJ reaches the threshold value Th3 at which the continuous reflection processing is stopped (S146). If it is determined that the usage rate UJ reaches the stop threshold value Th3 (S146: YES), the storage controller 10 stops the continuous reflection processing (S147) and returns to S140.

If it is determined that the usage rate UJ does not reach the stop threshold value Th3 (S146: NO), the storage controller 10 determines whether the usage rate UJ reaches 100% (S148). If the usage rate UJ does not reach 100% (S148: NO), the storage controller 10 returns to S140. If the usage rate UJ reaches 100% (S148: YES), the storage controller 10 stops the CDP (S149).

FIG. 23 is an explanatory diagram showing an example of a screen for configuring the CDP function. The CDP configuration screen can be displayed on, for example, a terminal screen of the host 20 or management server 30. The CDP configuration screen can contain, for example, a CDP group designating section G11, a primary volume designating section G12, a base volume designating section G13, a journal volume designating section G14, a targeted protection period designating section G15, a inflow restriction designating section G16, a determine button B11 and a cancel button B12.

It should be noted that, besides the elements shown in FIG. 23, for example, a designating section for registering the journal volume 230J, a designating section for deleting the journal volume 230J, a designating section for integrally executing temporary restoration or complete restoration in units of CDP groups, a designating section for executing temporary restoration or complete restoration in units of volumes, a designating section for canceling temporary restoration, a designating section for directly executing complete restoration without performing temporary restoration, and a designating section for configuring the CPM can be provided. It should be noted that a case of using a GUI (Graphical User Interface) is described here, but various instructions can be given by using a command line.

An example of journal volume registration operation is described. A user can designate a CDP group and additionally register a designated volume as a journal volume.

An example of journal volume deletion operation is described. When the user designates a CDP group, a list of journal volumes within the CDP group is displayed. A journal volume designated by the user is excluded from the CDP group.

When a journal volume is shared by a plurality of primary volumes within the CDP group, the journal data is discarded only in units of CDP groups. Therefore, "targeted protection period" is an attribute of the CDP group.

The CDP group designating section G11 is for designating a CDP group. The primary volume designating section G12 is for designating a primary volume 230P to be protected by the CDP. The base volume designating section G13 is for designating a base volume 230B. The journal volume designating section G14 is for designating a journal volume 230J for storing journal data JD related to a primary volume 230P designated by G12. The targeted protection period designating section G15 is for designating a value of the targeted protection period TPT. The inflow restriction designating section G16 is for designating the value of the start threshold value Th2 in the case in which the flow limit processing can or cannot be performed or in which inflow restriction is permitted.

It should be noted that when the existing CDP group is designated to configure a new primary volume 230P to be protected by the CDP, it is not necessary to designate a journal volume 230J in advance. This is because a journal volume 230J is already designated when configuring a CDP group.

FIG. 24 is an explanatory diagram showing an example of a screen for performing recovery configuration. This recovery configuration screen display is displayed on, for example, a terminal screen of the host 20 or management server 30, as with the CDP configuration screen.

The recovery configuration screen can contain, for example, a CDP group designating section G21, a primary volume designating section G22, a recoverable point display section G23, a restoration point designating section G24, and buttons B21 through B23. It should be noted that, besides these elements, a designating section for designating whether recovery is performed in units of groups or in units of volumes can be provided.

The CDP group designating section G21 is for designating a CDP group having a primary volume 230P which is a recovery target. The primary volume designating section G22 is for designating the primary volume 230P which is the recovery target. The restorable point display section G23 is for displaying a recoverable period or CPM. This display section G23 displays one or a plurality of periods or CPM protected by the journal data JD. The restoration point designating section G24 is for designating a restoration point selected from the recoverable periods or CPM. It should be noted that the button B21 is for giving an instruction for executing temporary restoration. The button B22 is for giving an instruction for executing complete restoration.

Since the above embodiment is constituted as described above, the following effects are achieved. In the present embodiment, the journal data JD after a lapse of the targeted protection period TPT are written to the base volume 230B during the normal operation, whereby the storage contents of the base volume 230B can be transferred from the primary volume 230P as the storage contents that are obtained the targeted protection period later.

Therefore, in the present embodiment, the base point, which is a start point of the restorable period, can be caused to follow a certain time period later than the current time. Since the journal data items JD that are written to the base volume 230B are discarded, the risk that the journal volume 230J is filled with the journal data items JD can be reduced.

In the present embodiment, the difference bitmaps BM20 are allocated respectively to a plurality of predetermined sections, and the difference between the primary volume 230P and the base volume 230B is managed for each section. Therefore, after the journal data items JD associated with the difference bitmaps BM20 are all written to the base volume 230B, the storage contents of the difference bitmaps BM20 are deleted and reused. Accordingly, unwanted difference bitmaps BM20 can be prevented from being remaining stored in the memory areas of the storage controller 10, and the memory areas of the storage controller 10 can be used efficiently.

Furthermore, in the present embodiment, the sectional difference bitmaps BM20 are merged to create the difference bitmap BM10 for differential copying, and data are differentially copied from the base volume 230B to the primary volume 230P at the time of restoration. Accordingly, the amount of data to be copied from the base volume 230B to the primary volume 230P can be reduced, whereby the recovery time can be reduced.

In the present embodiment, the user can execute recovery a number of times, thus usability for the user improves. Moreover, in the present embodiment, even when recovery is executed a plurality of times, the journal data JD that can be used afterwards can be remained without being discarded, thus the range of the restoration point that can be selected by the user can be increased, whereby the usability for the user further improves.

Embodiment 2

Figure 25:
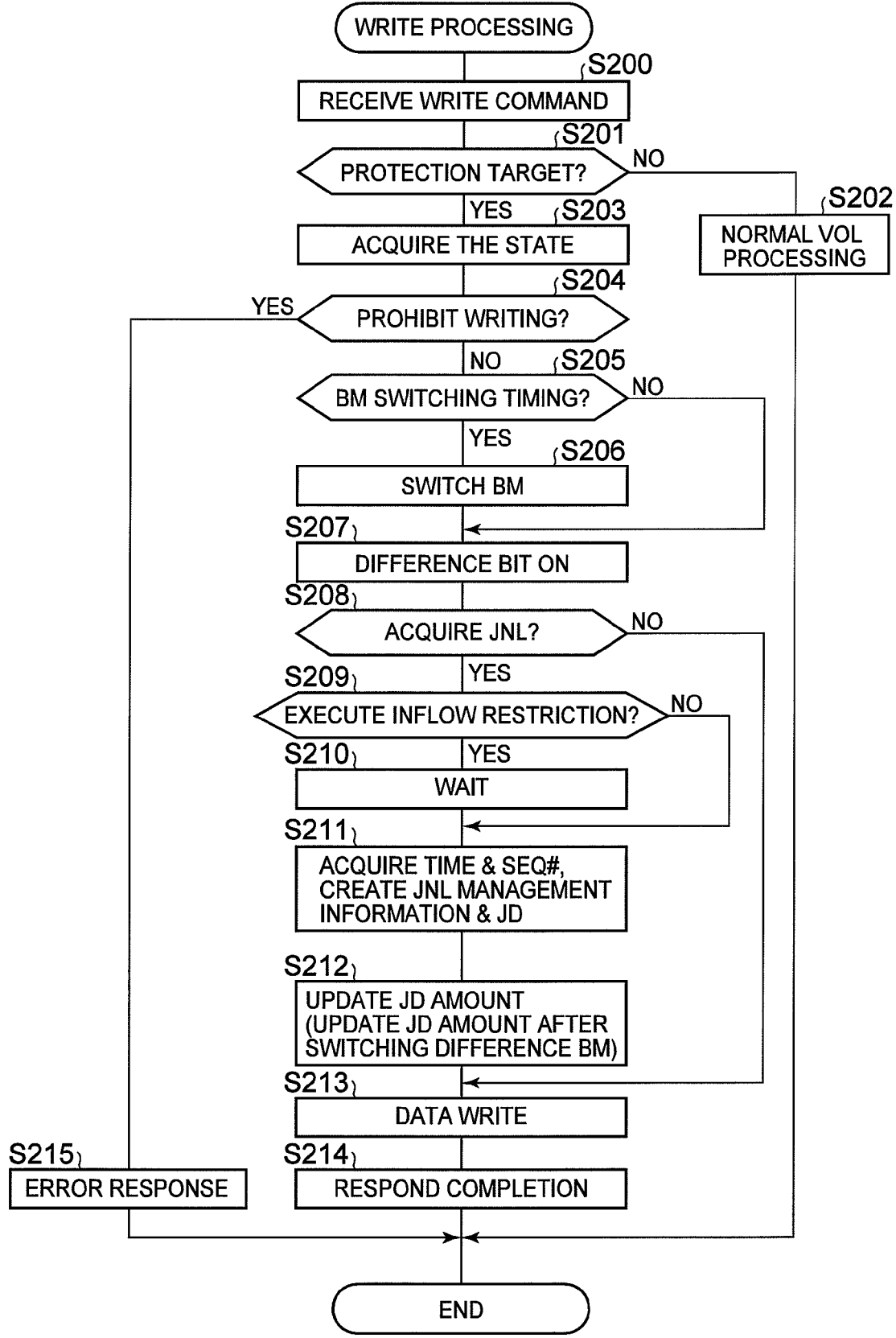
FIG. 25 is a flowchart of write processing according to a second embodiment of the present invention.

The second embodiment of the present invention is described based on FIG. 25. Each of the following embodiments including the present embodiment corresponds to a modification of the first embodiment described above. FIG. 25 is a flowchart of write processing which is executed by the storage controller 10. In the present embodiment, writing of write data to the primary volume 230P, configuring of a difference bit, and creating journal data are synchronized.

Once the storage controller 10 receives a write command from the host 20 (S200), the storage controller 10 determines whether or not the volume requested by the write command for writing is a volume to be protected by the CDP (S201). If this write command is not the write command for the volume to be protected by the CDP (S201: NO), the storage controller 10 performs normal writing processing (S202).

If the write command received in S200 is for requesting writing to the volume to be protected by the CDP (S201: YES), the storage controller 10 acquires a state related to the volume that is a target of writing (S203). The storage controller 10 determines whether the state of this write target volume is "prohibit writing" (S204). "Prohibit writing" means a state in which writing to the volume is prohibited. In the case in which the write target volume is in the state of "prohibit writing" (S204: YES), the storage controller 10 transmits an error response to the host 20 (S215).

When the write target volume is not in the state of "prohibit writing" (S204: NO), the storage controller 10 determines whether the switching time period for the difference bitmaps BM20 has arrived of not (S205). If the switching time period has arrived (S205: YES), the storage controller 10 switches the difference bitmap BM20 to another difference bitmap BM20 to reconfigure the value of journal data amount to 0 (S206). When the switching time period for the difference bitmaps BM20 has not arrived (S205: NO), S206 is skipped to move to S207.

The storage controller 10 configures the difference bitmap corresponding to the writing position requested by the write command received in S200, to ON (S207). Next, the storage controller 10 determines whether to acquire journal data (S208). When it is determined to acquired journal data (S208: YES), the storage controller 10 determines whether to execute inflow restriction (S209). If inflow restriction is executed (S209: YES), the storage controller 10 waits for a predetermined amount of time (S210).

After waiting for the predetermined amount of time, the storage controller 10 acquires the current time and sequence number (Seq#), creates journal management information and journal data, and stores the journal management information and journal data in the journal volume (S211). It should be noted that when inflow restriction is not performed (S209: NO), the storage controller 10 skips S210 to execute S211.

The storage controller 10 update the amount of journal data accumulated in the journal volume (S212). It should be noted that when switching the difference bitmaps BM20, the storage controller 10 switches a difference bitmap BM20 to another difference bitmap BM20, and thereafter updates the amount of journal data.

The storage controller 10 writes the write data received from the host 20 to the primary volume 230P (S213), and notifies the host 20 of the completion of processing of the write command (S214). When the state of the write target volume is in the "prohibit writing" state (S204: YES), the storage controller 10 sends an error message to the host 20 (S215). The present embodiment constituted as above can achieve the effects similar to those of the first embodiment described above.

Embodiment 3

Figure 26:
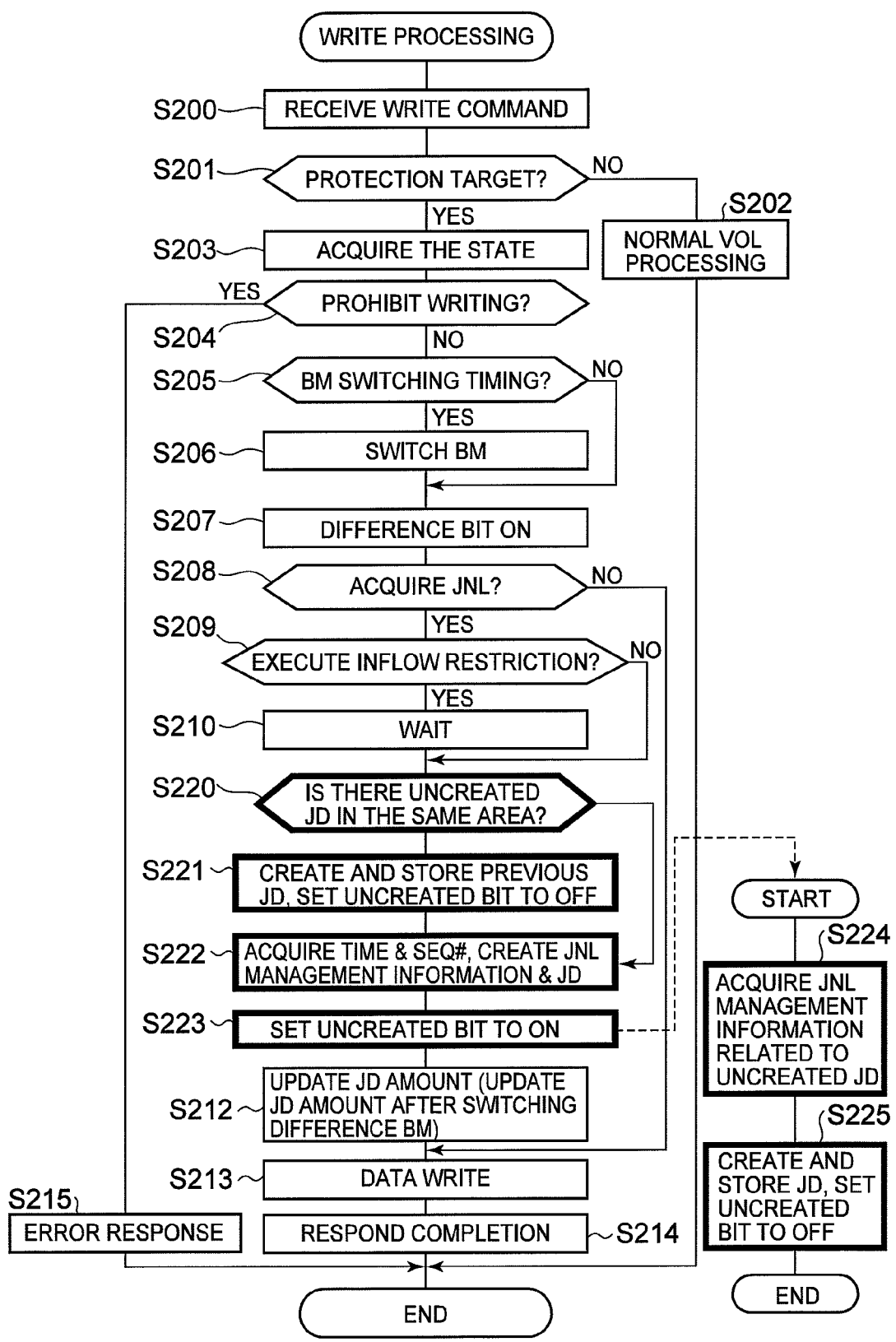
FIG. 26 is a flowchart of write processing according to a third embodiment of the present invention.

The third embodiment of the present invention is described based on FIG. 26. In the present embodiment, writing of write data to the primary volume 230P is performed asynchronously with creation of journal data. FIG. 26 is a flowchart of write processing and the like according to the present embodiment. As with each of the following flowcharts, descriptions of the steps similar to the steps described above are omitted, thus characteristic steps are mainly described.

After the storage controller 10 determines whether to execute inflow restriction (S209, S210), the storage controller 10 determines whether there exists an uncreated journal data item within the area to which the write data are written (S220). Specifically, in the present embodiment, sine processing of the write data is executed asynchronously with processing of the journal data, it is determined in S220 whether the journal data related to the previous write data is created or not. Therefore, the present embodiment has a journal data creation/management bitmap for managing whether the journal data is created or not, as with the difference bitmap for managing the update position of the primary volume 230P. In the area in which the journal data related to the previously received write data is not yet created, uncreated bit is configured to an ON state.

When there exists the uncreated journal data in the area to which the write data received this time are written (S220: YES), the storage controller 10 create the uncreated journal data and configures the uncreated bit to OFF (S221).

The storage controller 10 creates journal management information and journal data as in S221, writes the journal management information and the journal data to the journal volume (S222), and configures the uncreated data to ON for the journal data related to the write data received this time (S223). If the result of S220 is "NO", S221 is skipped to move to S222.

The storage controller 10 acquires the journal management information relate to the uncreated journal data at the timing for the write processing (S224), creates journal data and stores the journal data in the journal volume (S225). The storage controller 10 configures the uncreated bit to OFF (S225). The present embodiment constituted as above also achieves the effects similar to those of the first embodiment described above.

In the present embodiment, the journal data are created at the timing different from the timing for the write processing, thus the time required for processing the write command can be reduced, as compared with the second embodiment, and the time for responding to the host can also be reduced.

Embodiment 4

Figure 27:
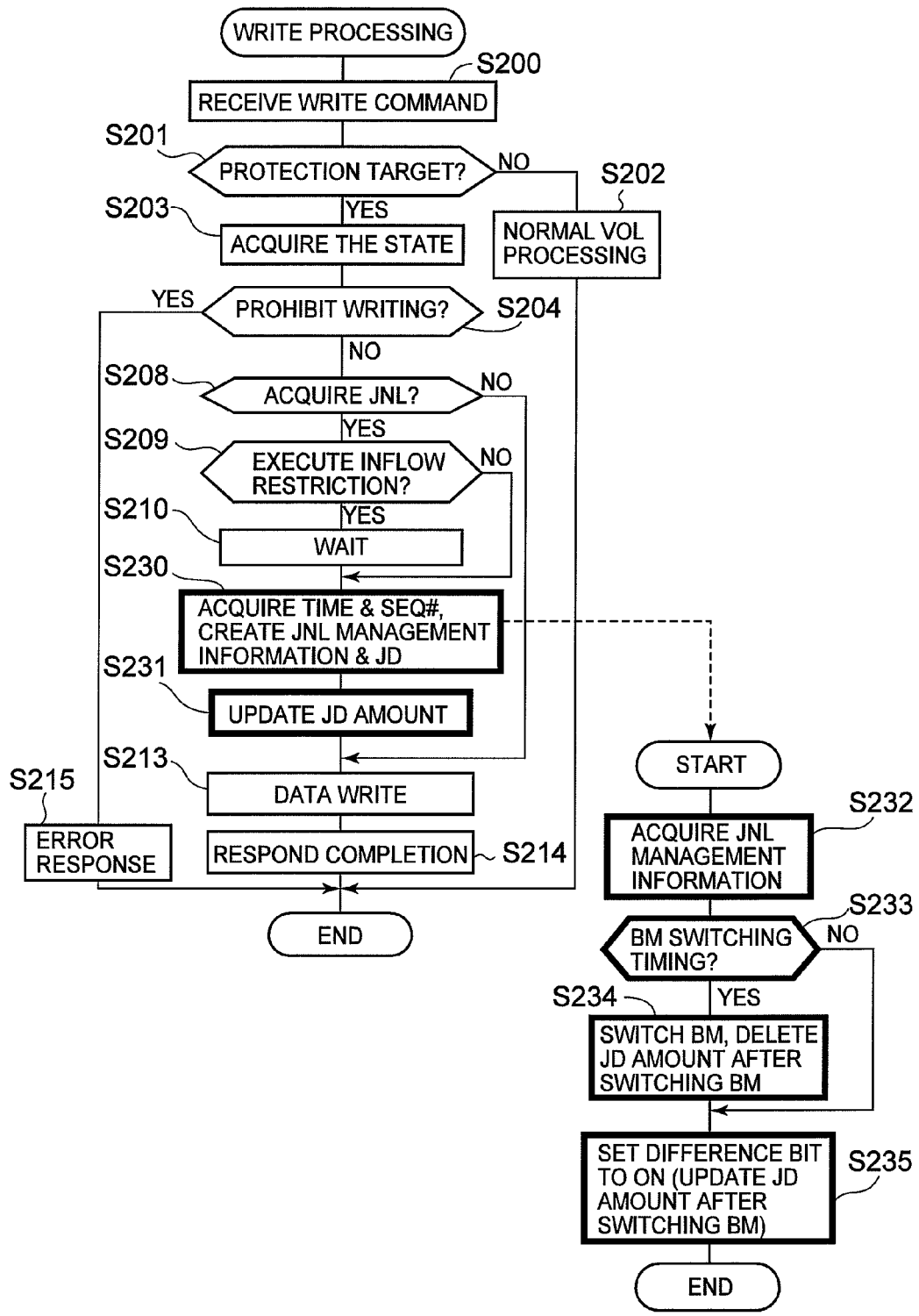
FIG. 27 is a flowchart of write processing according to a fourth embodiment of the present invention.

The fourth embodiment of the present invention is described based on FIG. 27. In the present embodiment, a difference bitmap is configured to the difference bitmaps BM20 asynchronously with the write processing of the write data. FIG. 27 is a flowchart showing the write processing and the like according to the present embodiment.

After the storage controller 10 receives the write data, the storage controller 10 creates journal data management information and journal data related to the write data, and writes the journal data management information and journal data to the journal volume (S230). The storage controller 10 updates the amount of journal data (S231).

At the timing different from the timing for the write processing, the storage controller 10 acquires the journal management information (S232) and determines whether the switching timing for switching the difference bitmaps BM20 has arrived or not (S233). If the switching timing arrives (S233: YES), the storage controller 10 switches the difference bitmap BM20, which is currently used, to another difference bitmap BM20, and deletes the amount of journal data (S234). Specifically, the storage controller 10 returns the amount of journal data to "0" (S234).

The storage controller 10 configures the difference bitmap to ON with respect to the write data corresponding to the journal data management information acquired in S232 (S235). The present embodiment configure as above also achieves the effects similar to those of the first embodiment described above. Moreover, in the present embodiment, update of the difference bitmaps is performed a synchronously at the timing different from the timing for the write processing, thus the time for processing the write command can be reduced, as compared with the second embodiment, and the completion of the processing of the write command can be reported immediately to the host.

Embodiment 5

Figure 28:
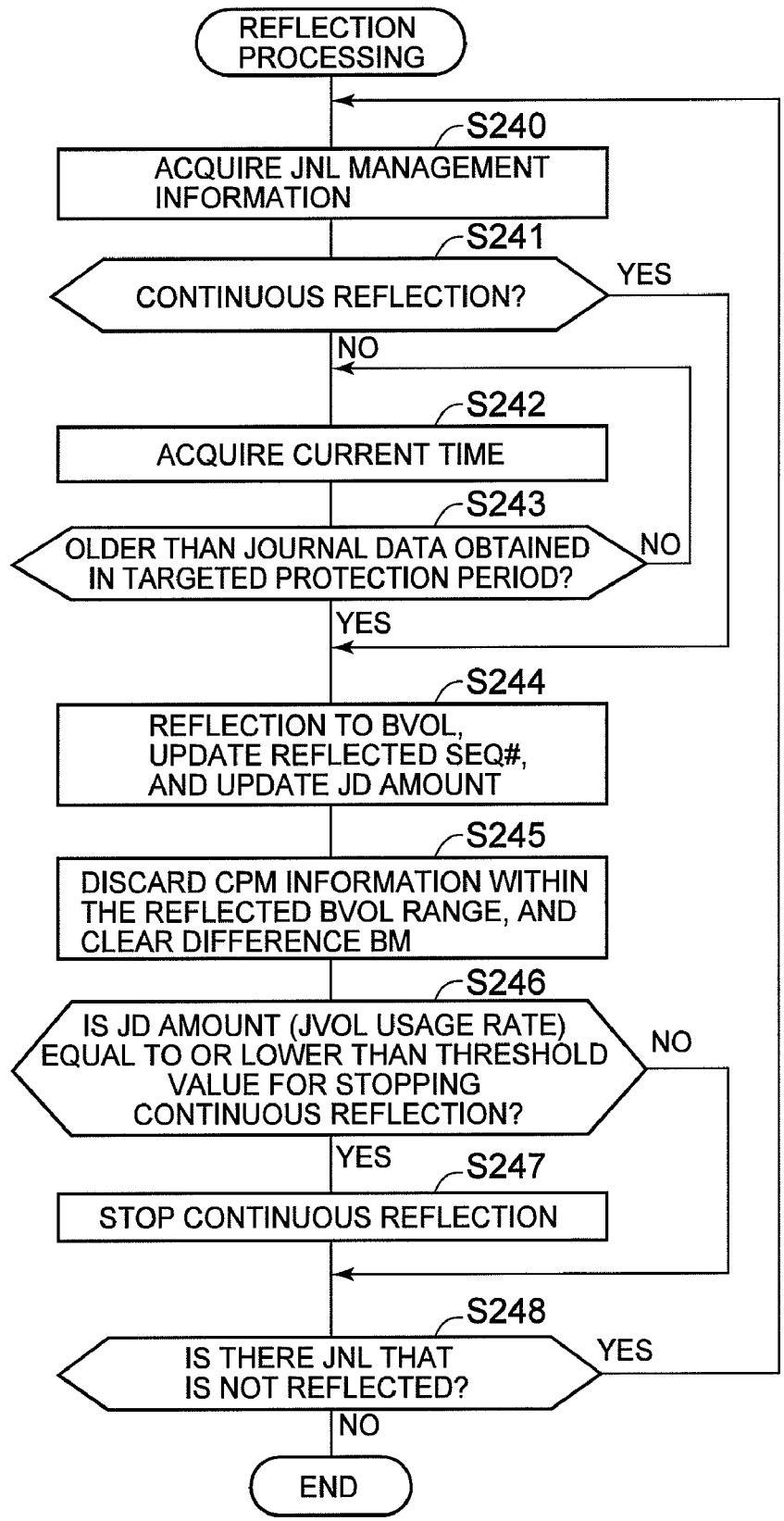
FIG. 28 is a flowchart of reflection processing according to a fifth embodiment.

The fifth embodiment of the present invention is described based on FIG. 28. In the present embodiment, the journal data items that are older than the journal data obtained in the targeted protection period are written to the base volume 230B. FIG. 28 is a flowchart of the reflection processing according to the present embodiment.

The storage controller 10 acquires the journal data management information (S240) and determines whether to execute continuous reflection or not (S241). If continuous reflection is not executed (S241: NO), the storage controller 10 acquires the current time (S242) and determines whether the journal management information acquired in S240 is the old information obtained after a lapse of the targeted protection period (S243).

If the journal management information is obtained prior to the targeted protection period (S243: YES), journal data items corresponding to the journal management information are written to the base volume 230B (S244). The storage controller 10 updates the sequence number for specifying the journal data that is already reflected, and the amount of journal data (S245).

If continuous reflection is executed (S241: YES), the storage controller 10 skips S242 and S243 and proceeds to S244. If the journal management information is not the journal management information obtained prior to the targeted protection period (S243: NO), the storage controller 10 waits until the journal management information becomes older that the journal management information of the targeted protection period.

The storage controller 10 discards the CPM that is within the range reflected by the base volume 230B (S245), and reconfigures the difference bitmap to 0 (S246).

The storage controller 10 determines whether the journal data amount becomes equal to or lower than the threshold value for stopping the continuous reflection processing (S246). If the journal data amount, i.e., the usage rate of the journal volume, is equal to or lower than the stop threshold value (S246: YES), the storage controller 10 stops the continuous reflection processing (S247).

The storage controller 10 determines whether there exists journal data that is not yet reflected (S248). If there is journal data that is not yet reflected (S248: YES), the storage controller 10 returns to S240. If the result of S246 is "NO", S247 is skipped to move to S248. The present embodiment constituted as above also achieves the effects similar to those of the first embodiment described above.

Embodiment 6

Figure 29:
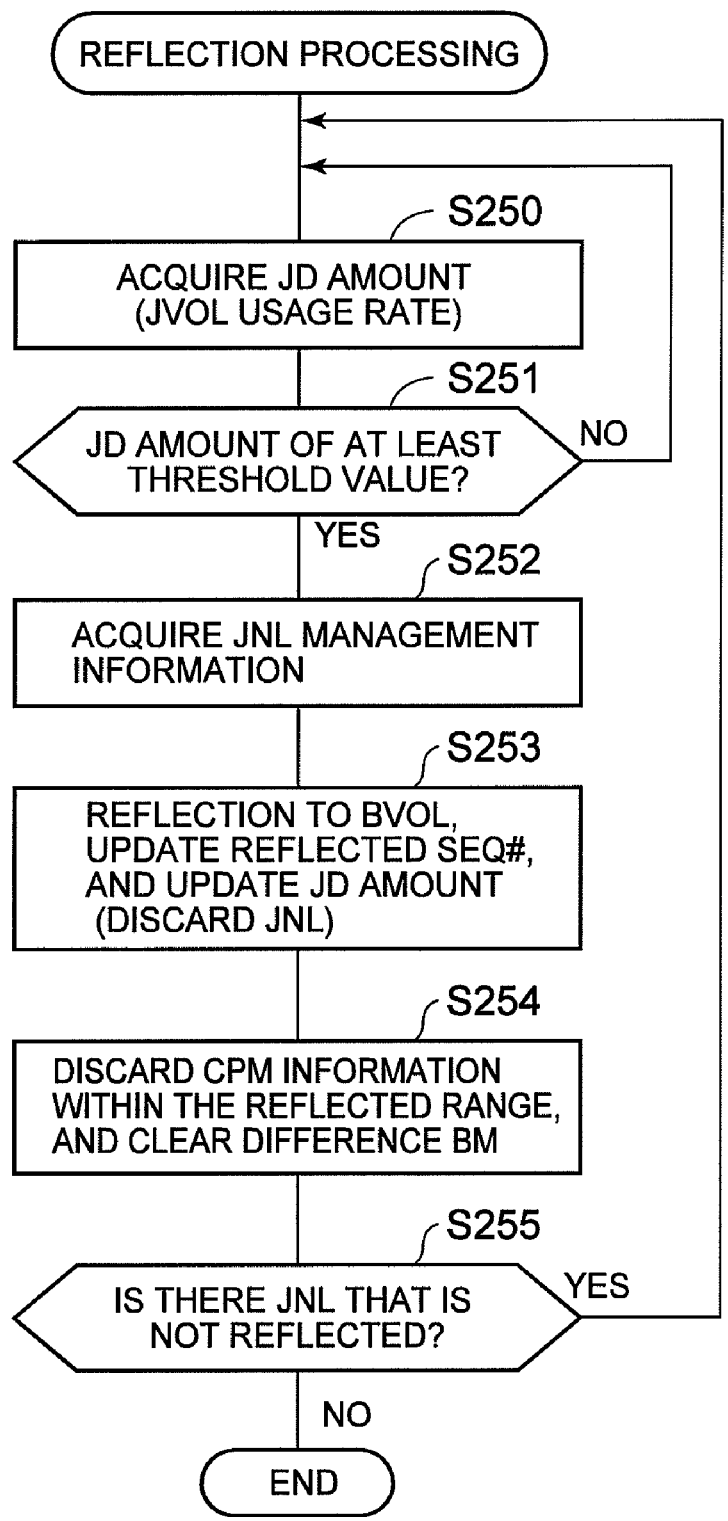
FIG. 29 is a flowchart of reflection processing according to a sixth embodiment.

The sixth embodiment of the present invention is described based on FIG. 29. In the present embodiment, the reflection processing is performed on the basis of the journal data amount (i.e., the usage rate of the journal volume).

The storage controller 10 acquires the journal data amount (S250) and determines whether the current journal data amount is equal to or more than the threshold for determining the execution of reflection (S251). Specifically, the storage controller 10 waits for the execution of the reflection processing until the journal data amount reaches the threshold (S251: N0, S250).

When the journal data amount reaches the threshold (S251: YES), the storage controller 10 acquires the journal management information (S252). The storage controller 10 writes the journal data to the base volume 230B, and updates the sequence number for managing the journal data that is already reflected (S253). Furthermore, the storage controller 10 discards the reflected journal data and updates the journal data amount (S253).

The storage controller 10 discards the CPM that is within the range reflected by the base volume 230B, and reconfigures the difference bitmap to "0" (S254). The storage controller 10 determines whether there exists journal data that is not yet reflected (S255). If there exists journal data that is not yet reflected (S255: YES), the storage controller 10 returns to S250. The present embodiment constituted as above also achieves the effects similar to those of the first embodiment described above.

Embodiment 7

Figure 30:
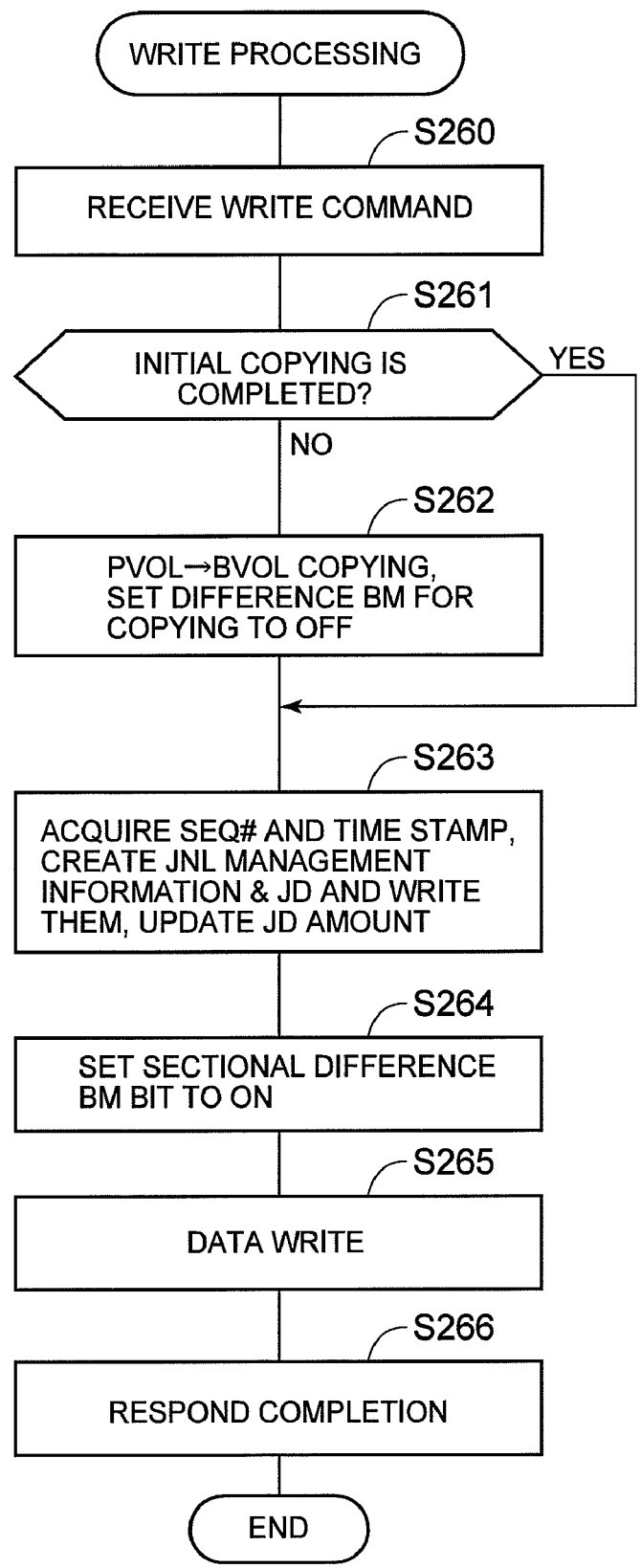
FIG. 30 is a flowchart of write processing according to a seventh embodiment of the present invention.

The seventh embodiment of the present invention is described based on FIG. 30. In the present embodiment, when the write data is written to the primary volume 230P, the old data that are stored in the area for writing the write data are copied to the base volume 230B. FIG. 30 is a flowchart that shows write processing according to the present embodiment in a simplified manner. FIG. 30 omits the illustration of inflow restriction control and switching of the difference bitmaps. In the present embodiment, the old data stored in the write target area are written to the base volume 230B before writing new write data to the primary volume 230P, whereby the old data are saved in the base volume 230B. This processing is sometimes called "push out copying".

Once the storage controller 10 receives a write command from the host 20 (S260), the storage controller 10 determines whether or not initial copying performed on the write target area is completed (S261). If the initial copying is not completed (S261: NO), the storage controller 10 copies the data stored in the write target area from the primary volume 230P to the base volume 230B, and configures the difference bit of the difference bitmap for managing initial copying to OFF (S262). Specifically, the storage controller 10 records in the difference bitmap the fact that the initial copying for the write target area is completed.

The storage controller 10 acquires the sequence number and a time stamp (S263), creates journal management information and journal data, and stores the created journal management information and journal data in the journal volume (S263). The storage controller 10 further updates the journal data amount (S263).

The storage controllers 10 configures the difference bit of the area corresponding to the write command received in S260 to ON, the difference bit being of the difference bitmap BM20 in charge of the current section (S264), and writes the write data to the primary volume 230P (S265). The storage controller 10 notifies the host 20 of the completion of the processing of the write command (S266). The present embodiment constituted as above achieves the effects similar to those of the first embodiment described above.

Embodiment 8

Figure 31:
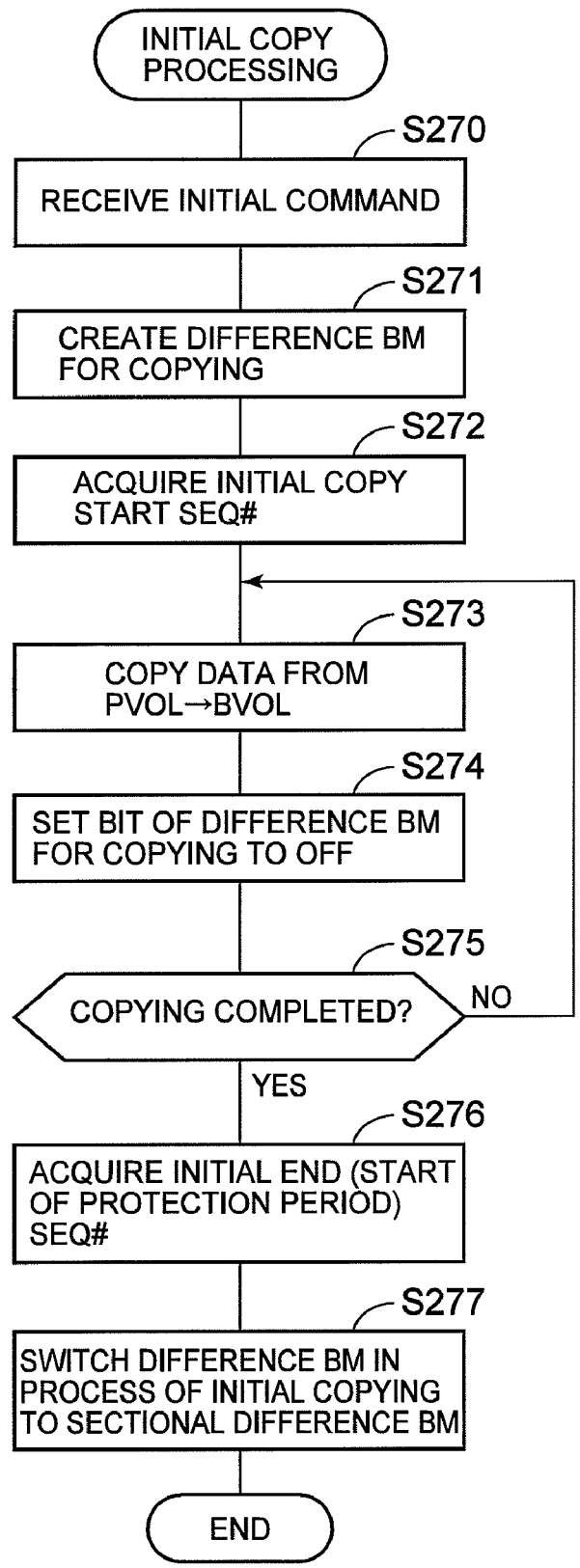
FIG. 31 is a flowchart of initial copy processing according to an eighth embodiment of the present invention.

The eighth embodiment of the present invention is described based on FIG. 31. In the present embodiment, initial copying is performed without performing "push out copying". FIG. 31 is a flowchart of initial copy processing according to the present embodiment.

Once the storage controller 10 receives an initial command (S270), the storage controller 10 creates a difference bitmap for controlling initial copying (S271). The storage controller 10 acquires the sequence number for starting initial copying (S272), and copies difference data from the primary volume 230P to the base volume 230B (S273). The storage controller 10 configures a difference bit of the difference bitmap created in S271 to OFF with respect to an area in which differential copying is ended (S274).

The storage controller 10 determines whether the initial copying is completed or not (S275), and repeatedly executes S273 and S274 until the initial copying is completed (S275: NO). Once the initial copying is completed (S275: YES), the storage controller 10 acquires the sequence number indicating the position where the initial copying is ended (S276). The position where the initial copying is ended indicates a start position of the protection period. The storage controller 10 switches the difference bitmap for managing the difference data that is in the process of the initial copying, to a difference bitmap for managing the section, and ends the present processing (S277). The present embodiment constituted as above achieves the effects similar to those of the first embodiment described above.

Embodiment 9

Figure 32:
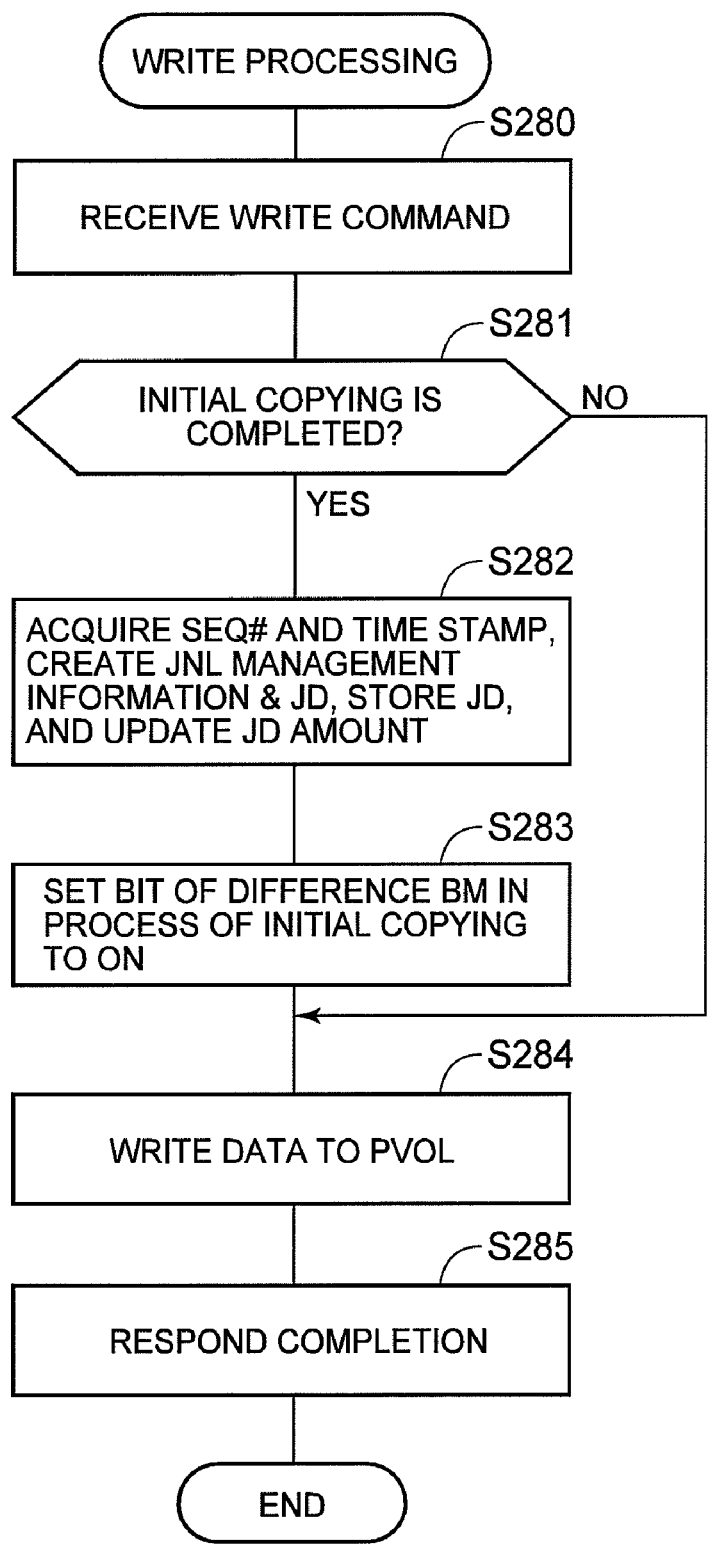
FIG. 32 is a flowchart of write processing according to a ninth embodiment of the present invention.

The ninth embodiment of the present invention is described based on FIG. 32. In the present embodiment, a write command that is issued during the initial copying is processed without performing "push out copying". FIG. 32 is a flowchart of write processing that is performed during the execution of the initial copying.

Once the storage controller 10 receives a write command from the host 20 during initial copying (S280), the storage controller 10 determines whether the write command is a request for writing to the area in which initial copying is already completed (S281). In the case in which the write command is a write command for the area in which initial copying is already completed (S281: YES), the storage controller 10 acquires the sequence number and a time stamp, creates journal management information and journal data, and stores the created journal management information and journal data in the journal volume (S282). The storage controller 10 further updates the journal data amount (S282).

The storage controller 10 configures the difference bit corresponding to the write target area to ON in the difference bitmap for managing the update position that is in the process of creation (S283). The storage controller 10 writes write data to the primary volume 230P (S284), and notifies the host 20 of the completion of the processing of the write command (S285).

On the other hand, if the write command is a request for writing to the area in which initial copying is not finished (S281: NO), the storage controller 10 skips S282 and S283 and proceeds to S284. Specifically, the old data stored in the write target area are overwritten without being saved in the base volume 230B. The present embodiment constituted as above achieves the effects similar to those of the first embodiment described above.

Embodiment 10

Figure 33:
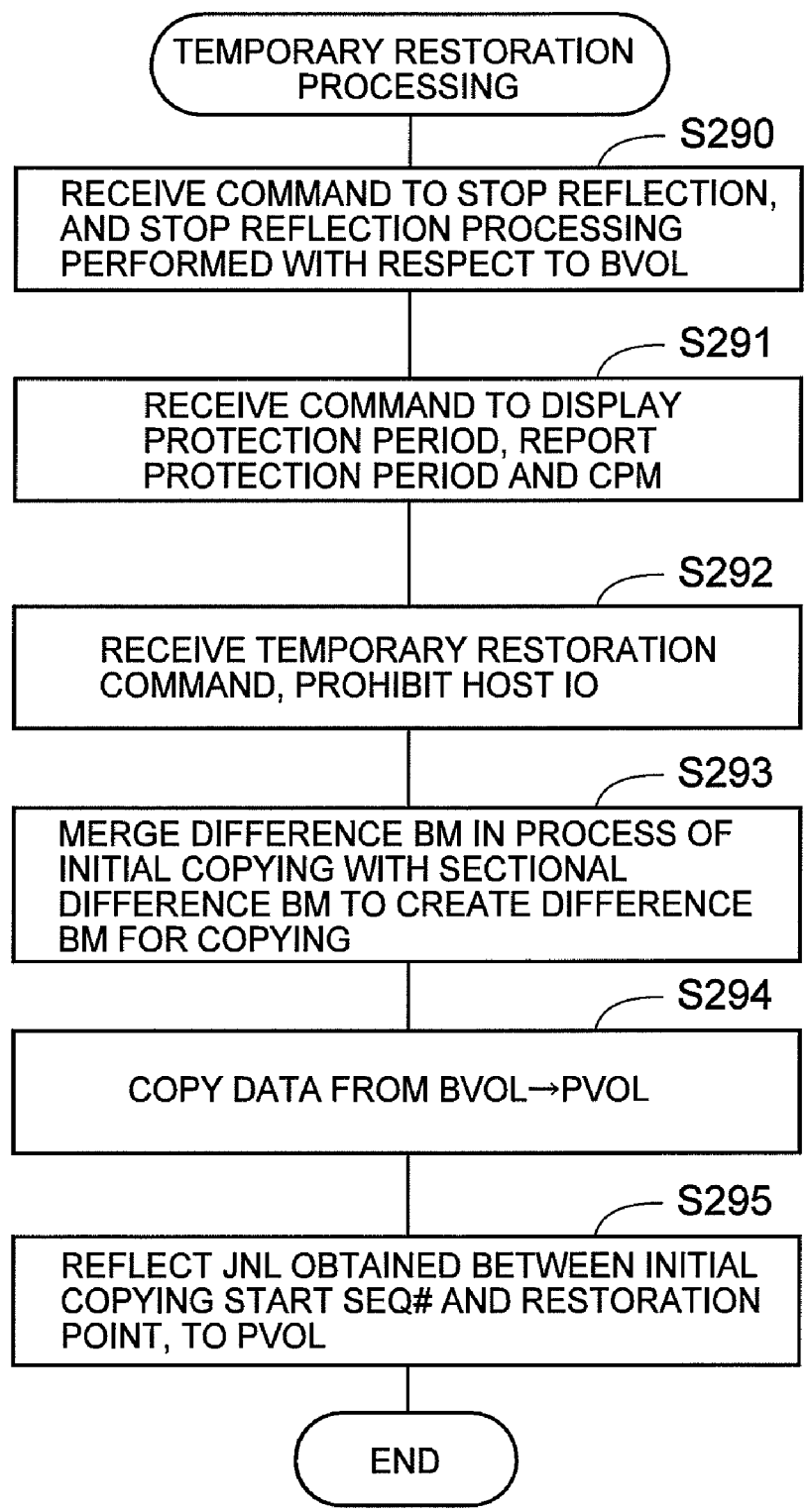
FIG. 33 is a flowchart of temporary restoration processing according to a tenth embodiment of the present invention.

The tenth embodiment of the present invention is described based on FIG. 33. In the present embodiment, temporary restoration is executed in the case in which the initial copying according to the ninth embodiment is performed. FIG. 33 is a flowchart of temporary restoration processing according to the present embodiment.

The storage controller 10 stops writing of the journal data to the base volume 230B in response to a command to stop the reflection processing (S290). The storage controller 10 reports the protection period and CPM in response to a command requesting for displaying the protection period (S291).

The storage controller 10 configures the state of the primary volume 230P to "prohibit writing" in response to a command to execute temporary restoration, and thereby prohibits acceptance of I/O from the host 20 (S292).

The storage controller 10 merges the bitmap for managing the difference that is in process of initial copying, with the bitmap for managing the difference between sections, and thereby creates the difference bitmap for copying (S293). The storage controller 10 uses the difference bitmap for copying to copy the data from the base volume 230B to the primary volume 230P (S294). The storage controller 10 writes the journal data items between the sequence number of the start of initial copying and the sequence number of the restoration point, to the primary volume 230P (S295). The present embodiment constituted as above achieves the effects similar to those of the first embodiment described above.

It should be noted that the present invention is not limited to the above embodiments. Those skilled in the art can make various additions and changes within the scope of the present invention. For example, various processing of stopping the CDP, resuming the CDP, deleting the CDP, temporary restoration, and complete restoration can be integrally performed in units of CDP groups or in units of volumes.

Moreover, when performing these processing in units of volumes, these processing can be performed simultaneously with respect to a plurality of volumes. Furthermore, the user designates the restoration point by means of the CPM or time, whereby complete restoration can be executed directly without performing temporary restoration. In addition, the reflection stop processing can be performed independently from temporary restoration or CDP stop processing. The reflection processing can be also resumed independently from complete restoration.

What is claimed is:

1. A storage controller for storing data that is used by a host device, comprising:
a first volume that stores write data sent from the host device;
a second volume to which a storage content of the first volume that is obtained at a predetermined time point is copied;
a third volume that stores journal data items created based on a write request targeted at the first volume;
a plurality of first difference bitmaps, each of which manages, for each of a plurality of predetermined sections, a position at which a difference in storage contents occurs between the first volume and the second volume; and
a controller for controlling the first volume, the second volume, the third volume, and each of the first difference bitmaps,
wherein the controller executes:
(1) an initial copy function for storing, in the second volume, the storage content of the first volume that is obtained at the predetermined time point;
(2) a journal generating function for generating the journal data items on the basis of write requests sent from the host device and causing the third volume to store the generated journal data items;
(3) a difference management function for causing one of the first difference bitmaps, which is selected for the each predetermined section, to store the position at which a difference is generated between the first volume and the second volume, on the basis of the write request issued from the host device after the predetermined time point;
(4) a reflection function for reflecting, in the second volume, predetermined journal data items that are obtained after a lapse of a pre-designated targeted protection period, out of the journal data items stored in the third volume;
(5) a journal discarding function for discarding the predetermined journal data items reflected in the second volume; and
(6) a reusing function for deleting a storage content of a predetermined first difference bitmap having all corresponding journal data items discarded, out of the first difference bitmaps, and reusing thus obtained first difference bitmap as a new first difference bitmap;
wherein the controller further executes a first restoration function, which, (7) when a command is issued to execute a first restoration:
(7-2) merges the storage contents of the first difference bitmaps to create a second difference bitmap;
(7-3) differentially copies the storage content of the second volume to the first volume on the basis of the created second difference bitmap, to thereby restores the storage content of the first volume to the predetermined time point; and
(7-4) reflects, in the first volume, journal data items obtained up to a designated first restoration point, out of the journal data items stored in the third volume, and thereby restores the storage content of the first volume to the storage content obtained at the first restoration point;
wherein when a command is issued to execute the first restoration, the first restoration function (7) (7-1) prohibits the write request from being sent from the host device to the first volume, and executes (7-2) through (7-4) after stopping operation of the reflection function (4).

2. The storage controller according to claim 1, wherein after executing (7-2) through (7-4), the first restoration function (7) (7-5) removes prohibition of the write request from the host device to the first volume, to thereby causes the third volume to store new journal data generated by the journal generating function (2), and (7-6) causes a third difference bitmap to store the position of the difference generated between the second volume and the first volume, the storage content of which is restored to the predetermined time point.

3. The storage controller according to claim 2, wherein after executing (7-2) through (7-6), the first restoration function (7):
(7-7) discards the new journal data when a command is issued to execute a first restoration for designating other first restoration point different from the first restoration point;

(7-8) merges the storage content of each first difference bitmap with the storage content of the third difference bitmap to create another second difference bitmap;

(7-9) copies the storage content of the second volume to the first volume on the basis of the created other second difference bitmap, to thereby restore the storage content of the first volume to the predetermined time point; and (7-10) reflects, in the first volume, the journal data items obtained up to the other first restoration point, out of the journal data items stored in the third volume, and thereby restores the storage content of the first volume to the storage content obtained at the other first restoration point.

4. The storage controller according to claim 3, wherein the first restoration function (7) deletes the third difference bitmap after creating the second difference bitmap in (7-8).

5. The storage controller according to claim 1, wherein the controller further executes a second restoration function, which, (8) when a command is issued to execute a second restoration:

(8-1) nullifies all successive journal data items obtained after a designated second restoration point, out of the journal data items stored in the third volume; and (8-2) removes prohibition of the write request sent from the host device to the first volume, and resumes the operation of the reflection function (4).

6. The storage controller according to claim 2, wherein (8) when a command is issued to execute a second restoration after executing (7-1) through (7-6), the controller executes a second restoration function for: (8-1A) maintaining the new journal data created in (7-5) out of the journal data items stored in the third volume, and nullifying all of the successive journal data items obtained after a designated second restoration point; and (8-2A) using the third difference bitmap as the first difference bitmap.

7. The storage controller according to claim 6, wherein the first restoration point or the second restoration point can be selected from either a first period, which is managed by each journal data item that is stored in the third volume before the execution of the second restoration and is stored in the third volume even after the execution of the second restoration, or a second period, which is managed by the new journal data stored in the third volume after the execution of the second restoration.

8. A storage controller for storing data that is used by a host device, comprising:
a first volume that stores write data sent from the host device;
a second volume to which a storage content of the first volume that is obtained at a predetermined time point is copied;
a third volume that stores journal data items created based on a write request targeted at the first volume;
a plurality of first difference bitmaps, each of which manages, for each of a plurality of predetermined sections, a position at which a difference in storage contents occurs between the first volume and the second volume; and
a controller for controlling the first volume, the second volume, the third volume, and each of the first difference bitmaps,
wherein the controller executes:
(1) an initial copy function for storing, in the second volume, the storage content of the first volume that is obtained at the predetermined time point;
(2) a journal generating function for generating the journal data items on the basis of write requests sent from the host device and causing the third volume to store the generated journal data items;
(3) a difference management function for causing one of the first difference bitmaps, which is selected for the each predetermined section, to store the position at which a difference is generated between the first volume and the second volume, on the basis of the write request issued from the host device after the predetermined time point;
(4) a reflection function for reflecting, in the second volume, predetermined journal data items that are obtained after a lapse of a pre-designated targeted protection period, out of the journal data items stored in the third volume;
(5) a journal discarding function for discarding the predetermined journal data items reflected in the second volume; and
(6) a reusing function for deleting a storage content of a predetermined first difference bitmap having all corresponding journal data items discarded, out of the first difference bitmaps, and reusing thus obtained first difference bitmap as a new first difference bitmap;
wherein when a usage rate of the third volume reaches a second threshold value that is established beforehand, the controller sets limit to the amount of write requests to be issued from the host device to the first volume.

9. A method for controlling a storage controller for storing data used by a host device, the storage controller comprising: a first volume that stores write data sent from the host device; a second volume to which a storage content of the first volume that is obtained at a predetermined time point is copied; a third volume that stores journal data created based on a write request targeted at the first volume; a plurality of first difference bitmaps, each of which manages, for each of a plurality of predetermined sections, a position at which a difference in storage contents occurs between the first volume and the second volume; and a controller for controlling the first volume, the second volume, the third volume, and each of the first difference bitmaps, wherein the controller executes a first control mode having the steps of:

(1S) storing, in the second volume, the storage content of the first volume that is obtained at the predetermined time point;

(2S) generating journal data items on the basis of write requests sent from the host device and causing the third volume to store the generated journal data items;

(3S) causing one of the first difference bitmaps, which is selected for the each predetermined section, to store the position at which a difference is generated between the first volume and the second volume, on the basis of the write request issued from the host device after the predetermined time point;

(4S) reflecting, in the second volume, predetermined journal data items that are obtained after a lapse of a pre-designated targeted protection period, out of the journal data items stored in the third volume;

(5S) discarding the predetermined journal data items; and (6S) deleting a storage content of a predetermined first difference bitmap having all corresponding journal data items discarded, out of the first difference bitmaps, and reusing thus obtained first difference bitmap as a new first difference bitmap;

wherein the controller executes a second control mode having the steps of, subsequently to (6S):

(7S) prohibiting the write request from being sent from the host device, and merging the storage contents of the difference bitmaps to create a second difference bitmap when a first restoration point is designated and a command is issued to execute first restoration;

(8S) copying the storage content of the second volume to the first volume on the basis of the created second difference bitmap, to thereby restore the storage content of the first volume to the predetermined time point;

(9S) reflecting, in the first volume, journal data items obtained up to the first restoration point, out of the journal data items stored in the third volume, and thereby restoring the storage content of the first volume to the storage content obtained at the first restoration point;

(10S) removing prohibition of the write request;

(11S) causing the third volume to store new journal data that is created by removing prohibition of the write request;

(12S) causing a third difference bitmap to store the position of the difference generated between the second volume and the first volume, the storage content of which is restored to the predetermined time point;

(13S) maintaining the new journal data out of the journal data items stored in the third volume, when the first restoration point is determined to be the second restoration point, and nullifying all successive journal data items obtained after the determined second restoration point;

(14S) using the third difference bitmap as the first difference bitmap; and (15S) reflecting, in the second volume, the predetermined journal data items that are obtained after a lapse of the targeted protection period.

10. The method for controlling a storage controller according to claim 9, wherein the controller executes a third control mode when a command is issued to stop the execution of the first control mode, the third control mode having the steps of:

(16S) stopping creation of the journal data that is performed based on the write request sent from the host device to the first volume; and (17S) causing a fourth difference bitmap to store a difference generated by the write request sent from the host device to the first volume.

11. The method for controlling a storage controller according to claim 10, wherein the third control mode further has a step of (18S) stopping reflecting, in the second volume, the predetermined journal data items obtained after a lapse of the targeted protection period.

* * * * *